(12) United States Patent
Chiba et al.

(10) Patent No.: US 11,140,599 B2
(45) Date of Patent: Oct. 5, 2021

(54) TERMINAL APPARATUS, MOBILITY MANAGEMENT ENTITY (MME), CONTROL PLANE FUNCTION (CPF), AND COMMUNICATION CONTROL METHOD

(71) Applicants: SHARP KABUSHIKI KAISHA, Sakai (JP); FG Innovation Company Limited, Tuen Mun (HK)

(72) Inventors: Shuichiro Chiba, Sakai (JP); Yudai Kawasaki, Sakai (JP); Masafumi Aramoto, Sakai (JP); Yoko Kuge, Sakai (JP)

(73) Assignees: SHARP KABUSHIKI KAISHA, Osaka (JP); FG INNOVATION COMPANY LIMITED, Tuen Mun (HK)

( * ) Notice: Subject to any disclaimer, the term of this patent is extended or adjusted under 35 U.S.C. 154(b) by 0 days.

(21) Appl. No.: 16/339,651

(22) PCT Filed: Aug. 14, 2017

(86) PCT No.: PCT/JP2017/029303
§ 371 (c)(1),
(2) Date: Apr. 4, 2019

(87) PCT Pub. No.: WO2018/066234
PCT Pub. Date: Apr. 12, 2018

(65) Prior Publication Data
US 2020/0053615 A1 Feb. 13, 2020

(30) Foreign Application Priority Data

Oct. 7, 2016 (JP) .............................. JP2016-198806

(51) Int. Cl.
*H04W 36/14* (2009.01)
*H04W 8/06* (2009.01)
(Continued)

(52) U.S. Cl.
CPC .......... *H04W 36/14* (2013.01); *H04W 8/065* (2013.01); *H04W 36/0016* (2013.01); *H04W 88/14* (2013.01)

(58) Field of Classification Search
CPC .... H04W 36/14; H04W 8/065; H04W 36/001
See application file for complete search history.

(56) References Cited

U.S. PATENT DOCUMENTS

2016/0080981 A1  3/2016  Wang et al.
2016/0277985 A1  9/2016  Yu

FOREIGN PATENT DOCUMENTS

GB      2552845 A  *  2/2018  ........ H04W 36/0022
WO  2010/053066 A1   5/2010

OTHER PUBLICATIONS

3GPP SA WG2 S2-162612 (Year: 2016).*
(Continued)

*Primary Examiner* — Ernest G Tacsik
(74) *Attorney, Agent, or Firm* — Finnegan, Henderson, Farabow, Garrett & Dunner LLP

(57) ABSTRACT

Provided are a terminal apparatus capable of connecting to various core networks, a communication controller suitable for a device in a network connectable to the terminal apparatus, a communication controller for changing a core network to which the terminal apparatus is connected, a communication controller for switching a session established by the terminal apparatus to a session with another core network, and the like. This provides the terminal apparatus supporting a switch of connectivity between multiple core networks, and a communication controller suitable for the device in the network connectable with the terminal apparatus.

20 Claims, 23 Drawing Sheets

(51) Int. Cl.
*H04W 36/00* (2009.01)
*H04W 88/14* (2009.01)

(56) References Cited

OTHER PUBLICATIONS

3GPP SA WG2 S2-162999 (Year: 2016).*
Approved_Report_v100_SA2_115.pdf (Year: 2016).*
"3rd Generation Partnership Project; Technical Specification Group Services and System Aspects; Study on Architecture for Next Generation System (Release 14)", 3GPP TR 23.799 V1.0.2 (Sep. 2016).
Samsung, "Solution for key issue 3: mobility support for interworking between the NextGen core and EPC", S2-162721, SA WG2 Temporary Document, SA WG2 Meeting #115.
European Patent Office, Supplementary European Search Report and European Search Opinion of Application No. 17858074.2, dated Apr. 28, 2020, 10 pages.

3$^{rd}$ Generation Partnership Project, TR 23.799—Study on Architecture for Next Generation System (Release 14), v0.4.0, Apr. 27, 2016, 96 pages.
New Zealand Intellectual Property Office, Patent Examination Report 3 in related to New Zealand Patent Application No. 752976, dated Jun. 15, 2021 (6 pages).
3GPP TR 23.799 V0.4.0 (Apr. 2016); 3$^{rd}$ Generation Partnership Project; Technical Specification Group Services and System Aspects; Study on Architecture for Next Generation System (Release 14). (96 pages).
Catt, "Principle of SSC mode Selection," 3GPP SA WG2 Meeting #115, May 23-27, 2016, Nanjing, P.R. China; S2-162612 (4 pages).
Cisco and CATT, "Clarifications for session and service continuity framework," 3GPP SA WG2 Meeting #115, May 23-27, 2016, Nanjing, P.R. China; S2-163118 (8 pages).
Chinese Patent Office, Office Action in CN Application No. 201780061859.5, dated Jun. 17, 2021 (6 pages).
Cisco, "Clarifications for session and service continually framework,";3GPP SA WG2 Meeting#115 S2-162999, May 23-27, 2016, Nanjing, P.R. China (8 pages).

* cited by examiner

FIG. 5B

| IMSI |
|---|
| EMM State |
| GUTI |
| ME Identity |

FIG. 5C

| APN in Use |
|---|
| Assigned Session Type |
| IP Address(es) |
| Default Bearer |

| EPS Bearer ID |
|---|
| TI |
| TFT |

| |
|---|
| IMSI |
| MSISDN |
| MM State |
| GUTI |
| ME Identity |
| UE Radio Access Capability |
| UE Network Capability |
| MS Network Capability |
| Access Restriction |
| MME F-TEID |
| SGW F-TEID |
| eNB Address |
| MME UE S1AP ID |
| eNB UE S1AP ID |
| NR node Address |
| NR node ID |
| WAG Address |
| WAG ID |

| APN in Use |
|---|
| Assigned Session Type |
| IP Address(es) |
| PGW F-TEID |
| SCEF ID |
| Default bearer |

FIG. 9D

| EPS Bearer ID |
|---|
| TI |
| TFT |
| SGW F-TEID |
| PGW F-TEID |
| MME F-TEID |
| eNB address |
| NR node address |
| WAG address |
| eNB ID |
| NR node ID |
| WAG ID |

FIG. 11B

| |
|---|
| IMSI |
| ME Identity |
| MSISDN |
| MME F-TIED |
| SGW F-TIED |

FIG. 11C

| |
|---|
| APN in Use (Data Network Identifier) |
| Assigned Session Type (Assigned PDN Type) |
| SGW F-TEID |
| PGW F-TEID |
| Default Bearer |
| IP Address(es) |

FIG. 11D

| |
|---|
| EPS Bearer ID |
| TFT |
| PGW F-TEID |
| SGW F-TEID |
| eNB F-TEID |
| MME address |
| NR node address |
| WAG address |
| MME ID |
| NR node ID |
| WAG ID |

FIG. 12B

| IMSI |
| ME Identity |
| MSISDN |
| RAT type |

FIG. 12C

| APN in Use |

FIG. 12D

| Assigned Session Type |
| IP Address(es) |
| SGW F-TEID |
| PGW F-TEID |
| Default Bearer |

FIG. 12E

| EPS Bearer ID |
| TFT |
| SGW F-TEID |
| PGW F-TEID |

| User Identity |
|---|
| APN in Use |
| EPS Bearer ID |
| Serving Node Information |

FIG. 13B

TERMINAL APPARATUS, MOBILITY MANAGEMENT ENTITY (MME), CONTROL PLANE FUNCTION (CPF), AND COMMUNICATION CONTROL METHOD

TECHNICAL FIELD

The present invention relaters to a terminal apparatus, a Mobility Management Entity (MME), a Control Plane Function (CPF), and a communication control method. This application claims priority based on JP 2016-198806 filed on Oct. 7, 2016 in Japan, the contents of which are incorporated herein in its entirety by reference.

BACKGROUND ART

The 3rd Generation Partnership Project (3GPP), which undertakes activities for standardizing recent mobile communication systems, discusses System Architecture Evolution (SAE), which is the system architecture of Long Term Evolution (LTE). The 3GPP is in the process of creating specifications for the Evolved Packet System (EPS), which realizes an all-Internet Protocol (IP) architecture. Note that a core network constituting the EPS is called an Evolved Packet Core (EPC).

In recent years, the 3GPP also discusses next generation communication technology or system architecture of the 5th Generation (5G) mobile communication system that is a next generation mobile communication system, where Architecture and Security for Next Generation System (NextGen) is discussed as a next generation communication technology. In NextGen, technical problems for connecting various terminals to a cellular network are extracted to standardize solutions.

For example, requirement conditions include optimization and diversification of a communication procedure for supporting a continual mobile communication service depending on a terminal supporting various access networks, optimization of a system architecture suitable for the optimization and diversification of the communication procedure, and the like.

CITATION LIST

Non Patent Literature

NH: 1: 3GPP TR 23.799; Technical Specification Group Services and System. Aspects; Study on Architecture for Next Generation System; (Release 14)

SUMMARY OF INVENTION

Technical Problem

In NextGen, optimization of session management in the mobile communication service between a terminal and a network device is discussed.

To be more specific, providing the continual mobile communication service suitable for the terminal or the network device by diversifying the access network used for a session establishment procedure or a communication procedure of user data has been discussed.

However, means for establishing a session for the terminal or network device supporting various access networks, and means for realizing communication means for various user data and the like are not made clear.

The present invention has been made in view of the above described circumstances, and has an object to provide means for the session establishment, communication control means for realizing the communication of various user data, and the like.

Solution to Problem

A terminal apparatus according to an embodiment of the present invention includes: a transmission and/or reception unit configured to perform a detach procedure for a first core network, and after the detach procedure, performs an attach procedure for a second core network; and a control unit configured to change, based on completion of the detach procedure, a connection destination from the first core network to the second core network, wherein the transmission and/or reception unit receives a detach request message from a Control Plane Function (CPF) in the detach procedure, and transmits an attach request message to a Mobility Management Entity (MME) in the attach procedure, the detach request message includes information for indicating that the connection destination is to be changed, and the attach request message includes information for indicating a handover.

A Control Plane Function (CPF) according to an embodiment of the present invention includes: a transmission and/or reception unit configured to perform a detach procedure; and a control unit configured to release, based on completion of the detach procedure, a connection with a terminal apparatus to change a connection destination of the terminal apparatus from a first core network to a second core network, wherein the transmission and/or reception unit transmits a detach request message to the terminal apparatus in the detach procedure, and the detach request message includes information for indicating that the connection destination of the terminal changed.

A Mobility Management Entity (MME) according to an embodiment of the present invention includes: a transmission and/or reception unit configured to perform an attach procedure; and a control unit configured to connect, based on completion of the attach procedure, with a terminal apparatus to change a connection destination of the terminal apparatus from the first core network to the second core network, wherein the transmission and/or reception unit receives an attach request message from the terminal apparatus in the attach procedure, and the attach request message includes information for indicating a handover.

A communication control method for a terminal apparatus according to an embodiment of the present invention includes the steps of: performing a detach procedure for a first core network; after the detach procedure, performing an attach procedure for a second core network; and changing, based on completion of the detach procedure, a connection destination from the first core network to the second core network, wherein the communication control method further comprises the step of receiving a detach request message from a Control Plane Function (CPF) in the detach procedure, the communication control method further comprises the step of transmitting an attach request message to a Mobility Management Entity (MME) in the attach procedure, the detach request message includes information for indicating that the connection destination is to be changed, and the attach request message includes information for indicating a handover.

A communication control method for a Control Plane Function (CPF) according to an embodiment of the present invention includes the steps of: performing a detach procedure; and releasing, based on completion of the detach procedure, a connection with a terminal apparatus to change a connection destination of the terminal apparatus from the first core network to the second core network, wherein the communication control method further comprises the step of transmitting a detach request message to the terminal apparatus in the detach procedure, and the detach request message includes information for indicating that the connection destination is to be changed.

A communication control method for a Mobility Management Entity (MME) according to an embodiment of the present invention includes the steps of: performing an attach procedure; and connecting, based on completion of the attach procedure, with a terminal apparatus to change a connection destination of the terminal apparatus from the first core network to the second core network, wherein the communication control method further comprises the step of receiving an attach request message from the terminal apparatus in the attach procedure, and the attach request message includes information for indicating a handover.

Advantageous Effects of Invention

According to the present invention, a terminal can simultaneously connect to a core network via multiple access networks, and furthermore, communication of various user data can be realized. A core network can accommodate a terminal apparatus connected to various access networks, and can further provide a mobile communication service.

BRIEF DESCRIPTION OF DRAWINGS

FIGS. 5B to 5D are diagrams illustrating a storage unit of the UE.

FIG. 8B is a diagram illustrating a storage unit of the MME/CPF.

FIGS. 9C and 9D are diagrams illustrating the storage unit of the MME/CPF.

FIGS. 11B to 11D are diagrams illustrating a storage unit of the SGW.

FIGS. 12B to 12E are diagrams illustrating a storage unit of the PGW/UPGW.

FIG. 13B is a diagram illustrating a storage unit of the SCEF.

DESCRIPTION OF EMBODIMENTS

Hereinafter, embodiments for carrying out the present invention will be described with reference to the drawings. Note that as an example, the present embodiment describes an embodiment of a mobile communication system to which the present invention is applied.

1. Embodiment 1.1. System Overview

Figure 1:
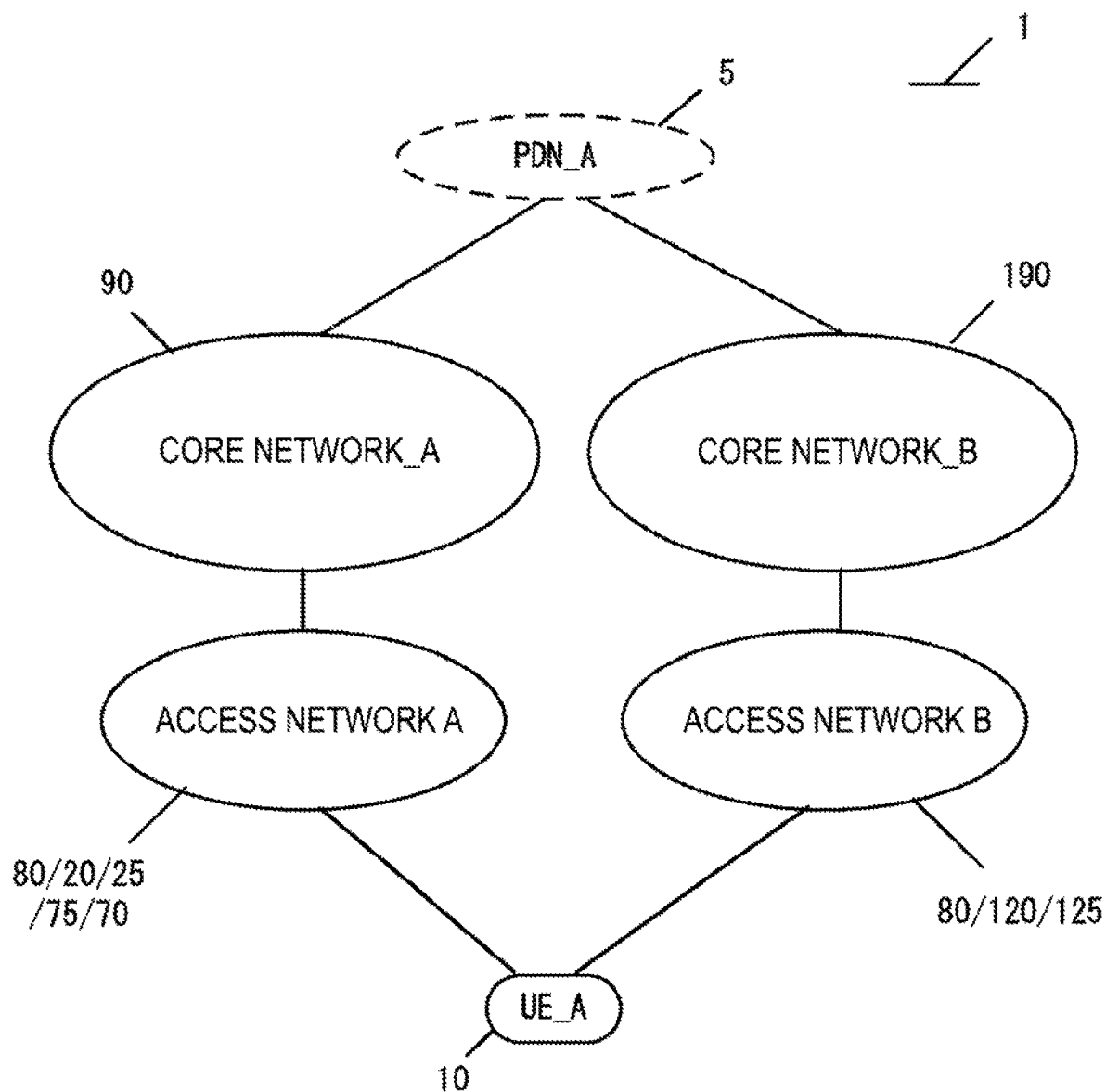
FIG. 1 is a diagram illustrating an overview of a mobile communication system.

FIG. 1 is a diagram illustrating an overview of a mobile communication system according to the present embodiment. As illustrated in FIG. 1, a mobile communication system 1 includes a mobile terminal apparatus UE_A 10, an access network_A, an access network_B, a core network_A 90, a core network_B 190, and a Packet Data Network (PDN)_A 5. Here, the UE_A 10 may be any wirelessly connectable terminal apparatus, and may be a User Equipment (UE), a Mobile Equipment (ME), a Mobile Station (MS), a Cellular Internet of Things (CIoT) terminal (CIoT UE), or the like. Furthermore, a core network may be the core network_A 90 and/or the core network_B 190, and an access network may be the access network_A and/or the access network_B.

The UE_A 10 is capable of connecting to the access network and/or the core network. Furthermore, the UE_A 10 is capable of connecting to the PDN_A 5 via the access network and/or the core network, and further transmits and/or receives user data to and/or from the PDN_A 5. Note that the user data may be data transmitted and/or received between the UE_A 10 and the PDN_A 5. Furthermore, transmission and/or reception (communication) of the user data may be performed using a Protocol Data Unit or Packet Data Unit (PDU) session, or using a Packet Data Network Connection (PDN connection). Furthermore, the communication of the user data may not be limited to Internet Protocol (IP) communication, but may be non-IP communication.

Here, the PDU session or the PDN connection (hereinafter, also referred to as the PDN connectivity) is connectivity established between the UE_A 10 and the PDN_A 5 for providing a PDU connectivity service to transmit and/or receive the user data between the UE_A 10 and the PDN_A 5, or the like. To be more specific, the PDU session or the PDN connection may be connectivity established between the UE_A 10 and an external gateway. Here, the external gateway may be a device connecting the core network such as a Packet Data Network Gateway (PGW)_A 30, a User Plane Gateway (UPGW)_A 130, and a Service Capability Exposure Function (SCEF)_A 46 with the PDN_A 5.

The PDU session or the PDN connection may be a communication path established for transmitting and/or receiving the user data between the UE_A 10 and the core network and/or PDN_A 5, or a communication path for transmitting and/or receiving the PDU. Furthermore, the PDU session or the PDN connection may be a session established between the UE_A 10 and the core network and/or PDN_A 5, or may be a logical communication path including a transfer path such as one or multiple bearers and the like between devices in the mobile communication system 1. To be more specific, the PDN connection may be a connection established by the UE_A 10 between the core network_A 90 and the external gateway, or a connection established between the UE_A 10 and the PGW_A 30 and/or SCEF_A 46. Furthermore, the PDU session may be a connection established by the UE_A 10 between the core network_B 190 and the external gateway, a connection established between the UE_A 10 and the UPGW_A 130, or a connection such as a Packet Data Network Connection (PDN connection).

Note that the PDN connection may be connectivity and/or a connection between the UE_A 10 and the PGW_A 30 via an evolved Node B (eNB)_A 45 and/or a Serving Gateway (SGW)_A 35, or connectivity and/or a connection between the UE_A 10 and the SCEF_A 46 via the eNB_A 45 and/or an MME_A 40. Furthermore, the PDU session may be connectivity and/or a connection between the UE_A 10 and the UPGW_A 130 via a NR node_A 122.

Note that the UE_A 10 can transmit and/or receive the user data to and/or from a device located in the PDN_A 5 such as an application server by using the PDU session or the PDN connection. In other words, the PDU session or the PDN connection can transfer the user data transmitted and/or received between the UE_A 10 and the device located in the PDN_A 5 such as an application server. Furthermore, the devices (the UE_A 10, devices in the access network, and/or devices in the core network) may associate the PDU session or the PDN connection with one or multiple pieces of identification information for management. Note that these pieces of identification information may include at least one of an Access Point Name (APN), a Traffic Flow Template (UT), a session type, application identification information, identification information of the PDN_A 5, Network Slice Instance (NSI) identification information, and Dedicated Core Network (DCN) identification information, and access network identification information, or may further include another information. Furthermore, in a case that multiple PDU sessions or PDN connections are established, respective pieces of identification information associated with the PDU sessions or the PDN connections may have the same content or different contents.

IP communication is communication of data using IP, and is data communication achieved through transmitting and/or receiving an IP packet which is given an IP header. Note that a payload section constituting an IP packet may contain the user data transmitted and/or received by the UE_A 10. Non-IP communication is communication not using IP, and is data communication achieved through transmitting and/or receiving data which is not given an IP header. For example, non-IP communication may be the data communication achieved through transmitting and/or receiving application data not given the IP packet, or may transmit and/or receive the user data transmitted and/or received by the UE_A 10 to which another header such as a MAC header and an Ethernet (trade name) frame header is given.

Furthermore, the PDN_A 5 may be a Data Network (DN) to provide a communication service to the UE_A 10. Note that the DN may be configured as a packet data service network, or configured for each service. Furthermore, the PDN_A 5 may include a connected communication terminal. Therefore, connecting with the PDN_A 5 may be connecting with the communication terminal or a server device located in the PDN_A 5. Furthermore, the transmission and/or reception of the user data to and/or from the PDN_A 5 may be transmission and/or reception of the user data to and/or from the communication terminal or server device located in the PDN_A 5. Note that the PDN_A 5 may be represented by the DN, or the DN may be represented by the PDN_A 5.

Furthermore, the access network is a radio network connecting with the UE_A 10 and/or the core network. The access network may be a 3GPP access network, or a non-3GPP access network. Note that the 3GPP access network may be an Evolved Universal Terrestrial Radio Access Network (E-UTRAN) A 80, a Universal Terrestrial Radio Access Network (UTRAN)_A 20, a GSM (trade name) EDGE Radio Access Network (GERAN)_A 25, and a Next Generation Radio Access Network (NextGen RAN)_A 120, and the non-3GPP access network may be a WLAN ANb 75, a WLAN ANa 70, and an WLAN ANc 125. Note that the UE_A 10 may connect with the access network in order to connect to the core network, or may connect to the core network via the access network.

Furthermore, the core network is an IP mobile communication network run by a Mobile Network Operator to which the access network and/or the PDN_A 5 connects. The core network may be a core network for the mobile network operator that runs and manages the mobile communication system 1, or may be a core network for a virtual mobile network operator such as a Mobile Virtual Network Operator (MVNO) or a Mobile Virtual Network Enabler (MVNE), or a virtual mobile communication service provider. Note that the core network_A 90 may be an Evolved Packet Core (EPC) constituting an Evolved Packet System (EPS), and the core network_B 190 may be a Next Generation (NextGen) Core (NGC) constituting a Next Generation System (NextGen System (NGS)). In contrast, the EPC may be the core network_A 90, and the NGC may be the core network_B 190. Furthermore, the core network_B 190 may be a core network for a system providing the 5G communication service. Note that the core network_B 190 is not limited to that above described, but may be a network for providing a mobile communication service.

Next, a configuration example of the core network will be described. In the present embodiment, configuration examples of the core network_A 90 and core network_B 190 will be described. Note that the core network may the core network_A 90, the core network_B 190, or a combination thereof. The core network_A 90 may be an EPC, and the core network_B 190 may be a NextGen Core (NGC).

Figure 2A:
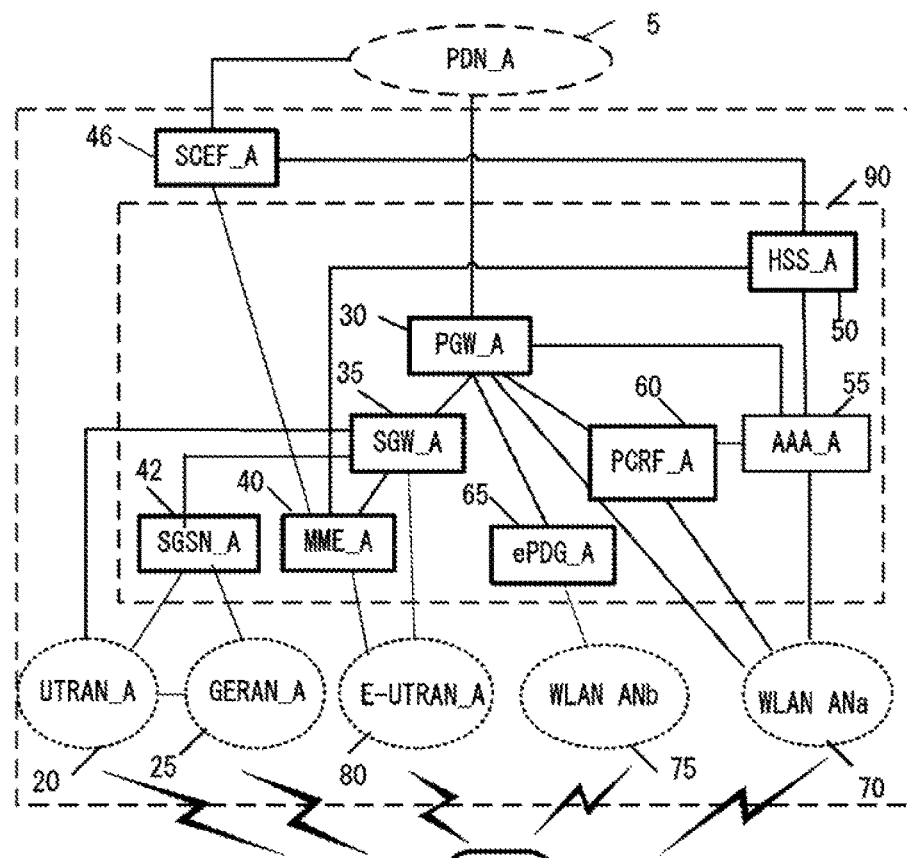
FIGS. 2A and 2B are diagrams illustrating an example of a configuration or the like of a core network and an access network_A in the mobile communication system.
Figure 2B:
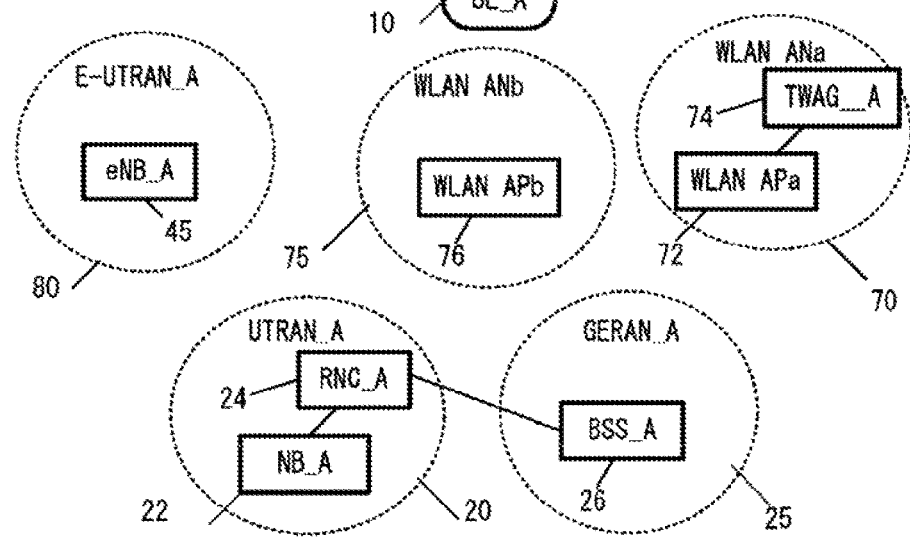

FIGS. 2A and 2B illustrate an example of the configuration of the core network_A 90. The core network_A 90 in FIG. 2A includes a Home Subscriber Server (HSS)_A 50, an Authentication Authorization Accounting (AAA)_A 55, a Policy and Charging Rules Function (PCRF)_A 60, the PGW_A 30, an enhanced Packet Data Gateway (ePDG)_A 65, the SGW_A 35, the Mobility Management Entity (MME)_A 40, a Serving GPRS Support Node (SGSN)_A 42, and the SCEF_A 46. The core network_A 90 is capable of connecting to multiple radio access networks (E-UTRAN_A 80, WLAN ANb 75, WLAN ANa 70, UTRAN_A 20, and GERAN_A 25).

Such a radio access network may be configured to connect to multiple different access networks, or may be configured to connect to either one of the access networks. Moreover, the UE_A 10 is capable of wirelessly connecting to the radio access network. Moreover, the access network connectable in a WLAN access system can be constituted by a WLAN Access Network b (WLAN ANb 75) that connects to the core network via the ePDG_A 65, or a WLAN Access Network a (WLAN ANa 70) that connects to the PGW_A 30, the PCRF_A 60, and the AAA_A 55. Note that each device has a similar configuration to those of the devices of the related art in a mobile communication system using EPS, and thus detailed descriptions thereof will be omitted. Each device will be described briefly hereinafter.

The PGW_A 30 is connected to the PDN_A 5, the SGW_A 35, the ePDG_A 65, the WLANANa 70, the PCRF_A 60, and the AAA_A 55, and serves as a relay device configured to transfer user data by functioning as a gateway between the PDN_A 5 and/or DN and the core network_A 90. Note that the PGW_A 30 may serve as a gateway for the IP communication and/or non-IP communication. The PGW_A 30 may have a function to transfer the IP communication, or may have a function to convert between the non-IP communication and the IP communication. Note that multiple gateways like this may be located in the core network_A 90. Furthermore, the multiple gateways located may serve as gateways connecting the core network_A 90 with a single DN.

Note that a User Plane (U-Plane) may be a communication path for transmitting and/or receiving the user data, and may be configured to include multiple bearers. Furthermore, a Control Plane (C-Plane) may be a communication path for transmitting and/or receiving a control message, and may be configured with multiple bearers.

The PGW_A 30 may be connected to an UP function and a Policy function, or may be connected to the UE_A 10 via the U-Plane. Moreover, the PGW_A 30 may be configured integrally with the UPGW_A 130.

The SGW_A 35 is connected to the PGW_A 30, the MME_A 40, the E-UTRAN_A 80, the SGSN_A 42, and the UTRAN_A 20, and serves as a relay device configured to transfer user data by functioning as a gateway between the core network_A 90 and the 3GPP access network (the UTRAN_A 20, the GERAN_A 25, the E-UTRAN_A 80).

The SGW_A 35 may be an UP function which has a contact with the access network and transfers the user data, or may be the User Plane Gateway (UPGW)_A 130 that is a gateway for transferring the user data between the access network and the core network.

The MME_A 40 is connected to the SGW_A 35, the access network, the HSS_A 50, and the SCEF_A 46, and is a control device that performs location information management including mobility management and access control for the UE_A 10 via the access network. The MME_A 40 may further include a function as a session management device to manage a session established by the UE_A 10. Multiple control devices like this may be located in the core network_A 90, and, for example, a location management device different from the MME_A 40 may be configured. The location management device different from the MME_A 40 may be connected with the SGW_A 35, the access network, the SCEF_A 46, and the HSS_A 50, similar to the MME_A 40.

Furthermore, in a case that multiple MMEs are included in the core network_A 90, the MMEs may be connected to each other. With this configuration, the context of the UE_A 10 may be transmitted and/or received between the MMEs. In this way, the MME_A 40 is a management device to transmit and/or receive the control information concerning the mobility management and session management to and/or from the UE_A 10, and in other words, may be a control device for a Control Plane (C-Plane; CP).

The example is described in which the MME_A 40 is configured to be included in the core network_A 90, but the MME_A 40 may be a management device configured in one or multiple core networks, DCNs, or NSIs, or may be a management device connected to one or multiple core networks, DCNs, or NSIs. Here, multiple DCNs or NSIs may be run by a single network operator, or network operators respectively different from each other.

The MME_A 40 may be a relay device configured to transfer user data as a gateway between the core network_A 90 and the access network. Note that the user data transmitted and/or received by the MME_A 40 as a gateway may be small data.

The MME_A 40 may be a NF serving the mobility management of the UE_A 10 or the like, a NF serving the session management of the PDU session or the like, or a NF managing one or multiple NSIs. The MME_A 40 may be a NF serving one or multiple of these. Note that the NF may be one or multiple devices located in the core network_A 90, a CP function (hereinafter, also referred to as a Control Plane Function (CPF) or a Control Plane Network Function) for the control information and/or control message, or a common CP function shared between multiple network slices.

Here, the NF is a processing function configured in a network. Specifically, the NF may be a function device such as the MME, the SGW, the PGW, the CPF, and the UPGW, a function such as MM (Mobility Management) and SM (Session Management), or capability information. The NF may be a function device to realize a single function, or a function device to realize multiple functions. For example, a NF to realize the MM function and a NF to realize the SM function may be separately present, or a NF to realize both the MM function and the SM function may be present.

The HSS_A 50 is connected to the MME_A 40, the AAA_A 55, and the SCEF_A 46, and is a managing node configured to manage subscriber information. The subscriber information of the HSS_A 50 is referred to during the access control by the MME_A 40, for example. Moreover, the HSS_A 50 may be connected to the location management device different from the MME_A 40. For example, the HSS_A 50 may be connected to a CPF_A 140.

The AAA_A 55 is connected to the PGW 30, the HSS_A 50, the PCRF_A 60, and the WLANANa 70, and is configured to perform access control for the UE_A 10 connected via the WLAN ANa 70.

The PCRF_A 60 is connected to the PGW_A 30, the WLAN ANa 75, the AAA_A and the PDN_A 5, and is configured to perform QoS management on data delivery. For example, the PCRF_A 60 manages QoS of a communication path between the UE_A 10 and the PDN_A 5. The PCRF_A 60 may be a device to create and/or manage a Policy and Charging Control (PCC) rule used by each data for transmitting and/or receiving the user data and/or a routing rule.

The PCRF_A 60 may be a Policy function to create and/or manage a policy. To be more specific, the PCRF_A 60 may be connected to the UP function.

The ePDG_A 65 is connected to the PGW_A 30 and the WLAN ANb 75 and is configured to deliver the user data by functioning as a gateway between the core network_A 90 and the WLAN ANb 75.

The SGSN_A 42 is connected to the UTRAN_A 20, the GERAN_A 25, and the SGW_A 35 and is a control device for location management between a 3G/2G access network (UTRAN/GERAN) and the LTE access network (E-UTRAN). In addition, the SGSN_A 42 has functions of selecting the PGW and the SGW, managing a time zone of the UE_A 10, and selecting the MME_A 40 at the time of handover to the E-UTRAN.

The SCEF_A 46 is connected to the PDN_A 5, the MME_A 40, and the HSS_A 50, and is a relay device configured to transfer the user data as a gateway interfacing the PDN_A 5 and/or the DN and the core network_A 90. Note that the SCEF_A 46 may serve as a gateway for the non-IP communication. The SCEF_A 46 may have a function to convert between non-IP communication and IP communication. Multiple gateways like this may be located in the core network_A 90. Furthermore, multiple gateways connecting the core network_A 90 with a single PDN_A 5 and/or DN may be also located. Note that the SCEF_A 46 may be configured outside or inside the core network.

As illustrated in FIG. 2B, each radio access network includes devices to which the UE_A 10 is actually connected (such as a base station apparatus and an access point device), and the like. The devices used in these connections can be thought of as devices adapted to the radio access networks.

In the present embodiment, the E-UTRAN_A 80 is an access network for the Long Term Evolution (LTE) and is configured to include the eNB_A 45. The eNB_A 45 is a radio base station to which the UE_A 10 connects through an Evolved Universal Terrestrial Radio Access (E-UTRA), and the E-UTRAN_A 80 may be configured to include one or multiple eNBs_A 45. Furthermore, the multiple eNBs may be connected to each other.

The UTRAN_A 20 is a 3G access network, and is configured to include a Radio Network Controller (RNC)_A 24 and a Node B (NB)_A 22. The NB_A 22 is a radio base station to which the UE_A 10 connects through a Universal Terrestrial Radio Access (UTRA), and the UTRAN_A 20 may be configured to include one or multiple radio base stations. Furthermore, the RNC_A 24 is a control unit configured to connect the core network_A 90 and the NB_A 22, and the UTRAN_A 20 may be configured to include one or multiple RNCs. Moreover, the RNC_A 24 may be connected to one or multiple NBs_A 22. In addition, the RNC_A 24 may be connected to a radio base station (Base Station Subsystem (BSS)_A 26) included in the GERAN_A 25.

The GERAN_A 25 is a 2G access network, and is configured to include the BSS_A 26. The BSS_A 26 is a radio base station which the LTE_A 10 connects through GSM (trade name)/EDGE Radio Access (GERA), and the GERAN_A 25 may be configured to include one or multiple BSSs_A 26. The multiple BSSs_A 26 may be connected to each other. The BSS_A 26 may be connected to the RNC_A 24.

The WLAN ANa 70 is a radio LAN access network, and is configured to include a Wireless Local Area Network Access Point (WLAN AP) a 72 and a Trusted WLAN Access Gateway (TWAG)_A 74. The WLAN APa 72 is a radio base station to which the UE_A 10 connects in the WLAN access system trusted by the operator providing the core network_A 90, and the WLAN ANa 70 may be configured to include one or multiple radio base stations. The TWAG_A 74 serves as a gateway between the core network_A 90 and the WLAN ANa 70. The WLAN APa 72 and the TWAG_A 74 may be configured as a single device. Even in a case that the operator providing the core network_A 90 and the operator providing the WLAN ANa 70 are different, such a configuration can be implemented through contracts and agreements between the operators.

The WLAN ANb 75 is a radio LAN access network, and is configured to include a WLAN APb 76. The WLAN APb 76 is a radio base station to which the UE_A 10 connects in the WLAN access system in a case that no trusting relationship is established with the operator providing the core network_A 90, and the WLAN ANb 75 may be configured to include one or multiple radio base stations. In this manner, the WLAN ANb 75 is connected to the core network_A 90 via the ePDG_A 65, which is a device included in the core network_A 90, serving as a gateway. The ePDG_A 65 has a security function for ensuring security.

Figure 3A:
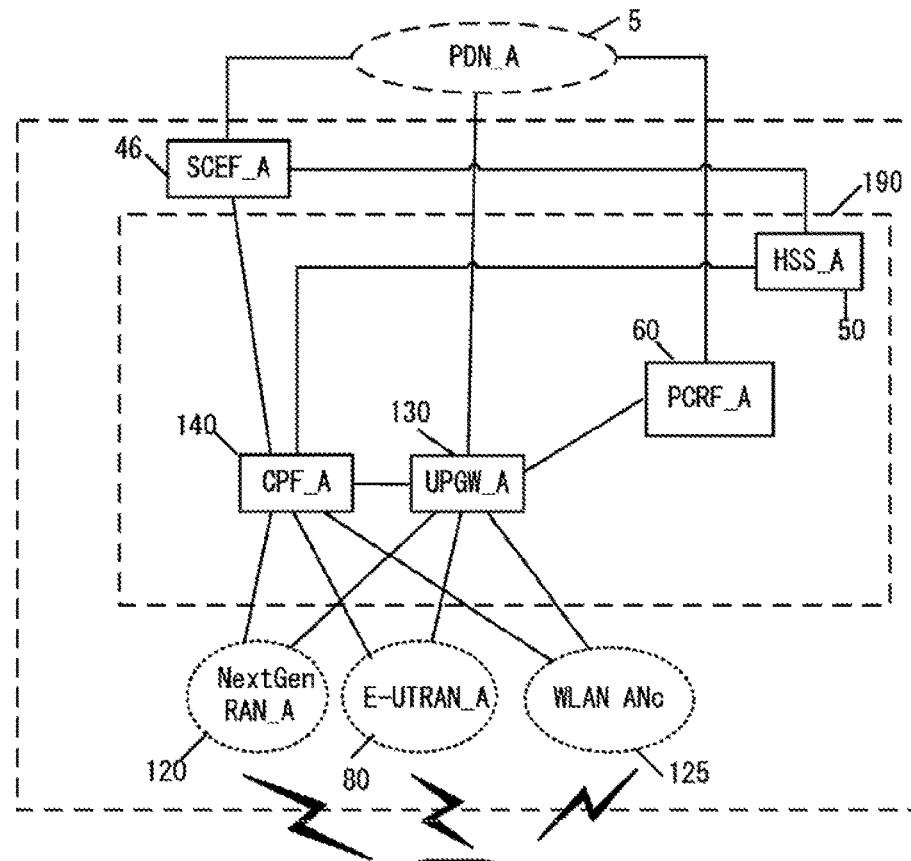
FIGS. 3A and 3B are diagrams illustrating an example of a configuration or the like of a core network and an access network_B in the mobile communication system.
Figure 3B:
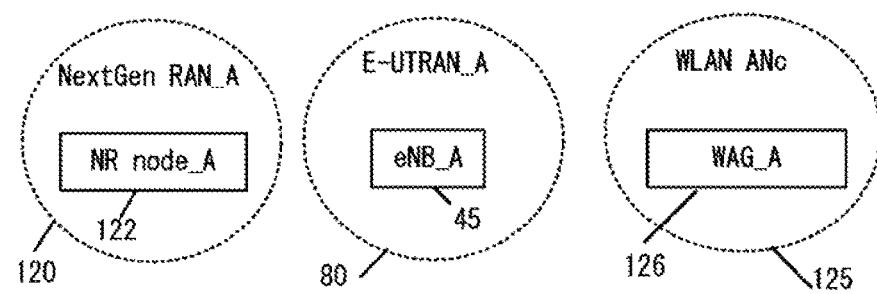

Next, an example of a configuration of the core network_B 190 will be described FIGS. 3A and 3B illustrate an example of the configuration of the core network_B 190. The core network_B 190 in FIG. 3A includes the HSS_A 50, the PCRF_A 60, a User Plane Gateway (UPGW)_A 130, a Control Plane Function (CPF)_A 140, and the SCEF_A 46.

The core network_B 190 is capable of connecting to multiple radio access networks (E-UTRAN_A 80, NextGen RAN_A 120, and WLAN ANc 125). Such a radio access network may be configured to connect to multiple different access networks, or may be configured to connect to either one of the access networks. Moreover, the UE_A 10 is capable of wirelessly connecting to the radio access network.

Furthermore, the E-UTRAN_A 80 and the NextGen RAN_A 120 can be configured as access networks connectable in a 3GPP access system. The WLAN access network c (WLAN ANc 125) that connects to the CPF_A 140 and the UPGW_A 130 can be configured as an access network connectable in the WLAN access system. Each device will be described briefly hereinafter.

The UPGW_A 130 is a device connected to the PDN_A 5, the PCRF_A 60, the CPF_A 140, the E-UTRAN_A 80, the NextGen RAN_A 120, and the WLAN ANc 125, and serves as a relay device configured to transfer the user data by functioning as a gateway between the PDN_A 5 and/or DN and the core network_B 190. Note that the UPGW_A 130 may serve as a gateway for the IP communication and/or non-IP communication. The UPGW_A 130 may have a function to transfer the IP communication, or may have a function to convert between the non-IP communication and the IP communication. Multiple gateways like this may be located in the core network_B 190. Furthermore, the multiple gateways located may serve as gateways connecting the core network_B 190 with a single DN. Note that the UPGW_A 130 may have connectivity with another NF to connect to each device via another NF.

The CPF_A 140 is a device connected to the UPGW_A 130, the E-UTRAN_A 80, the NextGen RAN_A 120, the WLAN ANc 125, the HSS_A 50, and the SCEF_A 46. The CPF_A 140 may be a NF serving the mobility management of the UE_A 10 or the like, a NF serving the session management of the PDU session, or a NF managing one or multiple NSIs. The CPF_A 140 may be a NF serving one or multiple of these roles. Note that the NF may be one or multiple devices located in the core network_B 190, a Control Plane Function or Control Plane Network Function (CP function) for the control information and/or control message, or a common CP function shared between multiple network slices. Note that the CPF_A 140 may have connectivity with another NF to connect to each device via another NF. The CPF may be configured as a control plane device to control the Control plane.

Note that each device may be configured similar to each of the devices in the core network_B 190, and the configuration and roles of the SCEF_A 46, the HSS_A 50, and the PCRF_A 60 may be the same as those described for the core network_A 90.

As illustrated in FIG. 3B, each radio access network includes devices to which the UE_A 10 is actually connected (such as a base station apparatus and an access point device), and the like. The devices used in these connections can be thought of as devices adapted to the radio access networks.

In the present embodiment, the NextGen RAN_A 120 is a 5G access network, and is configured to include a New Radio Access Technology node (NR node)_A 122. The NR node_A 122 is a radio base station to which the UE_A 10 connects through the Next Generation Radio Access (NextGen RA), and the NextGen RAN_A 120 may be configured to include one or multiple NR nodes_A 122.

The NextGen RAN_A 120 may be an access network configured to include the E-UTRA_A 80 and/or the NextGen RAN_A 120. In other words, the NextGen RAN_A 120 may include the eNB_A 45, the NR node_A 122, or both the eNB_A 45 and the NR node_A 122. In this case, the eNB_A 45 and the NR node_A 122 may be the same devices. Therefore, the NR node_A 122 can be substituted with the eNB_A 45.

The WLAN ANc 125 is a radio LAN access network, and is configured to include a WAG_A 126. The WLAN Access Gateway (WAG)_A 126 is a radio base station to which the UE_A 10 connects through a radio LAN access, and the WLAN ANc 125 may be configured to include one or multiple WAGs_A 126. The WAG_A 126 may serve as a gateway between the core network_B 190 and the WLAN ANc 125. The WAG_A 126 may have a function unit for the radio base station and a function unit for the gateway which are configured as different devices. Note that the WLAN ANc 125 may have a configuration the same as the WLAN ANa 70 and/or WLAN ANb 75, or different from these.

Note that herein, the UE_A 10 being connected to each radio access network refers to that the UE_A 10 is connected to a base station apparatus, an access point, or the like included in the radio access network, and data, signals, and the like transmitted and/or received also pass through the base station apparatus, the access point, or the like. Note that the control message transmitted and/or received between the UE_A 10 and the core network_B 190 may be the same control message independently from a type of the access network. Therefore, the UE_A 10 and the core network_B 190 transmitting and/or receiving a message to and/or from each other via the NR node_A 122 may mean the same thing as that the UE_A 10 and the core network_B 190 transmit and/or receive a message to and/or from each other via the eNB_A 45 and/or WAG_A 126.

1.2. Device Configuration

First, a description is given of the identification information stored in each device. International Mobile Subscriber Identity (IMSI) is permanent identification information of a subscriber (user), and is identification information assigned to a user using the UE. The IMSI stored by the UE_A 10, the MME_A 40/CPF_A 140, and the SGW_A 35 may be the same as the IMSI stored by the HSS_A 50.

EMM State/MM State indicates a Mobility management mode of the UE_A 10 or MME_A 40/CPF_A 140. For example, the EMM State/MM State may be EMM-REGISTERED mode (registered mode) that the UE_A 10 is registered in the network and/or EMM-DEREGISTERD mode (deregistered mode) that the UE_A 10 is not registered in the network. The EMM State/MM State may be ECM-CONNECTED mode that a connection is held between the UE_A 10 and the core network and/or ECM-IDLE mode that the connection is released. Note that the EMM State/MM State may be information capable of distinguishing a mode that the UE_A 10 is registered in the core network_A 90 from a mode that the UE_A 10 is registered in the core network_B 190.

Globally Unique Temporary Identity (GUTI) is temporary identification information about the UE_A 10. The GUTI is constituted of identification information on the MME_A 40/CPF_A 140 (Globally Unique MME Identifier (GUMMEI)) and identification information on the UE_A 10 in a specific MME_A 40/CPF_A 140 (M-Temporary Mobile Subscriber identity (M-TMSI)). ME Identity is an ID of the UE_A 10 or ME, and may be International Mobile Equipment Identity (IMEI) or IMEI Software Version (IMEISV), for example. MSISDN represents a basic phone number of the UE_A 10. The MSISDN stored by the MME_A 40/CPF_A 140 may be information indicated by a storage unit of the HSS_A 50. Note that the GUTI may include information identifying the CPF_A 140.

MME F-TEID is information identifying the MME_A 40/CPF_A 140. The MME F-TEID may include an IP address of the MME_A 40/CPF_A 140, a Tunnel Endpoint Identifier (TEID) of the MME_A 40/CPF_A 140, or both of them. The IP address of the MME_A 40/CPF_A 140 and the TEID of the MME_A 40/CPF_A 140 may be stored independently from each other. The MME F-TEID may be identification information for user data, or identification information for control information.

SGW F-TEID is information identifying the SGW_A 35. The SGW F-TEID may include an IP address of the SGW_A 35, a TEID of the SGW_A 35, or both of them. The address of the SGW_A 35 and the TEID of the SGW_A 35 may be stored independently from each other. The SGW F-TEID may be identification information for user data, or identification information for control information.

PGW F-TEID is information identifying the PGW_A 30/UPGW_A 130. The PGW F-TEID may include an IP address of the PGW_A 30/UPGW_A 130, a TEID of the PGW_A 30/UPGW_A 130, or both of them. The IP address of the PGW_A 30/UPGW_A 130 and the TEID of the PGW_A 30/UPGW_A 130 may be stored independently from each other. The PGW F-TEID may be identification information for user data, or identification information for control information.

eNB F-TEID is information identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently from each other. The eNB F-TEID may be identification information for user data, or identification information for control information.

The APN may be identification information identifying the core network and an external network such as the DN. The APN can be used also as information to select a gateway such as the PGW_A 30/UPGW_A 130 for connecting to the core network_A 90.

Note that the APN may be identification information identifying such a gateway, or identification information identifying an external network such as the DN. Note that in a case that multiple gateways connecting the core network to the DN are located, multiple gateways selectable according to the APN may be provided. Moreover, one gateway may be selected from among such multiple gateways by another scheme using identification information other than the APN.

UE Radio Access Capability is identification information indicating a radio access capability of the UE_A 10. UE Network Capability includes an algorithm of security supported by the UE_A 10 and a key derivative function. MS Network Capability is information including one or multiple types of information necessary for the SGSN_A 42 to the UE_A 10 having the GERAN_A 25 and/or UTRAN_A 20 function. Access Restriction is registration information for access restriction. eNB Address is an IP address of the eNB_A 45. MME UE S1AP ID is information identifying the IE_A 10 in the MME_A 40/CPF_A 140. eNB UE S1AP ID is information identifying the UE_A 10 in the eNB_A 45.

APN in Use is an APN recently utilized. The APN in Use may be Data Network Identifier. This APN may be configured to include identification information about the network and identification information about a default operator. Furthermore, the APN in Use may be information identifying a DN with which the PDU session is established.

Assigned Session Type is information indicating a PDU session type. The Assigned Session Type may be Assigned PDN Type. The PDU session type may be an IP, or a non-IP. In a case that the PDU session type is an IP, information indicating a PDN type assigned by the network may be further included. Note that the Assigned Session Type may be IPv4, IPv6, or IPv4v6.

Unless otherwise specifically described, the IP Address refers to the IP address assigned to the UE. The IP address may be an IPv4 address, an IPv6 address, or an IPv6 prefix. Note that in a case that the Assigned Session Type indicates a non-IP, an element of the IP Address may not be contained.

SCEF ID is an IP address of the SCEF_A 46 used in the PDU session. Default Bearer is EPS bearer identification information, which is information acquired and/or generated in establishing a PDU session, for identifying a default bearer associated with the PDU session.

EPS Bearer ID is identification information on the EPS bearer. The EPS Bearer ID may be identification information identifying Signalling Radio Bearer (SRB) and/or Control-plane Radio bearer (CRB), or identification information identifying Data Radio Bearer (DRB). Transaction Identifier (TI) is identification information identifying a bidirectional message flow (Transaction). Note that the EPS Bearer ID may be EPS bearer identification information identifying a dedicated bearer. Therefore, the EPS bearer ID may be identification information identifying the EPS bearer different from the default bearer. The TFT indicates all the packet filters associated with the EPS bearer. The TFT is information identifying some pieces of the transmitted and/or received user data, and thus, the UE_A 10 uses the EPS bearer associated with the TFT to transmit and/or receive the user data identified by the TFT. Further in other words, the UE_A 10 uses Radio Bearer (RB) associated with the TFT to transmit and/or receive the user data identified by the TFT. The TFT may associate the user data such as the transmitted and/or received application data with a proper transfer path, and may be identification information identifying the application data. The UE_A 10 may use the default bearer to transmit and/or receive the user data which cannot be identified by the TFT. The UE_A 10 may store in advance the TFT associated with the default bearer.

The Default Bearer is the EPS bearer identification information identifying a default bearer associated with a PDU session. Note that the EPS bearer may be a logical communication path established between the UE_A 10 and the PGW_A 30/UPGW_A 130. The EPS bearer may be a default bearer, or a dedicated bearer. The EPS bearer may be configured to include an RB established between the UE_A 10 and the base station and/or access point in the access network. Furthermore, the RB and the EPS bearer may be associated with each other on a one-to-one basis. Therefore, identification information on the RB may be associated with the identification information on the EPS bearer on a one-to-one basis, or may be the same identification information as on the EPS bearer. Note that the RB may be an SRB and/or CRB, or a DRB. The Default Bearer may be information that the UE_A 10 and/or SGW_A 35 and/or PGW_A 30/UPGW_A 130 acquire from the core network in establishing a PDU session.

User Identity is information identifying a subscriber. The User Identity may be an IMSI, or a MSISDN. The User Identity may also be identification information other than an IMSI or MSISDN. Serving Node Information is information identifying the MME_A 40/CPF_A 140 used in a PDU session, and may be an IP address of the MME_A 40/CPF_A 140.

eNB Address is an IP address of the eNB_A 45. eNB ID is identification information identifying the UE in the eNB_A 45. MME Address is an IP address of the MME_A 40/CPF_A 140. MME ID is information identifying the MME_A 40/CPF_A 140. NR node Address is an IP address of the NR node_A 122. NR node ID is information identifying the NR node_A 122. WAG Address is an IP address of the WAG_A 126. WAG ID is information identifying the WAG_A 126.

The configuration of each device will be described below. Note that some or all of devices described below or functions of units in the devices may operate on physical hardware, or logical hardware which is virtually configured on general-purpose hardware.

1.2.1. Configuration of UE

Figure 4A:
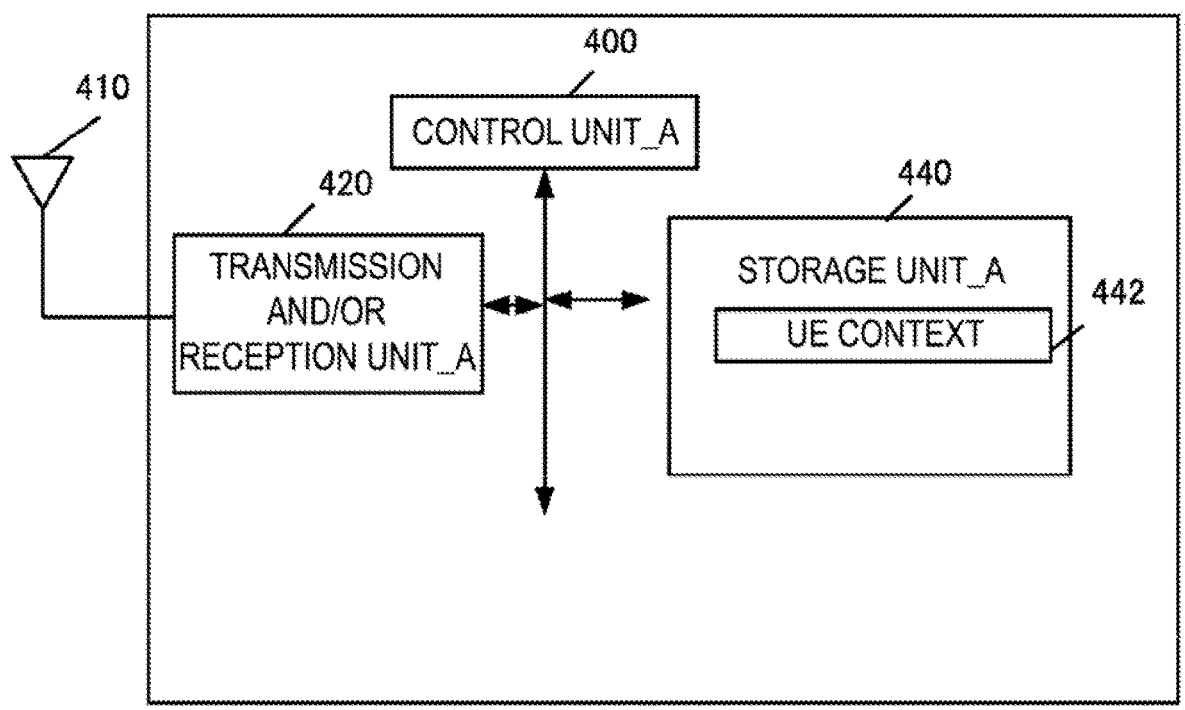
FIG. 4A is a diagram illustrating a device configuration of a UE.

FIG. 4A illustrates a device configuration of the UE_A 10. As illustrated in the drawing, the UE_A 10 includes a transmission and/or reception unit_A 420, a control unit_A 400, and a storage unit_A 440. The transmission and/or reception unit_A 420 and the storage unit_A 440 are connected to the control unit_A 400 via a bus.

The control unit_A 400 is a function unit to control the UE_A 10. The control unit_A 400 implements various processes by reading out various programs stored in the storage unit_A 440 and performing the programs.

The transmission and/or reception unit_A 420 is a function unit through which the UE_A 10 connects to the base station in the access network and/or the access point to connect to the access network. An external antenna_A 410 is connected to the transmission and/or reception unit_A 420. In other words, the transmission and/or reception unit_A 420 is a function unit through which the UE_A 10 connects to the base station in the access network and/or the access point. The transmission and/or reception unit_A 420 is a transmitting and/or receiving function unit through which the UE_A 10 transmits and/or receives the user data and/or control information to and/or from the base station in the access network and/or the access point.

The storage unit_A 440 is a function unit configured to store programs, data, and the like necessary for each operation of the UE_A 10. The storage unit_A 440 is constituted of, for example, a semiconductor memory, a Hard Disk Drive (HDD), or the like. The storage unit_A 440 may store at least identification information and/or control information and/or a flag and/or a parameter included in a control message which is transmitted and/or received in a communication procedure described later. As illustrated in the drawing, the storage unit_A 440 stores a UE context 442. Hereinafter, information elements stored in the storage unit_A 440 will be described. Note that the UE context 442 may include a UE context used to connect to the core network_A 90 and a UE context used to connect to the core network_B 190. The UE context used to connect to core network_A 90 and the UE context used to connect to the core network_B 190 may be stored together or separately.

First, FIG. 5B illustrates information elements included in the UE context stored for each UE. As illustrated in the drawing, the UE context stored for each UE includes IMSI, EMM State, GUTI, and ME Identity.

Next, FIG. 5C illustrates the UE context for each PDU session or PDN connection stored for each PDU session or PDN connection. As illustrated in the drawing, the UE context for each PDU session includes APN in Use, Assigned Session Type, IP Address(es), and Default Bearer.

FIG. 5D illustrates the UE context for each bearer stored in the storage unit of the UE. As illustrated in the drawing, the UE context for each bearer includes EPS Bearer ID, TI, and TFT.

1.2.2. Configuration of eNB/NR Node/WAG

Figure 6A:
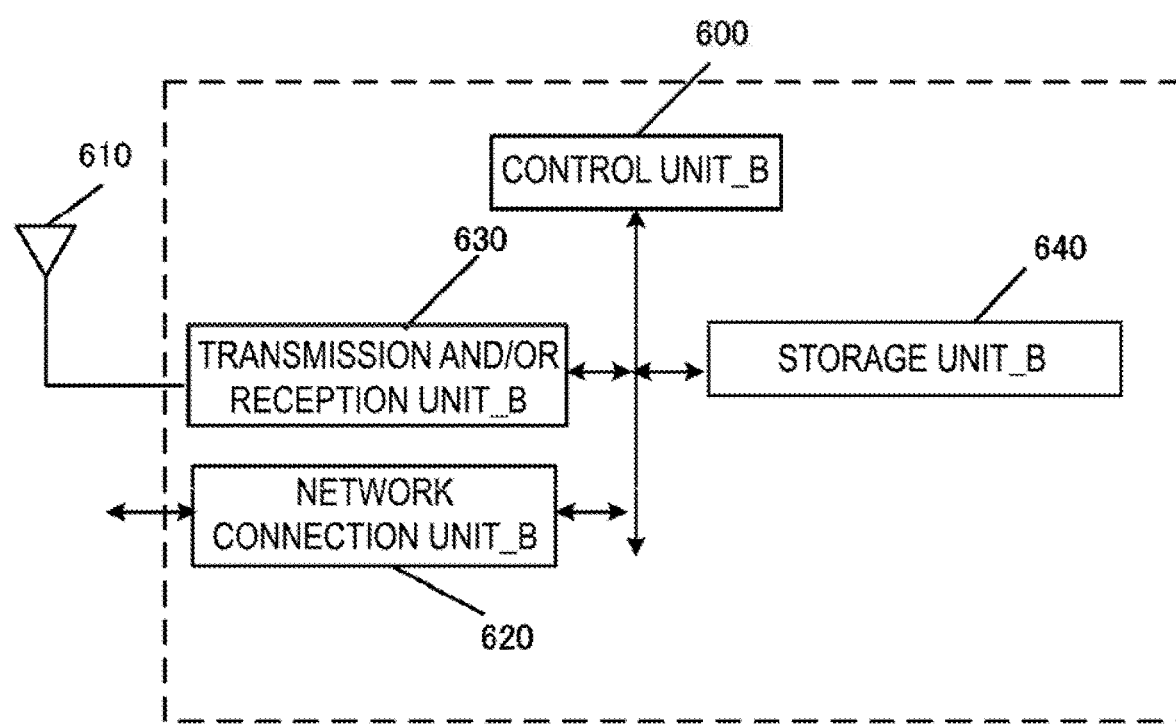
FIG. 6A is a diagram illustrating a device configuration of eNB/NR node/WAG.

A configuration of the eNB_A 45, the NR node_A 122, and the WAG_A 126 will be described below. FIG. 6A illustrates a device configuration of the eNB_A 45, the NR node_A 122, and the WAG_A 126. As illustrated in the drawing, the eNB_A 45, the NR node_A 122, and the WAG_A 126 include a network connection unit_B 620, a transmission and/or reception unit_B 630, a control unit_B 600, and a storage unit_B 640. The network connection unit_B 620, the transmission and/or reception unit_B 630, and the storage unit_B 640 are connected to the control unit_B 600 via a bus.

The control unit_B 600 is a function unit for controlling the eNB_A 45. The control unit_B 600 implements various processes by reading out various programs stored in the storage unit_B 640 and performing the programs.

The network connection unit_B 620 is a function unit through which the eNB_A 45, the NR node_A 122, and the WAG_A 126 connect to the MME_A 40 and/or SGW_A 35. The network connection unit_B 620 is a transmission and/or reception unit through which the eNB_A 45, the NR node_A 122, and the WAG_A 126 transmit and/or receive the user data and/or control information to and/or from the MME_A 40 and/or the SGW_A 35.

The transmission and/or reception unit_B 630 is a function unit through which the eNB_A 45, the NR node_A 122, and the WAG_A 126 connect to the UE_A 10. Furthermore, the transmission and/or reception unit_B 630 is a transmitting and/or receiving function unit for transmitting and/or receiving the user data and/or control information to and/or from the UE_A 10. Furthermore, an external antenna_B 610 is connected to the transmission and/or reception unit_B 630.

The storage unit_B 640 is a function unit for storing programs, data, and the like necessary for each operation of the eNB_A 45, the NR node_A 122, and the WAG_A 126. The storage unit_B 640 is constituted of, for example, a semiconductor memory, a HDD, or the like. The storage unit_B 640 may store at least identification information and/or control information and/or a flag and/or a parameter included in a control message which is transmitted and/or received in a communication procedure described later. The storage unit_B 640 may store these pieces of information as the contexts for each UE_A 10.

1.2.3. Configuration of MME/CPF

Figure 7A:
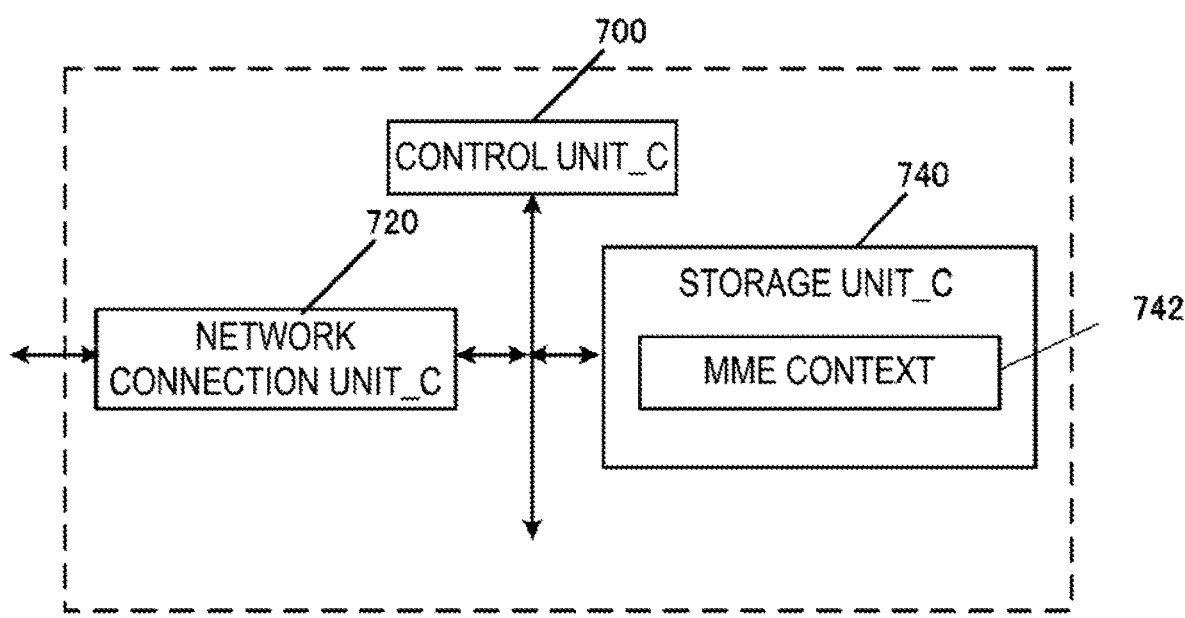
FIG. 7A is a diagram illustrating a device configuration of MME/CPF.

A configuration of the MME_A 40 and the CPF_A 140 will be described below. FIG. 7A illustrates a device configuration of the MME_A 40 and the CPF_A 140. As illustrated in the drawing, the MME_A 40 and the CPF_A 140 include a network connection unit_C 720, a control unit_C 700, and a storage unit_C 740. The network connection unit_C 720 and the storage unit_C 740 are connected to the control unit_C 700 via a bus. Note that functions of these units may operate on physical hardware, or logical hardware which is virtually configured on general-purpose hardware.

The control unit_C 700 is a function unit for controlling the MME_A 40 and the CPF_A 140. The control unit_C 700 implements various processes by reading out various programs stored in the storage unit_C 740 and performing the programs.

The network connection unit_C 720 is a function unit through which the MME_A 40 connects to the base station in the access network and/or the access point in the access network and/or the SCEF_A 46 and/or the HSS_A 50 and/or the SGW_A 35. The network connection unit_C 720 is further a transmission and/or reception unit through which the MME_A 40 transmits and/or receives the user data and/or control information to and/or from the base station in the access network and/or the access point in the access network and/or the SCEF_A 46 and/or the HSS_A 50 and/or the SGW_A 35.

The network connection unit_C 720 is a function unit through which the CPF_A 140 connects to the base station in the access network and/or the access point in the access network and/or the SCEF_A 46 and/or the HSS_A 50 and/or the UPGW_A 130. Furthermore, the network connection unit_C 720 is a transmission and/or reception unit through which the MME_A 40 transmits and/or receives the user data and/or control information to and/or from the base station in the access network and/or the access point in the access network and/or the SCEF_A 46 and/or the HSS_A 50 and/or the UPGW_A 130.

The storage unit_C 740 is a function unit for storing programs, data, and the like necessary for each operation of the MME_A 40 and the CPF_A 140. The storage unit_C 740 is constituted of, for example, a semiconductor memory, a HDD, or the like. The storage unit_C 740 may store at least identification information and/or control information and/or a flag and/or a parameter included in a control message which is transmitted and/or received in a communication procedure described later.

As illustrated in the drawing, the storage unit_C 740 stores an MME context 742. Hereinafter, information elements stored in the storage unit_C 740 will be described. Note that the MME context may be a storage context by the CPF_A 140. FIG. 8B illustrates information elements included in the UE context stored for each UE. As illustrated in the drawing, the MME context stored for each UE includes one or multiple pieces of IMSI, MSISDN, MM State, GUTI, ME Identity, UE Radio Access Capability, UE Network Capability, MS Network Capability, Access Restriction, MME F-TEID SGW F-TEID, eNB Address, MME UE S1AP ID, eNB UE S1AP ID, NR node Address, NR node ID, WAG_Address, and WAG ID.

Next, FIG. 9C illustrates the MME context for each PDU session or PDN connection stored for each PDU session or PDN connection. As illustrated in the drawing, the MME context for each PDU session includes APN in Use, Assigned Session Type, IP Address(es), PGW F-TEID, SCEF ID, and Default bearer.

FIG. 9D illustrates the MME context for each bearer stored for each bearer. As illustrated in the drawing, the MME context stored for each bearer includes one or multiple pieces of EPS Bearer ID, TI, TFT, SGW F-TEID, PGW F-TEID, MME F-TEID, eNB Address, NR node Address, WAG_Address, eNB ID, NR node ID, and WAG ID.

Here, the information elements included in the MME context illustrated in FIGS. 8B to 9D may be included in either the MM context or the EPS bearer context and stored.

1.2.4. Configuration of SGW

Figure 10A:
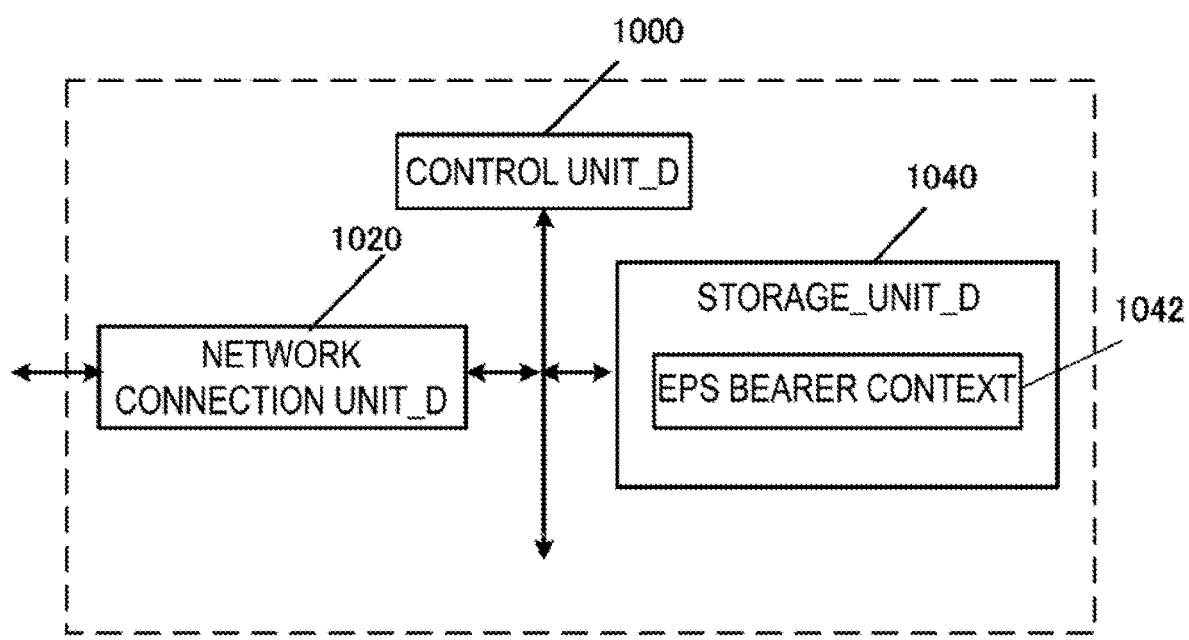
FIG. 10A is a diagram illustrating a device configuration of SGW/PGW/UPGW/SCEF.

FIG. 10A illustrates a device configuration of the SGW_A 35. As illustrated in the drawing, the SGW_A 35 includes a network connection unit_D 1020, a control unit_D 1000, and a storage unit_D 1040. The network connection unit_D 1020 and the storage unit_D 1040 are connected to the control unit_D 1000 via a bus.

The control unit 1000 is a function unit for controlling the SGW_A 35. The control unit_D 1000 implements various processes by reading out various programs stored in the storage unit_D 1040 and performing the programs.

The network connection unit_D 1020 is a function unit through which the SGW_A 35 connects to the base station in the access network and/or the access point and/or MME_A 40 and/or PGW_A 30 and/or SGSN_A 42. Furthermore, the network connection unit_D 1020 is a transmission and/or reception unit through which the SGW_A 35 transmits and/or receives the user data and/or control information to and/or from the base station in the access network and/or the access point and/or the MME_A 40 and/or the PGW_A 30 and/or the SGSN_A 42.

The storage unit_D 1040 is a function unit for storing programs, data, and the like necessary for each operation of the SGW_A 35. The storage unit_D 1040 is constituted of, for example, a semiconductor memory, a HDD, or the like. The storage unit_D 1040 may store at least identification information and/or control information and/or a flag and/or a parameter included in a control message which is transmitted and/or received in a communication procedure described later.

As illustrated in the drawing, the storage unit_D 1040 stores an EPS bearer context 1042. Note that the EPS bearer context 1042 includes an EPS bearer context stored for each UE, an EPS bearer context stored for each PDU session, and an EPS bearer context stored for each bearer.

First, FIG. 11B illustrates information elements of the EPS bearer context stored for each UE. As illustrated in the drawing, the EPS bearer context stored for each UE includes IMSI, ME identity, MSISDN, MME F-TEID, and SGW F-TEID.

The EPS bearer context further includes an EPS bearer context for each PDU session stored for each PDU session. FIG. 11C illustrates the EPS bearer context for each PDU session. As illustrated in the drawing, the EPS bearer context for each PDU session includes APN in Use, Assigned Session Type, SGW F-TEID, PGW F-TEID, Default Bearer, and IP Address(es).

The EPS hearer context further includes an EPS hearer context for each hearer. FIG. 11D illustrates the EPS bearer context for each bearer. As illustrated in the drawing, the EPS bearer context for each bearer includes one or multiple pieces of EPS Bearer ID, TFT, PGW F-TEID, SGWF-TEID, eNB F-TEID, MME Address, NR node Address, WAG Address, MME ID, NR node ID, and WAG ID.

1.2.5. Configuration of PGW/UPGW

FIG. 10A illustrates a device configuration of the PGW_A 30 and the UPGW_A 130. As illustrated in the drawing, the PGW_A 30 and the UPGW_A 130 include a network connection unit_D 1020, a control unit_D 1000, and a storage unit_D 1040. The network connection unit_D 1020 and the storage unit_D 1040 are connected to the control unit_D 1000 via a bus. Note that functions of these units may operate on physical hardware, or logical hardware which is virtually configured on general-purpose hardware.

The control unit_D 1000 is a function unit for controlling the PGW_A 30. The control unit_D 1000 implements various processes by reading out various programs stored in the storage unit_D 1040 and performing the programs.

The network connection unit_D 1020 is a function unit through which the PGW_A 30 connects to the SGW_A 35 and/or the PCRF_A 60 and/or the ePDG_A 65 and/or the AAA_A 55 and/or the TWAG_A 74 and/or the PDN_A 5. The network connection unit_D 1020 is a transmission and/or reception unit through which the PGW_A 30 transmits and/or receives the user data and/or control information to and/or from the SGW_A 35 and/or the PCRF_A 60 and/or the ePDG_A 65 and/or the AAA_A 55 and/or the TWAG_A 74 and/or the PDN_A 5.

The network connection unit_D 1020 is a function unit through which the UPGW_A 130 connects to the PCRF_A 60 and/or the UPGW_A 130 and/or the PDN_A 5. The network connection unit_D 1020 is a transmission and/or reception unit through which the PGW_A 30 transmits and/or receives the user data and/or control information to and/or from the SGW_A 35 and/or the PCRF_A 60 and/or the ePDG_A 65 and/or the AAA_A 55 and/or the TWAG_A 74 and/or the PDN_A 5.

The storage unit_D 1040 is a function unit for storing programs, data, and the like necessary for each operation of the PGW_A 30. The storage unit_D 1040 is constituted of, for example, a semiconductor memory, a HDD, or the like. The storage unit_D 1040 may store at least identification information and/or control information and/or a flag and/or a parameter included in a control message which is transmitted and/or received in a communication procedure described later.

As illustrated in the drawing, the storage unit_D 1040 stores an EPS bearer context 1042. Note that the EPS bearer context 1042 may include an EPS bearer context stored for each UE, an EPS bearer context stored for each APN, an EPS bearer context stored for each PDU session or PDN connection, and an EPS bearer context stored for each bearer which may be separately stored in the EPS bearer context. The EPS bearer context may be further a context stored by the UPGW_A 130.

FIG. 12B illustrates information elements included in the EPS bearer context stored for each UE. As illustrated in the drawing, the EPS bearer context stored for each UP includes IMSI, ME Identity, MSISDN, and RAT type.

Next, FIG. 12C illustrates the EPS bearer context stored for each APN. As illustrated in the drawing, the EPS bearer context stored for each APN of the storage unit of the PGW includes APN in use. Note that the EPS bearer context stored for each APN may be stored for each Data Network Identifier.

FIG. 12D illustrates the EPS bearer context for each PDU session or PDN connection stored for each PDU session or PDN connection. As illustrated in the drawing, the EPS bearer context for each PDU session or PDN connection includes Assigned Session Type, IP Address(es), SGW F-TEID, PGW F-TEID, and Default Bearer.

FIG. 12E illustrates the EPS bearer context stored for each EPS bearer. As illustrated in the drawing, the EPS bearer context includes EPS Bearer ID, TFT, SGW F-TEID, and PGW F-TEID.

1.2.6. Configuration of SCEF

FIG. 10A illustrates a device configuration of the SCEF_A 46. As illustrated in the drawing, the SCEF_A 46 includes a network connection unit_D 1020, a control unit_D 1000, and a storage unit_D 1040. The network connection unit_D 1020 and the storage unit_D 1040 are connected to the control unit_D 1000 via a bus.

The control unit_D 1000 is a function unit for controlling the SCEF_A 46. The control unit_D 1000 implements various processes by reading out various programs stored in the storage unit_D 1040 and performing the programs. The network connection unit_D 1020 is a function unit through which the SCEF_A 46 connects to the core network_A 90. In other words, the network connection unit_D 1020 is a function unit through which the SCEF_A 46 connects to the MME_A 40. The network connection unit_D 1020 is a transmission and/or reception unit through which the SCEF_A 46 transmits and/or receives the user data and/or control information to and/or from the MME_A 40.

The storage unit_D 1040 is a function unit for storing programs, data, and the like necessary for each operation of the SCEF_A 46. The storage unit_D 1040 is constituted of, for example, a semiconductor memory, a HDD, or the like. The storage unit_D 1040 may store at least identification information and/or control information and/or a flag and/or a parameter included in a control message which is transmitted and/or received in a communication procedure described later.

As illustrated in the drawing, the storage unit_D 1040 stores an EPS bearer context 1042. Hereinafter, information elements stored in the storage unit_D 1040 will be described. FIG. 13B illustrates information elements included in the EPS bearer context. As illustrated in the drawing, the EPS bearer context includes User Identity, APN in Use, EPS Bearer ID, and Serving Node Information.

1.3. Description of Initial Procedure for Core Network_B

Next, before describing the detailed steps of each procedure for the core network_B 190 in the present embodiment, in order to avoid redundant descriptions, terminology specific to the present embodiment and primary identification information used in each procedure will be described beforehand.

A first mode in the present embodiment is a mode in which the procedure for connection and registration of the UE_A 10 to and in the core network_B 190 has been completed, and the devices have established the PDU session. Note that whether the procedure for registering the UE_A 10 in the core network_B 190 and the procedure for establishing the PDU session may be simultaneously or separately performed is not matter to each device. The first mode may be a mode in which a procedure for updating location registration information of the UE_A 10 is completed.

The first mode in the present embodiment may be a mode which the devices establish the PDU session for the core network_B 190. To be more specific, the first mode may be a mode in which the devices establish the PDU session between the UE_A 10 and the UPGW_A 130 via the NR node_A 122. Note that the first mode is not limited to those modes above.

An EPS service in the present embodiment may be a service provided by a PS domain, and may be a connection service provided using the EPC.

A non EPS service in the present embodiment may be a service provided by a CS domain, and may be a service other than the EPS service.

An NGS service in the present embodiment may be a connection service provided using the core network_B 190. The NGS service may be a service different from the EPS service, or a service the same as the EPS service. Note that the NGS service is not limited to those described above, but may be a system for providing a mobile communication service.

The non NGS service in the present embodiment may be a service other than the NGS service, and may include an EPS service and/or a non EPS service.

A session in the present embodiment may be a PDU session, a PDN connection, or an EPS bearer. A session establishment procedure may be a PDU session establishment procedure, or a PDN connectivity procedure. A session release procedure may be a PDU session release procedure, or a PDN connectivity release procedure. Information identifying a session may be a PDU session ID, a PDN connection ID, or an EPS bearer ID. Note that the information identifying a session may be other identification information than those described above.

The EPS bearer in the present embodiment is a logical communication path established between the UE_A 10 and the PGW_A 30. The EPS bearer may be a communication path configuring a PDN connection. The EPS bearer may be a logical communication path established between UE_A 10 and the UPGW_A 130, or a communication path configuring a PDU session.

The Network Slice instance (NSI) in the present embodiment is an entity of each of one or multiple Network Slices configured in the core network_B 190. The NSI in the present embodiment may be configured to include a virtual Network Function (NF) generated using a Network Slice Template (NST). Here, the NST is associated with a resource request for providing a required communication service or capability, and is a logical expression of one or multiple Network Functions (NFs).

Specifically, the NSI may be an aggregation constituted by multiple NFs in the core network_B 190. The NSI may be a logical network configured to classify the user data delivered through a service or the like. The network slice may be configured to include at least one or more NFs. The NF included in the network slice may be or may not be a device shared by another network slice.

The UE can be assigned to one or multiple network slices, based on UE usage type and/or one or multiple network slice type IDs and/or registration information such as one or multiple NS IDs and/or the APN.

The Dedicated Core Network (DCN) in the present embodiment is one or multiple specific subscriber type dedicated core networks configured in the core network_A 90. Specifically, a DCN for a UE registered as a M2M function user may be configured in the core network_A 90, for example. In addition, a default DCN for a UE with no a proper DCN may be configured in the core network_A 90.

In the DCN, at least one or more MMEs_A 40 or SGSNs_A 42 may be located, and further, at least one or more SGWs_A 35, PGWs_A 30, or PCRFs_A 60 may be located. The UE may be assigned to one DCN, based on the registration information such as the UE usage type and/or DCNID.

The UE usage type in the present embodiment is a parameter value which is included in the registration information of the UE and used for identifying the DCN and/or NSI. The UE usage type may be stored by the HSS_50. The MME_A 40 and/or the SGSN_A 42 may select the SGW_A 35 and the PGW_A 30, based on the UE usage type. The CPF_A 140 may select the UPGW_A 130, based on the UE usage type.

The DN ID in the present embodiment is identification information identifying the core network_B 190 and an external network such as a DN. The DN ID can be used further as information for selecting a gateway such as the UPGW_A 130 connecting to the core network_B 190.

Note that the DN ID may be identification information identifying such a gateway, or identification information identifying an external network such as the DN. Note that in a case that multiple gateways connecting the core network_B 190 to the DN are located, multiple gateways may be selectable according to the DN ID. Moreover, one gateway may be selected from among such multiple gateways by another scheme using identification information other than the DN ID.

The DN ID may be information equivalent to the APN, or different from the APN. Note that in a case that the DN ID is the information different from the APN, each device may manage information indicating a correspondence relationship between the DN ID and the APN, perform a procedure to inquire the APN by using the DN ID, or perform a procedure to inquire the DN ID by using the APN.

A tracking area in the present embodiment is a singular or multiple ranges which the core network manages and can be represented by the location information of the UE_A 10. The tracking area may be configured to include multiple cells. The tracking area may be a range in which a control message such as paging is broadcast, or a range in which the UE_A 10 can move without a handover procedure. The tracking area may be a routing area, a location area, or those similar to them.

Session and Service Continuity (SSC) mode indicates a mode of Session and Service Continuity supported by a system and/or each device in a NextGen system (NGS). To be more specific, the SSC mode may be a mode indicating a type of the session and service continuity supported by a PDU session established between the UE_A 10 and Terminating User-Plane Function (TUPF). Here, the TUPF may be the UPGW_A 130. Note that the SSC mode may be a mode indicating a type of the session and service continuity configured for each PDU session. Furthermore, the SSC mode may be configured to include three modes of SSC mode 1, SSC mode 2, and SSC mode 3.

Here, the TUPF may be a Network Function (NF) for a User Plane (U-Plane). Furthermore, the TUPF may be located in the core network or may be located in the access network.

SSC mode 1 in the present embodiment is a mode of the session and service continuity in which the same TUPF is continuously maintained regardless of the access technology such as the Radio Access Technology (RAT) and the cell the UE_A 10 uses to connect to a network. To be more specific, SSC mode 1 may be a mode in which even in a case that the mobility of the UE_A 10 occurs, the session and service continuity is achieved without changing the TUPF used by the established PDU session.

SSC mode 2 in the present embodiment is a mode of the session and service continuity in which the same TUPF is continuously maintained only in a serving area of the TUPF. To be more specific, SSC mode 2 may be a mode in which so long as the UE_A 10 is in the serving area of the TUPF, the session and service continuity is achieved without changing the TUPF used by the established PDU session. SSC mode 2 may be a mode in which in a case that the mobility that the UE_A 10 leaves the serving area of the TUPF occurs, the session and service continuity is achieved by changing the TUPF used by the established PDU session.

Here, the serving area of the TUPF may be an area in which one TUPF can provide a session and service continuity function, or a subset of the access network such as the RAT or the cell used when the UE_A 10 connects to a network. The subset of the access network may be a network including one or multiple RATs and/or cells.

SSC mode 3 in the present embodiment is a mode of the session and service continuity that allows a new PDU session and/or communication path to be established via a new TUPF to the same DN before releasing a PDU session and/or communication path established between the UE_A 10 and the TUPF. SSC mode 3 may be a mode of the session and service continuity that allows the UE_A 10 to be multi-homed.

And/or, SSC mode 3 may be a mode that allows the session and service continuity using multiple PDU sessions and/or the TUPFs associated with the PDU sessions. In other words, in the case of SSC mode 3, each device may achieve the session and service continuity by using multiple PDU sessions, or may achieve the session and service continuity by using multiple TUPFs.

Here, in the case that each device establishes a new PDU session and/or communication path, a new TUPF may be selected by the network, or a new TUPF may be an optimal TUPF for a place at which the UE_A 10 connects to the network. In a case that multiple PDU sessions and/or the TUPFs used by the PDU sessions are effective, the UE_A 10 may associate the application and/or flow communication with to a new established PDU session, immediately or based on completion of the communication.

Default SSC mode is an SSC mode used by the UE_A 10 and/or network in a case that a specific SSC mode is not determined. Specifically, the Default SSC mode may be an SSC mode used by the UE_A 10 in a case of no SSC mode requested from the application, and/or a case of no policy of the UE_A 10 for determining an SSC mode for the application. And/or, the Default SSC mode may be an SSC mode used by the network in the case of no SSC mode requested from the UE_A 10.

Note that the Default SSC mode may be configured for each PDN_A 5, or for each UE_A 10 and/or subscriber, based on the subscriber information and/or the operator policy and/or the policy of the UE_A 10. The Default SSC mode may be information indicating SSC mode 1, SSC mode 2, or SSC mode 3.

Next, the identification information in the present embodiment will be described.

A first identification information in the present embodiment is information identifying an external network such as the PDN_A 5 or the DN to which the UE_A 10 requests the core network_B 190 that the UE_A 10 connects. The first identification information may be a DN ID. The first identification information may be information configured to include multiple DN IDs, or information configured to include a DN ID and an APN.

A second identification information in the present embodiment is information indicating a type of connection service which the UE_A 10 requests the core network_B 190 that the UE_A 10 uses. Note that the second identification information may be information indicating that the UE_A 10 requests the use of only an NGS service, or information indicating that the UE_A 10 requests the use of both an NGS service and a non NGS service. In other words, the second identification information may be information indicating that the UE_A 10 requests the use of an NGS service and an EPS service, or information indicating that the UE_A 10 requests the use of an NGS service, an EPS service, and a non EPS service.

The second identification information may be information indicating a type of the attach procedure requested by the UE_A 10, or an attach type. In other words, the second identification information may be information indicating a request for the registration and/or connection in and/or to only the core network_B 190, or information indicating a request for the registration and/or connection in and/or to both the core network_B 190 and the core network_A 90.

A third identification information in the present embodiment is information indicating a type of the connection service the use of which the UE_A 10 supports. Note that the third identification information may be information indicating that the UE_A 10 supports the use of only an NGS service, or information indicating that the UE_A 10 supports the use of both an NGS service and a non NGS service. In other words, the third identification information may be information indicating that the UE_A 10 supports the use of an NGS service and an EPS service, or information indicating that the UE_A 10 supports the use of an NGS service, an EPS service, and a non EPS service.

The third identification information may be capability information of the UE_A 10 indicating a type of the attach procedure supported by the UE_A 10. In other words, the third identification information may be capability information of the UE_A 10 supporting the registration and/or connection in and/or to only the core network_B 190, or capability information of the UE_A 10 supporting the registration and/or connection in and/or to both the core network_B 190 and the core network_A 90.

A fourth identification information in the present embodiment is information indicating an SSC mode which the UE_A 10 requests to the core network_B 190. The fourth identification information may be information indicating an SSC mode used when the session is switched from an NGS service to an EPS service. In other words, the fourth identification information may be information indicating an SSC mode used when the session is switched and/or reattached from the core network_B 190 to the core network_A 90. Specifically, the fourth identification information may be information indicating SSC mode 1, information indicating SSC mode 2, or information indicating SSC mode 3.

A fifth identification information in the present embodiment is information indicating an SSC mode supported by the UE_A 10. The fifth identification information may be information indicating an SSC mode supported when the session is switched from an NGS service to an EPS service. In other words, the fifth identification information may be information indicating an SSC mode supported when the session is switched and/or reattached from the core network_B 190 to the core network_A 90. Specifically, the fifth identification information may be information indicating SSC mode 1, information indicating SSC mode 2, or information indicating SSC mode 3.

The sixth identification information in the present embodiment is information to identify an external network such as the PDN_A 5 or UN which can be connected by the UE_A 10. In addition, the sixth identification information may be an APN. In addition, the sixth identification information may be information including multiple APNs, or may be information including an APN and a UN ID. In addition, the sixth identification information may be information same as the first identification information, or may be transmitted and/or received included in the first identification information.

The seventh identification information in the present embodiment is information to identify the CPF_A 140 by which the UE_A 10 requests connection to the core network_B 190. In addition, the seventh identification information may be information to indicate the CPF_A 140 which can be connected by the UE_A 10, or may be information to identify the CPF_A 140 which is connected by the UE_A 10 before. In addition, the seventh identification information may be information to identify the UE_A 10. For example, the seventh identification information may be a CPF ID, may be a GUTI, may be an IMSI, may be an NGS mobile identity, or may be other information. Note that in a case that multiple CPF_A 140s exist in the core network_B 190, the CPF_A 140 may be a common CPF which connects the core network_B 190 and the UE_A 10, and transmits and/or receives a control message to and/or from the UE_A 10. In that case, the seventh identification information may be a common CPF ID.

The eighth identification information in the present embodiment may include information to identify the MME_A 40 which can be connected by the UE_A 10, or may include information to identify the MME_A 40 which is connected by UE_A 10 before. In addition, the eighth identification information may be information to identify the UE_A 10. For example, the eighth identification information may be a GUTI, may be an IMSI, may be an EPS mobile identity, or may be other information.

The ninth identification information in the present embodiment is information to identify and/or to indicate a network slice type which the UE_A 10 requests to the core network_B 190. In addition, the ninth identification information may be information such as an NSD ID to identify an NSI or a network slice type ID to identify a type of a network slice. In addition, the ninth identification information may be a UE usage type, or may be a part of a UE usage type. In addition, the ninth identification information may be an APN. Note that the ninth identification information may include information to identify multiple NSIs. The ninth identification information may be configured including information to identify a Network Function (NF) in the core network_B 190. In addition, the ninth identification information may be registration information of the UE_A 10 retained by the UE_A 10 and/or any apparatus in the network.

The eleventh identification information in the present embodiment is information to identify an external network such as a DN which the core network_B 190 has allowed connection for the UE_A 10, and/or connected by the UE_A 10. In addition, the eleventh identification information may be DN ID. In addition, the eleventh identification information may be information including multiple DN IDs, or may be information including a DN ID and an APN.

The twelfth identification information in the present embodiment is information to indicate a type of a connection service of which the core network_B 190 has allowed the use for the UE_A 10. Note that the twelfth identification information may be information to indicate that the core network_B 190 has allowed the use of only an NGS service for the UE_A 10, or may be information to indicate that the core network_B 190 has allowed the use of both an NGS service and a non NGS service. In other words, the twelfth identification information may be information to indicate that the core network_B 190 has allowed the use of an NGS service and an EPS service, or may be information to indicate that the core network_B 190 has allowed the use of an NGS service, an EPS service, and a non EPS service.

In addition, the twelfth identification information may be information to indicate a type of an attach procedure which the core network_B 190 has allowed for the UE_A 10, or may be an attach result. In other words, the twelfth identification information may be information to indicate allowing registration and/or connection only to the core network_B 190 of the UE_A 10, or may be information to indicate allowing registration and/or connection to both the core network_B 190 and the core network_A 90.

The thirteenth identification information in the present embodiment is information to indicate a type of a connection service of which the core network_B 190 supports the use. Note that the thirteenth identification information may be information to indicate that the core network_B 190 supports the use of only an NGS service, or may be information to indicate that the core network_B 190 supports the use of both an NGS service and a non NGS service. In other words, the thirteenth identification information may be information to indicate that the core network_B 190 supports the use of an NGS service and an EPS service, or may be information to indicate that the core network_B 190 supports the use of an NGS service, an EPS service, and a non EPS service.

In addition, the thirteenth identification information may be capability information of the core network_B 190 to indicate a type of an attach procedure which the core network_B 190 supports. In other words, the thirteenth identification information may be capability information of the core network_B 190 which supports registration and/or connection only to the core network_B 190, or may be capability information of the core network_B 190 which supports registration and/or connection to both the core network_B 190 and the core network_A 90.

The fourteenth identification information in the present embodiment is information to indicate an SSC mode which the core network_B 190 has allowed for the UE_A 10. In addition, the fourteenth identification information may be information to indicate an SSC mode which has been allowed to be used in switching a session from an NGS service to an EPS service. In other words, the fourteenth identification information may be information to indicate an SSC mode which has been allowed to be used in switching and/or re-attaching a session from the core network_B 190 to the core network_A 90. Specifically, the fourteenth identification information may be information to indicate that SSC mode 1 has been allowed, may be information to indicate that SSC mode 2 has been allowed, or may be information to indicate that SSC mode 3 has been allowed.

The fifteenth identification information in the present embodiment is information to indicate an SSC mode which the core network_B 190 supports. In addition, the fifteenth identification information may be information to indicate an SSC mode which is supported in switching a session from an NGS service to an EPS service. In other words, the fifteenth identification information may be information to indicate an SSC mode which is supported in switching and/or re-attaching a session from the core network_B 190 to the core network_A 90. Specifically, the fifteenth identification information may be information to indicate that the core network_B 190 supports SSC mode 1, may be information to indicate that the core network_B 190 supports SSC mode 2, or may be information to indicate that the core network_B 190 supports SSC mode 3.

The sixteenth identification information in the present embodiment is information to identify an external network such as s DN which the core network_B 190 has allowed for the UE_A 10, and which can be connected by the UE_A 10 in connecting to the core network_A 90. In addition, the sixteenth identification information may be an APN. In addition, the sixteenth identification information may be information including multiple APNs, or may be information including an APN and a DN ID. In addition, the sixteenth identification information may be information same as the eleventh identification information, or may be transmitted and/or received included in the eleventh identification information.

The seventeenth identification information in the present embodiment is information to identify the CPF_A 140 of which the core network_B 190 allowed connection for the UE_A 10. In addition, the seventeenth identification information may be information to indicate the CPF_A 140 connected by the UE_A 10, or may be information to indicate the CPF_A 140 which can be connected by the UE_A 10. In addition, the seventeenth identification information may be information to identify the UE_A 10. For example, the seventeenth identification information may be a CPF ID, may be a GUTI, may be an NGS mobile identity, or may be other information. Note that in a case that multiple CPF_A 140s exist in the core network_B 190, the CPF_A 140 may be a common CPF which connects the core network_B 190 and the UE_A 10, and transmits and/or receives a control message to and/or from the UE_A 10. In that case, the seventeenth identification information may be a common CPF ID.

The eighteenth identification information in the present embodiment is information to identify the MME_A 40 to which the core network_B 190 has allowed the UE_A 10 to connect. In addition, the eighteenth identification information may be information to indicate the MME_A 40 to which the UE_A 10 can connect. In addition, the eighteenth identification information may be information to identify the UE_A 10. For example, the eighteenth identification information may be a GUTI, may be an IMSI, may be an EPS mobile identity, or may be other information.

The nineteenth identification information in the present embodiment is information to identify and/or to indicate a network slice type of which the core network_B 190 allowed connection for the UE_A 10. In addition, the nineteenth identification information may be information such as an NSD ID to identify an NSI or a network slice type ID to identify a type of a network slice. In addition, the nineteenth identification information may be a UE usage type, or may be a part of a UE usage type. In addition, the nineteenth identification information may be an APN. Note that the nineteenth identification information may include information to identify multiple NSIs. The nineteenth identification information may be configured including information to identify a Network Function (NF) in the core network_B 190. In addition, the nineteenth identification information may be registration information of the UE_A 10 (retained by the UE_A 10 and/or any apparatus in the network).

The twenty-first identification information in the present embodiment is information to indicate that a request of the UE_A 10 is not allowed by the core network_B 190. In addition, the twenty-first identification information may be cause information (Reject Cause) to indicate reasons why a request of the UE_A 10 has been rejected.

For example, the twenty-first identification information may be information to indicate not allowing connection to the core network_B 190 of the UE_A 10 and/or a DN, or may be information to indicate that connection to the core network_B 190 of the UE_A 10 and/or a DN has failed. In addition, the twenty-first identification information may be information to indicate that connection and/or registration to the CPF_A 140 of which the UE_A 10 requests connection is not allowed, or may be information to indicate that information to identify the UE_A 10 is not normal and/or not allowed. In addition, the twenty-first identification information may be information to indicate that connection of the UE_A 10 is not appropriate due to network congestion or authentication, and the like.

In addition, the twenty-first identification information may be information to indicate not allowing the use of both an NGS service and a non NGS service for the UE_A 10, or may be information to indicate not allowing the use of an NGS service. In addition, the twenty-first identification information may be information to indicate not allowing the use of both an NGS service and an EPS service for the UE_A 10, or may be information to indicate not allowing the use of all an NGS service, an EPS service, and a non EPS service.

In addition, the twenty-first identification information may be information to indicate that the UE_A 10 is connecting with a Public Land Mobile Network (PLMN) which is not allowed, may be information to indicate that a service requested by the UE_A 10 is not allowed in a current PLMN, or may be information to indicate that an appropriate cell does not exist in a current PLMN.

In addition, the twenty-first identification information may be information to indicate that the UE_A 10 is connecting with a tracking area which is not allowed, or may be information to indicate that a service requested by the UE_A 10 is not allowed in a current tracking area. In addition, the twenty-first identification information may be information to indicate that an appropriate cell does not exist in a current tracking area, or may be information to indicate that loaming is not allowed in a current tracking area.

In addition, the twenty-first identification information may be information to indicate that an SSC mode requested by the UE_A 10 is not allowed, or may be information to indicate that the core network_B 190 does not support an SSC mode requested by the UE_A 10.

In addition, the twenty-first identification information may be information to indicate that an NSI of which the UE_A 10 requests connection is not allowed, or may be information to indicate that the core network_B 190 does not support a network slice type requested by the UE_A 10.

The twenty-second identification information in the present embodiment is information to indicate a type of a connection service of which the core network_B 190 has not allowed the use for the UE_A 10. Note that the twenty-second identification information may be information to indicate that the core network_B 190 has not allowed the use of only an NGS service, or may be information to indicate that the core network_B 190 has not allowed the use of both an NGS service and a non NGS service. In other words, the twenty-second identification information may be information to indicate that the core network_B 190 has not allowed the use of an NGS service and an EPS service, or may be information to indicate that the core network_B 190 has not allowed the use of an NGS service, an EPS service, and a non EPS service.

In addition, the twenty-second identification information may be information to indicate a type of an attach procedure which the core network_B 190 has not allowed. In other words, the twenty-second identification information may be information to indicate not allowing registration and/or connection only to the core network_B 190, or may be information to indicate not allowing registration and/or connection to both the core network_B 190 and the core network_A 90.

The twenty-third identification information in the present embodiment is information to indicate a type of a connection service of which the core network_B 190 does not support the use. Note that the twenty-third identification information may be information to indicate that the core network_B 190 does not support the use of only an NGS service, or may be information to indicate that the core network_B 190 does not support the use of both an NGS service and a non NGS service. In other words, the twenty-third identification information may be information to indicate that the core network_B 190 does not support the use of an NGS service and an EPS service, or may be information to indicate that the core network_B 190 does not support the use of an NGS service, an EPS service, and a non EPS service.

In addition, the twenty-third identification information may be capability information of the core network_B 190 to indicate a type of an attach procedure which the core network_B 190 does not support. In other words, the twenty-third identification information may be capability information of the core network_B 190 which does not support registration and/or connection only to the core network_B 190, or may be capability information of the core network_B 190 which does not support registration and/or connection to both the core network_B 190 and the core network_A 90.

The twenty-fourth identification information in the present embodiment is information to indicate an SSC mode which the core network_B 190 has not allowed for the UE_A 10. In addition, the twenty-fourth identification information may be information to indicate an SSC mode which has not been allowed to be used in switching a session from an NGS service to an EPS service. In other words, the twenty-fourth identification information may be information to indicate an SSC mode which has not been allowed to be used in switching and/or re-attaching a session from the core network_B 190 to the core network_A 90. Specifically, the twenty-fourth identification information may be information to indicate that SSC mode 1 has not been allowed, may be information to indicate that SSC mode 2 has not been allowed, or may be information to indicate that SSC mode 3 has not been allowed.

The twenty-fifth identification information in the present embodiment is information to indicate an SSC mode which the core network_B 190 does not support. In addition, the twenty-fifth identification information may be information to indicate an SSC mode which is not supported in switching a session from an NGS service to an EPS service. In other words, the twenty-fifth identification information may be information to indicate an SSC mode which is not supported in switching and/or re-attaching a session from the core network_B 190 to the core network_A 90. Specifically, the twenty-fifth identification information may be information to indicate that the core network_B 190 does not support SSC mode 1, may be information to indicate that the core network_B 190 does not support SSC mode 2, or may be information to indicate that the core network_B 190 does not support SSC mode 3.

The twenty-sixth identification information in the present embodiment may be information to indicate that connection to an NSI of which the UE_A 10 requests connection is not allowed, or may be information to indicate that the core network_B 190 does not support a network slice type requested by the UE_A 10.

Alternatively, the twenty-sixth identification information in the present embodiment may be information to identify and/or indicate a network slice type to allow connection. At this time, a network slice type to allow connection may be information different from a network slice type requested by the UE_A 10. In addition, the twenty-sixth identification information may be information such as an NSD ID to identify an NSI or a network slice type ID to identify a type of a network slice. In addition, the twenty-sixth identification information may be a UE usage type, or may be a part of a UE usage type. In addition, the twenty-sixth identification information may be an APN. Note that the twenty-sixth identification information may include information to identify multiple NSIs. The twenty-sixth identification information may be configured including information to identify a Network Function (NF) in the core network_B 190. In addition, the twenty-sixth identification information may be registration information of the UE_A 10 retained by the UE_A 10 and/or any apparatus in the network.

The thirty-first identification information in the present embodiment is information to indicate a type of a connection service of which the UE_A 10 requests update of registration information to the core network_B 190. Note that the thirty-first identification information may be information to indicate that the UE_A 10 requests update of registration information of only an NGS service, or may be information to indicate that the UE_A 10 requests update of registration information of both an NGS service and a non NGS service. In other words, the thirty-first identification information may be information to indicate that the UE_A 10 requests update of registration information of an NGS service and an EPS service, or may be information to indicate that the UE_A 10 requests update of registration information of an NGS service, an EPS service, and a non EPS service.

In addition, the thirty-first identification information may be information to indicate a type of a tracking area update procedure requested by the UE_A 10, or may be an update type. In other words, the thirty-first identification information may be information to indicate requiring update of registration information and/or connection only to the core network_B 190, or may be information to indicate requiring update of registration information and/or connection to both the core network_B 190 and the core network_A 90.

In addition, the thirty-first identification information may be information to indicate requiring update of only a tracking area in an NGS service, or may be information to indicate requiring update of a tracking area in an NGS service and a tracking area and/or a routing area in a non NGS service. In addition, the thirty-first identification information may be information to indicate requiring update of a tracking area in an NGS service and a tracking area in an EPS service, or may be information to indicate requiring update of a tracking area in an NGS service, a tracking area in an EPS service, and a routing area in a non EPS service.

The thirty-second identification information in the present embodiment is the same as the third identification information. The thirty-third identification information in the present embodiment is the same as the seventh identification information. The thirty-fourth identification information in the present embodiment is the same as the eighth identification information. The thirty-fifth identification information in the present embodiment is the same as the fourth identification information. The thirty-sixth identification information in the present embodiment is the same as the fifth identification information. The thirty-seventh identification information in the present embodiment is the same as the ninth identification information.

The forty-first identification information in the present embodiment is information to indicate a type of a connection service of which the core network_B 190 has allowed update of registration information for the UE_A 10. Note that the forty-first identification information may be information to indicate that the core network_B 190 has allowed update of registration information of only an NGS service, or may be information to indicate that the core network_B 190 has allowed update of registration information of both an NGS service and a non NGS service. In other words, the forty-first identification information may be information to indicate that the core network_B 190 has allowed update of registration information of an NGS service and an EPS service, or may be information to indicate that the core network_B 190 has allowed update of registration information of an NGS service, an EPS service, and a non EPS service.

In addition, the forty-first identification information may be information to indicate a type of an attach procedure which the core network_B 190 has allowed for the UE_A 10, or may be an attach result. In other words, the forty-first identification information may be information to indicate having allowed update of registration information and/or connection only to the core network_B 190, or may be information to indicate having allowed update of registration information and/or connection to both the core network_B 190 and the core network_A 90.

In addition, the forty-first identification information may be information to indicate that update of only a tracking area in an NGS service has been allowed, or may be information to indicate that update of a tracking area in an NGS service and a tracking area and/or a routing area in a non NGS service has been allowed. In addition, the forty-first identification information may be information to indicate that update of a tracking area in an NGS service and a tracking area in an EPS service has been allowed, or may be information to indicate that update of a tracking area in an NGS service, a tracking area in an EPS service, and a routing area in a non EPS service has been allowed.

The forty-second identification information in the present embodiment is the same as the thirteenth identification information. The forty-third identification information in the present embodiment is the same as the fourteenth identification information. The forty-fourth identification information in the present embodiment is the same as the fifteenth identification information. The forty-fifth identification information in the present embodiment is the same as the seventeenth identification information. The forty-sixth identification information in the present embodiment is the same as the eighteenth identification information. The forty-seventh identification information in the present embodiment is the same as the nineteenth identification information.

The fifty-first identification information in the present embodiment is information to indicate a detach procedure type which the core network_B 190 requests to the UE_A 10. Note that information to indicate a type of a detach procedure may be a detach type. In addition, the fifty-first identification information may be information to indicate that re-attaching of the UE_A 10 is required, or may be information to indicate that re-attaching of the UE_A 10 is not required. Note that re-attaching may be performing an attach procedure again.

The fifty-second identification information in the present embodiment is information to indicate whether or not transmission and/or reception of information to indicate a handover is required at re-attaching. In addition, the fifty-second identification information may be information to indicate whether or not an attach procedure to another core network after a detach procedure is required, or may be information to indicate whether or not such attach procedure is supported.

In addition, the fifty-second identification information may be information to indicate that the core network_B 190 requests the UE_A 10 to perform an attach procedure to another core network after a detach procedure. In addition, the fifty-second identification information may be information to indicate that an attach procedure after a detach procedure is required to switch a session from the core network_B 190 to another core network. Note that another core network may be the core network_A 90, or may be a core network which is identified with the fifty-third identification information.

The fifty-third identification information in the present embodiment is information to indicate a system connected in re-attaching. A system connected may be a system which provides an NGS service, may be a system which provides an EPS, or may be a system which provides a non EPS service. In addition, the fifty-third identification information may be information to indicate a core network connected in re-attaching. For example, the fifty-third identification information may be information to indicate the core network_A 90, or may be information to indicate the core network_B 190.

In addition, the fifty-third identification information may be information to indicate a type of a control message used in re-attaching. For example, the fifty-third identification information may indicate that, after a detach procedure, the UE_A 10 performs an attach procedure using a control message for an EPS, or may indicate that the UE_A 10 performs an attach procedure using a control message for an NGS. In other words, the fifty-third identification information may indicate that, after a detach procedure, the UE_A 10 performs an attach procedure to the core network_A 90, or may indicate that the UE_A 10 performs an attach procedure to the core network_B 190.

The fifty-fourth identification information in the present embodiment is cause information (Cause) to indicate reasons why a detach procedure has been started. In addition, the fifty-fourth identification information may be information to indicate reasons why a condition of the UE_A 10 has been not appropriate due to changes of subscriber information, and the like.

For example, the fifty-fourth identification information may be information to indicate that connection to the core network_B 190 of the UE_A 10 and/or a DN has not allowed any more. In addition, the fifty-fourth identification information may be information to indicate that connection and/or registration of UE_A 10 to the CPF_A 140 has not allowed any more, or may be information to indicate that information to identify the UE_A 10 has become not normal and/or has not allowed any more. In addition, the fifty-fourth identification information may be information to indicate that connection of the UE_A 10 has been not appropriate due to network congestion or authentication, and the like.

In addition, the fifty-fourth identification information may be information to indicate that the use of both an NGS service and a non NGS service for the UE_A 10 has not allowed any more, or may be information to indicate that the use of an NGS service has not been allowed any more. In addition, the fifty-fourth identification information may be information to indicate that the use of both an NGS service and an EPS service for the UE_A 10 has not allowed any more, or may be information to indicate that the use of all an NGS service, an EPS service, and a non EPS service has not been allowed any more.

In addition, the fifty-fourth identification information may be information to indicate that it is necessary to switch a service used by the UE_A 10 from an NGS service to a non NGS service. In other words, the fifty-fourth identification information may be information to indicate that it is necessary to switch a session from the core network_B 190 to another core network, or may be information to indicate performing a handover from the core network_B 190 to another core network.

In addition, the fifty-fourth identification information may be information to indicate that a PLMN with which the UE_A 10 is connecting has not allowed, may be information to indicate a service which the UE_A 10 is using has not allowed any more in a current PLMN, or may be information to indicate that an appropriate cell has been not existing in a current PLMN.

In addition, the fifty-fourth identification information may be information to indicate that a tracking area with which the UE_A 10 is connecting has not allowed any more, or may be information to indicate a service which the UE_A 10 is using has not allowed any more in a current tracking area. In addition, the fifty-fourth identification information may be information to indicate that an appropriate cell has been not existing in a current tracking area, or may be information to indicate that loaming has not allowed any more in a current tracking area.

In addition, the fifty-fourth identification information may be information to indicate that an SSC mode which the UE_A 10 is using has not allowed any more, or may be information to indicate that an SSC mode which the UE_A 10 is using has not been supported any more. In addition, the fifty-fourth identification information may be information to indicate that an NSI with which the UE_A 10 is connecting has not allowed any more, or may be information to indicate that a network slice type which the UE_A 10 is using has not been supported any more.

Note that the UE_A 10 may determine whether or not to ignore the fifty-fourth identification information, based on the fifty-first identification information, or may determine whether or not to perform re-attaching, based on the fifty-fourth identification information. For example, in a case of having received information to indicate a switch from the core network_B 190 to another core network and/or a switch from an NGS service to a non NGS service, the UE_A 10 may perform re-attaching. In a case that the UE_A 10 has received the fifty-fourth identification information to indicate that the use of an NGS service is not allowed while an EPS service can be used, the UE_A 10 may not perform re-attaching. In addition, in a case of having received information to indicate that an EPS service cannot be used while an NGS service can be used, the UE_A 10 may not perform re-attaching. In addition, in a case of having received information to indicate reasons other than these, the UE_A 10 may not perform re-attaching.

The fifty-fifth identification information in the present embodiment is information to identify an NSI with which the UE_A 10 is connecting. In addition, the fifty-fifth identification information may be information such as an NSD ID to identify an NSI or a network slice type ID to identify a type of a network slice. In addition, the fifty-fifth identification information may be a UE usage type, or may be a part of a UE usage type. In addition, the fifty-fifth identification information may be an APN. Note that the fifty-fifth identification information may include information to identify multiple NSIs. The fifty-fifth identification information may be configured including information to identify a Network Function (NF) in the core network_B 190. In addition, the fifty-fifth identification information may be registration information of a UE.

The fifty-sixth identification information in the present embodiment is information to identify a DCN with which the UE_A 10 is to be connected next and/or connection has been allowed. The fifty-sixth identification information may be a UE usage type, may be a DCN ID, or may be other information. Note that the fifty-sixth identification information may be information to indicate a DCN selected by the CPF_A 140, based on mapping information of an NSI and a DCN, or may be information to indicate a default DCN. Note that the fifty-sixth identification information may be transmitted and/or received associated with the fifty-seventh identification information described below. In other words, information to identify a DCN and a service which can be provided by connecting with the DCN may be associated and transmitted and/or received.

The fifty-seventh identification information in the present embodiment is information to indicate whether or not each session can be shifted to other systems. In addition, the fifty-seventh identification information may be information to identify sessions which can be switched to other systems.

In addition, the fifty-seventh identification information may be information to identify services and/or sessions which can be shifted from an NSI to a DCN, and/or APN, or may be information to indicate an association of an NSI and a DCN. Note that there may be included multiple pieces of information to identify services. In other words, the fifty-seventh identification information may be a group of information to identify multiple services. In addition, the identification information of each service may be transmitted and/or received associated with a DCN included in the fifty-sixth identification information for each service.

The sixty-first identification information in the present embodiment is information to indicate a type of a session of which the UE_A 10 requests an establishment. Note that information to indicate a type of a session of which the UE_A 10 requests an establishment may be a request type. In addition, the sixty-first identification information may be information to indicate that a session establishment procedure required is an initial establishment procedure, may be information to indicate that a session establishment procedure required is a handover procedure from other services and/or other access network and/or other core networks, or may be information to indicate that a session establishment procedure required is an establishment procedure of a session for an emergency call.

In addition, the sixty-first identification information may be information to indicate a handover from the core network_B 190 to the core network_A 90. In addition, the sixty-first identification information may be information to indicate establishing a session to switch a session from the core network_B 190 to the core network_A 90, or may be information to indicate establishing a session to switch a session from an NGS service to an EPS service.

The sixty-second identification information in the present embodiment is information to identify sessions which are shifted to other systems. In addition, the sixty-second identification information may be information to identify a session to switch from an NGS service to an EPS service, or may be information to identify a session to switch from the core network_B 190 to the core network_A 90.

In addition, the sixty-second identification information may be information to indicate that PDN connection and/or an EPS bearer of which an establishment is requested is established to switch a session from an NGS service and/or the core network_B 190.

The sixty-third identification information in the present embodiment is information to identify an external network such as a DN of which the UE_A 10 requests connection. In addition, the sixty-third identification information may be an APN. In addition, the sixty-third identification information may be information including multiple APNs, or may be information including an APN and a UN ID.

In addition, the sixty-third identification information may be an APN based on information received by the UE_A 10 in an attach procedure to the core network_B 190 and/or a PDU session establishment procedure. In other words, the sixty-third identification information may be an APN associated with a DN ID indicated by the eleventh identification information, or may be an APN indicated by the sixteenth identification information.

The sixty-fourth identification information in the present embodiment is information to identify the MME_A 40 of which the UE_A 10 requests connection. In addition, the sixty-fourth identification information may be information to indicate the MME_A 40 which can be connected by the UE_A 10, or may be information to identify the MME_A 40 which is connected by the UE_A 10 before. In addition, the sixty-fourth identification information may be information to identify the UE_A 10. For example, the sixty-fourth identification information may be a GUTI, may be an IMSI, may be an EPS mobile identity, or may be other information.

The sixty-fifth identification information in the present embodiment may include information to identify the CPF_A 140 which can be connected by the UE_A 10, or may include information to identify the CPF_A 140 which is connected by UE_A 10 before. In addition, the sixty-fifth identification information may be information to identify the UE_A 10. For example, the sixty-fifth identification information may be a CPF ID, may be a GUTI, may be an IMSI, may be an NGS mobile identity, or may be other information. Note that in a case that multiple CPF_A 140s exist in the core network_B 190, the CPF_A 140 may be a common CPF which connects the core network_B 190 and the UE_A 10, and transmits and/or receives a control message to and/or from the UE_A 10. In that case, the sixty-fifth identification information may include a common CPF ID.

The sixty-sixth identification information in the present embodiment is information to indicate a type of a connection service of which the UE_A 10 requests the use. Note that the sixty-sixth identification information may be information to indicate that the UE_A 10 requests the use of only an EPS service, or may be information to indicate that the UE_A 10 requests the use of both an EPS service and a non EPS service. In other words, the sixty-sixth identification information may be information to indicate that the UE_A 10 requests the use of an EPS service and an NGS service, or may be information to indicate that the UE_A 10 requests the use of an EPS service, an NGS service, and a non EPS service.

In addition, the sixty-sixth identification information may be information to indicate a type of an attach procedure requested by the UE_A 10, or may be an attach type. In other words, the sixty-sixth identification information may be information to indicate requiring registration and/or connection only to the core network_A 90, or may be information to indicate requiring registration and/or connection to both the core network_A 90 and the core network_B 190.

The sixty-seventh identification information in the present embodiment is information to indicate a type of a connection service of which the UE_A 10 supports the use. Note that the sixty-seventh identification information may be information to indicate that the UE_A 10 supports the use of only an EPS service, or may be information to indicate that the UE_A 10 supports the use of both an EPS service and a non EPS service. In other words, the sixty-seventh identification information may be information to indicate that the UE_A 10 supports the use of an EPS service and an NGS service, or may be information to indicate that the UE_A 10 supports the use of an EPS service, an NGS service, and a non EPS service.

In addition, the sixty-seventh identification information may be capability information of the UE_A 10 to indicate a type of an attach procedure which the UE_A 10 supports. In other words, the sixty-seventh identification information may be capability information of the UE_A 10 which supports registration and/or connection only to core network_A 90, or may be capability information of the UE_A 10 which supports registration and/or connection to both the core network_A 90 and the core network_B 190.

The sixty-eighth identification information in the present embodiment is information to identify a DCN which the UE_A 10 requests to the core network_A 90. In addition, the sixty-eighth identification information may be a UE usage type, or may be a DCN ID. The sixty-eighth identification information may be information acquired beforehand from the network to identify a DCN with which the UE_A 10 is to be connected next and/or connection has been allowed.

The sixty-ninth identification information in the present embodiment is information to identify an NSI with which the UE_A 10 has connected. In addition, the sixty-eighth identification information may be information such as an NSD ID to identify an NSI or a network slice type ID to identify a type of a network slice. In addition, the sixty-eighth identification information may be a UE usage type, or may be a part of a UE usage type. In addition, the sixty-eighth identification information may be an APN. Note that the sixty-sixth identification information may include information to identify multiple NSIs. The sixty-eighth identification information may be configured including information to identify a Network Function (NF) in the core network_B 190. In addition, the sixty-eighth identification information may be registration information of a UE.

The seventy-first identification information in the present embodiment is information to identify sessions which are shifted to other systems. In addition, the seventy-first identification information may be information to identify a session to switch from an NGS service to an EPS service, or may be information to identify a session to switch from the core network_B 190 to the core network_A 90.

The seventy-second identification information in the present embodiment is cause information (Cause) to indicate reasons why a session release procedure has been started. In addition, the seventy-second identification information may be information to indicate reasons why a condition of a session being established has been not appropriate due to changes of subscriber information, and the like.

For example, the seventy-second identification information may be information to indicate that a service which the UE_A 10 is using has been unable to use due to operator policies, or may be information to indicate that a service which the UE_A 10 is using has been unable to provide due to resource shortage of the network. In addition, the seventy-second identification information may be information to indicate that an error has happened in the network, or may be information to indicate periodical resource release.

In addition, the seventy-second identification information may be information to indicate that re-establishment of a session and/or re-validation of a session is required. In addition, the seventy-second identification information may be information to indicate that it is necessary to switch a service being used by the UE_A 10 from an NGS service to a non NGS service. In other words, the seventy-second identification information may be information to indicate that it is necessary to switch a session from the core network_B 190 to another core network, or may be information to indicate performing a handover from the core network_B 190 to another core network. Note that another core network may be the core network_A 90, or may be a core network which is identified with the seventy-third identification information.

In addition, the seventy-second identification information may be information to indicate that an SSC mode which the UE_A 10 is using has not allowed any more, or may be information to indicate that an SSC mode which the UE_A 10 is using has not been supported any more. In addition, the seventy-second identification information may be information to indicate that an NSI with which the UE_A 10 is connecting has not allowed any more, or may be information to indicate that a network slice type which the UE_A 10 is using has not been supported any more.

Note that the UE_A 10 may determine whether or not to perform re-establishment of a session, based on the seventy-second identification information. For example, in a case of having received information to indicate a switch from the core network_B 190 to another core network and/or a switch from an NGS service to a non NGS service, the UE_A 10 may perform re-establishment of a session. In addition, in a case of having received information to indicate that re-establishment of a session and/or re-validation of a session is required, the UE_A 10 may perform re-establishment of a session. In a case of having received information to indicate reasons other than this, the UE_A 10 may not perform re-establishment of a session.

The seventy-third identification information in the present embodiment is information to indicate a system connected in re-establishment of a session. A system connected may be a system which provides an NGS service, may be a system which provides an EPS, or may be a system which provides a non EPS service. In addition, the seventy-third identification information may be information to indicate a core network connected in re-establishment of a session. For example, the seventy-third identification information may be information to indicate the core network_A 90, or may be information to indicate the core network_B 190.

In addition, the seventy-third identification information may be information to indicate a type of a control message used in re-establishment of a session. For example, the seventy-third identification information may indicate, after a session release procedure, performing a session establishment procedure using a control message for an EPS, or may indicate performing a session establishment procedure using a control message for an NGS.

The seventy-fourth identification information in the present embodiment is information to indicate whether or not transmission and/or reception of information to indicate a handover is required at re-establishment of a session. In addition, the seventy-fourth identification information may be information to indicate whether or not a session establishment procedure to another core network after a session release procedure is required, or may be information to indicate whether or not a session establishment procedure to another core network after a session release procedure is supported.

In addition, the seventy-fourth identification information may be information to indicate that the core network_B 190 requests the UE_A 10 to perform a session establishment procedure to another core network after a session release procedure. In addition, the seventy-fourth identification information may be information to indicate that a session establishment procedure after a session release procedure is required to switch a session from the core network_B 190 to another core network.

The seventy-fifth identification information in the present embodiment is information to identify an NSI with which the UE_A 10 is connecting. In addition, the seventy-fifth identification information may be information such as an NSD ID to identify an NSI or a network slice type ID to identify a type of a network slice. In addition, the seventy-fifth identification information may be a UE usage type, or may be a part of a UE usage type. In addition, the seventy-fifth identification information may be an APN. Note that the seventy-fifth identification information may include information to identify multiple NSIs. The seventy-fifth identification information may be configured including information to identify a Network Function (NF) in the core network_B 190. In addition, the seventy-fifth identification information may be registration information of a UE.

The seventy-sixth identification information in the present embodiment is information to identify a DCN with which the UE_A 10 is to connected next and/or connection has been allowed. The seventy-sixth identification information may be a UE usage type, may be a DCN ID, or may be other information. Note that the seventy-sixth identification information may be information to indicate a DCN selected by the CPF_A 140, based on mapping information of an NSI and a DCN, or may be information to indicate a default DCN.

Figure 14:
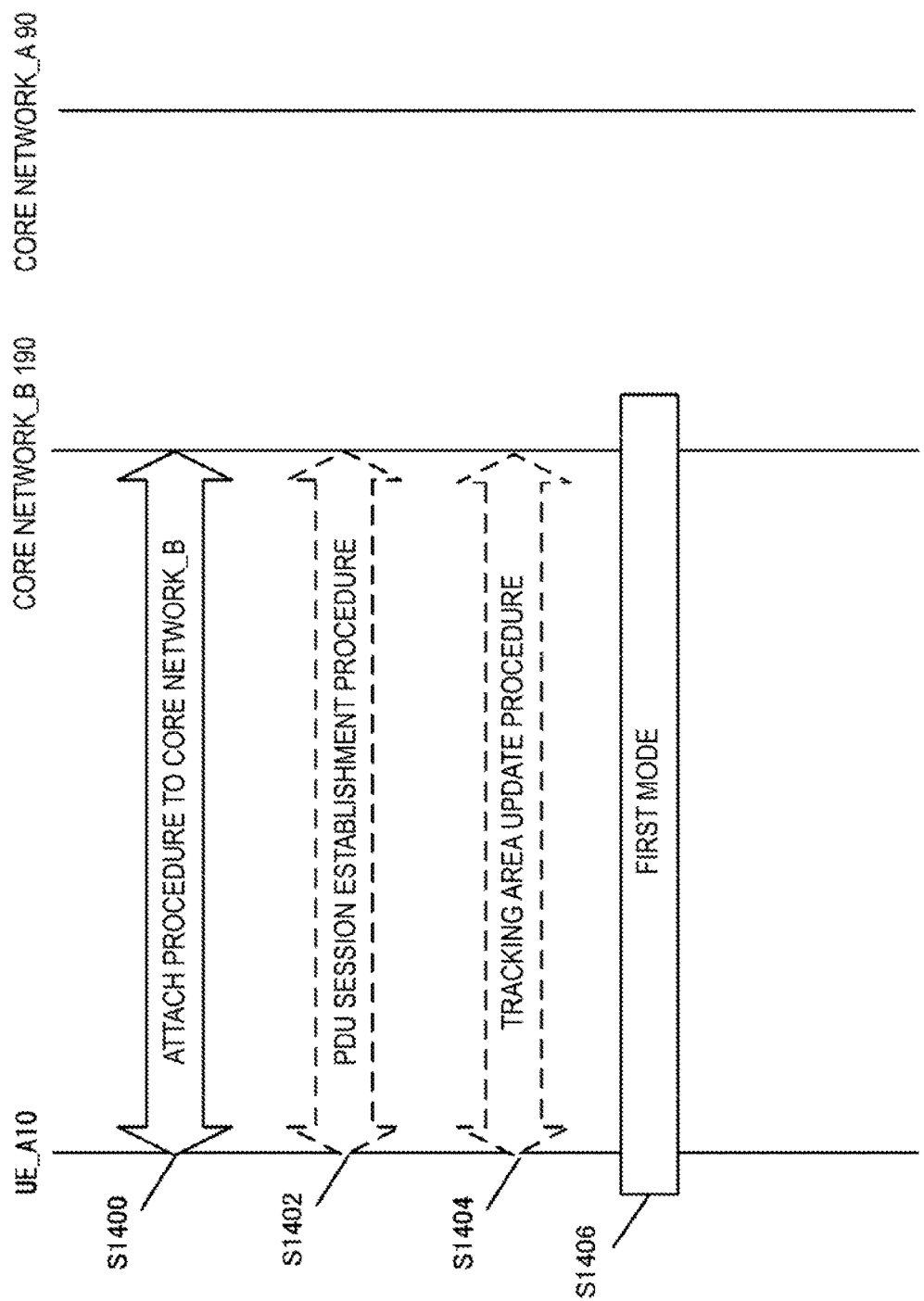
FIG. 14 is a diagram illustrating an initial procedure for a core network_B.

In the present embodiment, the initiation to the core network_B 190 will now be described using FIG. 14. In the present embodiment, each apparatus makes transition to the first condition by performing an initial procedure to the core network_B 190, and the UE_A 10 establishes a session through the core network_B 190. As follows, the present procedure refers to an initial procedure to the core network_A 90, and each procedure includes an attach procedure, a PDN connectivity procedure, and a tracking area update procedure. Details of each procedure will be described below.

In the present procedure, each apparatus at first performs an attach procedure (S1400) to the core network_B 190, and the UE_A 10 makes transition to a condition connected to the network. Then, each apparatus performs a PDU session establishment procedure (S1402), and makes transition to the first condition (S1404). In addition, after a PDU session establishment and before making transition to the first condition, each apparatus may perform a tracking area update procedure (S1404). Note that each apparatus may exchange various capability information and/or various request information of each apparatus in an attach procedure to the core network_B 190, and/or a PDU session establishment procedure, and/or a tracking area update procedure.

Note that in a case of having performed exchange of various information and/or negotiation of various request in an attach procedure to the core network_B 190, each apparatus may not perform exchange of various information and/or negotiation of various request in a PDU session establishment procedure. On the contrary, in a case of not having performed exchange of various information and/or negotiation of various request in an attach procedure to the core network_B 190, each apparatus may perform exchange of various information and/or negotiation of various request in a PDU session establishment procedure. Not only this, even in a case of having performed exchange of various information and/or negotiation of various request in an attach procedure to the core network_B 190, each apparatus may perform exchange of various information and/or negotiation of various request in a PDU session establishment procedure.

For example, in an attach procedure to the core network_B 190 and a PDU session establishment procedure, the UE_A 10 may exchange one or more of the first identification information to the ninth identification information with the core network_B 190, and the core network_B 190 may receive one or more of the first identification information to the ninth identification information from the UE_A 10, and in addition, transmit one or more of the eleventh identification information to the twenty-sixth identification information to the UE_A 10.

The UE_A 10 transmits one or more of the first identification information to the ninth identification information to the core network_A 90 in an attach procedure to the core network_B 190, and may not transmit one or more of the first identification information to the ninth identification information to the core network_A 90 in a PDU session establishment procedure. Similarly, the core network_B 190 transmits one or more of the eleventh identification information to the twenty-sixth identification information to the UE_A 10 in an attach procedure, and may not transmit one or more of the eleventh identification information to the twenty-sixth identification information to the UE_A 10 in a PDU session establishment procedure.

On the contrary, for each apparatus, the UE_A 10 may not transmit one or more of the first identification information to the ninth identification information to the core network_B 190 in an attach procedure to the core network_B 190, and may transmit one or more of the first identification information to the ninth identification information to the core network_B 190 in a PDU session establishment procedure. Similarly, the core network_B 190 may not transmit one or more of the eleventh identification information to the twenty-sixth identification information to the UE_A 10 in an attach procedure to the core network_B 190, and may transmit one or more of the eleventh identification information to the twenty-sixth identification information to the UE_A 10 in a PDU session establishment procedure.

The UE_A 10 may transmit identification information which has not been transmitted in an attach procedure to the core network_B 190 among the first identification information to the ninth identification information the core network_B 190 in a PDU session establishment procedure. Similarly, the core network_B 190 may transmit identification information which has not been transmitted in an attach procedure to the core network_B 190 among the eleventh identification information to the twenty-sixth identification information to the UE_A 10 in a PDU session establishment procedure.

In addition, each apparatus may transmit and/or receive these pieces of identification information in an attach procedure to the core network_B 190 in a case of managing these pieces of identification information by associating them with the UE_A 10, or may transmit and/or receive these pieces of identification information in a PDU session establishment procedure in a case of managing these pieces of identification information by associating them with a PDU session and/or an EPS bearer.

Each apparatus may perform a PDU session establishment procedure in an attach procedure to the core network_B 190, or may perform a PDU session establishment procedure after completion of an attach procedure to the core network_B 190. Note that in a case that a PDU session establishment procedure is performed in an attach procedure to the core network_B 190, each apparatus may establish a PDU session, based on completion of an attach procedure to the core network_B 190, or may make transition to the first condition.

Then, each apparatus performs a tracking area update procedure (S1404). Note that a tracking area update procedure may be performed at any timing after having established a PDU session and before transition or after transition to the first condition. Each apparatus may exchange various request information in a tracking area update procedure. For example, in a tracking area update procedure, the UE_A 10 may transmit one or more of the thirty-first identification information to the thirty-seventh identification information to the core network_B 190. In addition, the core network_B 190 may transmit one or more of the forty-first identification information to the forty-sixth identification information and the twenty-first identification information to the twenty-sixth identification information to the UE_A 10.

By the above-mentioned procedures, each apparatus completes the present procedure. Note that by transmitting and/or receiving each control message described in the present procedure, each apparatus involved in the present procedure may transmit and/or receive one or more identification information included in each control message, and may store each transmitted and/or received identification information as a context. In addition, each apparatus may make transition to an appropriate condition, based on completion of the present procedure.

1.3.1. Brief Description of Attach Procedure to Core Network_B

First of all, a brief description of an attach procedure to the core network_B 190 will be described. An attach procedure to the core network_B 190 is a procedure initiated by the UE_A 10 to connect with a network (an access network, and/or the core network_B 190, and/or the PDN_A 5). In a condition of not being connected with the core network_B 190, the UE_A 10 can perform the present procedure at any timing such as at terminal power activation. In other words, the UE_A 10 may start the present procedure at any timing in a case of being in a deregistered condition (EMM-DEREGISTERED). Each apparatus may make transition to a registered condition (EMM-REGISTERED), based on completion of an attach procedure to the core network_B 190.

1.3.2. Example of PDU Session Establishment Procedure

An example of a PDU session establishment procedure will now be described. As follows, the present procedure refers to a PDN connectivity procedure. The present procedure is a procedure for each apparatus to establish a PDU session. Note that each apparatus may perform the present procedure in a condition of having completed an attach procedure to the core network_B 190, or may perform the present procedure in an attach procedure to the core network_B 190. Each apparatus may initiate the present procedure at any timing after an attach procedure to the core network_B 190. Each apparatus may establish a PDU session, based on completion of a PDU session establishment procedure. In addition, each apparatus may establish multiple PDU sessions by performing the present procedure several times.

1.3.2.1. Example of PDU Session Establishment Procedure

Figure 15:
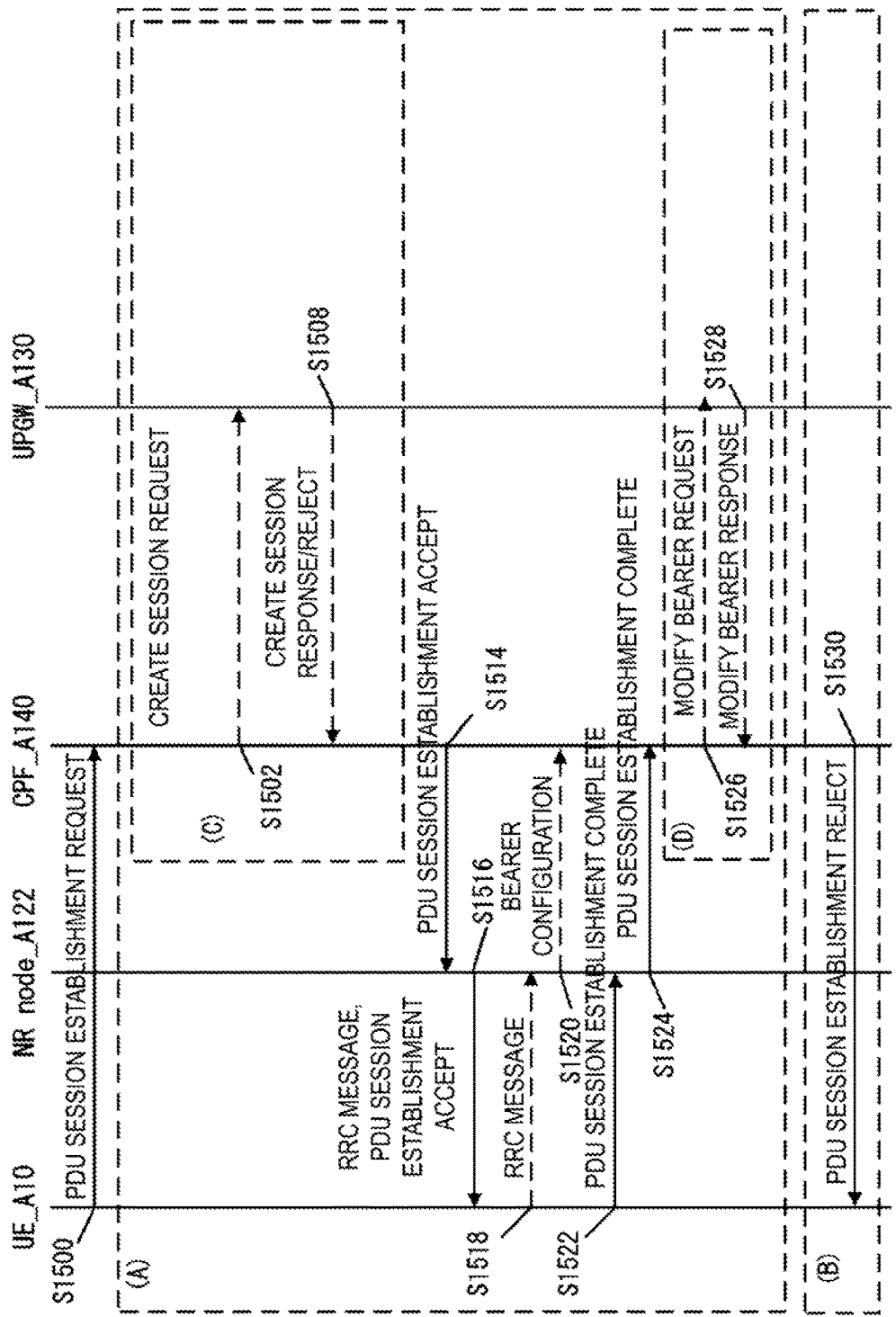
FIG. 15 is a diagram illustrating a PDU session establishment procedure.

Using FIG. 15, an example of a procedure to perform a PDU session establishment procedure will be described. As follows, each step of the present procedure will be described. First of all, the UE_A 10 initiates a PDU session establishment procedure by a transmission of a PDU Session Establishment Request message to the CPF_A 140 through the NR node_A 122 (S1500). Note that in a case that a PDU session is PDN connection, the PDU session establishment request message may be a PDN connectivity request message. The PDU session establishment request message is not limited to this, and may be a message to request an establishment of a PDU session.

Here, the UE_A 10 may include at least one or more of the first identification information to the ninth identification information in a PDU session establishment request message, or may indicate a request of the UE_A 10, by including these pieces of identification information.

In addition, each apparatus may indicate a connection service which the UE_A 10 requests and/or supports, by transmitting and/or receiving the second identification information and/or the third identification information. In addition, each apparatus may indicate a mode of service continuation in switching to an EPS service which the UE_A 10 supports and/or requests, by transmitting and/or receiving the fourth identification information and/or the fifth identification information.

In addition, each apparatus may indicate a type of a DN which the UE_A 10 requests, by transmitting and/or receiving the first identification information and/or the sixth identification information. In addition, each apparatus may indicate an NSI with which the UE_A 10 requests connection, by transmitting and/or receiving the ninth identification information. In addition, each apparatus may indicate the MME_A 40 or the CPF_A 140 with which the UE_A 10 requests connection, by including the seventh identification information and/or the eighth identification information.

In addition, each apparatus may indicate whether or not a PDU session with which an establishment is requested can maintain connectivity by the same IP address even at switching a connection destination of a PDU session, by transmitting and/or receiving one or more of the first identification information to the ninth identification information.

Note that the timing of switching a connection destination of a PDU session may be a timing of switching a PDU session from an NGS service to an EPS service, or may be a timing of switching a PDU session from the core network_B 190 to the core network_A 90.

The CPF_A 140 receives a PDU session establishment request message, and performs the first condition determination. The first condition determination is intended to determine whether or not the CPF_A 140 accepts a request of the UE_A 10. In the first condition determination, the CPF_A 140 determines whether the first condition is true or false. The CPF_A 140 starts the procedure of (A) in the present procedure in a case that the first condition is true, and starts the procedure of (B) in the present procedure in a case that the first condition is false. Note that steps in a case that the first condition is false will be described later.

As follows, steps in a case that the first condition is true, in other words, each step of the procedure of (A) in the present procedure will be described. The CPF_A 140 performs the procedure of (C) in the present procedure, and starts the procedure of (A) in the present procedure. In addition, each step of the procedure of (C) in the present procedure will be described. The CPF_A 140 transmits a create session request message to the UPGW_A130, and starts the procedure of (C) in the present procedure (S1502).

Here, the CPF_A 140 may include at least one or more of the first identification information to the ninth identification information in a create session request message, may include information to indicate whether or not it is an initial request, or may convey a request of the UE_A 10, by including these pieces of identification information.

In addition, the UPGW_A130 receives a create session request message, and performs the third condition determination. Note that the third condition determination is intended to determine whether or not the UPGW_A130 accepts a request of the UE_A 10. The third condition being true may be in a case of accepting a request of the UE_A 10, and may be in a case that a request of the UE_A 10 is allowed. The third condition being false may be in a case of rejecting a request of the UE_A 10, or may be in a case of not determining the third condition being true.

The third condition determination may be performed not by the UPGW_A130 but by another apparatus (e.g., the PCRF_A 60). In that case, the UPGW_A130 performs an IP-CAN session establishment procedure with the PCRF_A 60. More specifically, the UPGW_A130 transmits a request message to the PCRF_A 60 in an IP-CAN session establishment procedure. In addition, the PCRF_A 60 receives a request message in an IP-CAN session establishment procedure, determines the third condition, and transmits a response message in an IP-CAN session establishment procedure to the UPGW_A130. In addition, the UPGW_A130 receives a response message in an IP-CAN session establishment procedure, and recognizes a result of the third condition determination.

Here, the UPGW_A130 may include at least one or more of the first identification information to the ninth identification information in a request message in an IP-CAN session establishment procedure, or may convey a request of the UE_A 10, by including these pieces of identification information.

The PCRF_A 60 may include at least a result of the third information determination in a response message in an IP-CAN session establishment procedure, or may notify the UPGW_A130 of a result of the third condition determination by including this result.

In addition, the PCRF_A 60 may include one or more of the eleventh identification information to the nineteenth identification information in a response message in an IP-CAN session establishment procedure, or may indicate that a request of the UE_A 10 has been allowed, by including these pieces of identification information.

The PCRF_A 60 may include one or more of the twenty-first identification information to the twenty-sixth identification information in a response message in an IP-CAN session establishment procedure, or may indicate that a request of the UE_A 10 has been rejected, by including these pieces of identification information.

Note that in a case that the PCRF_A 60 has performed the third condition determination, the UPGW_A130 may perform the third condition determination, based on a result of the third condition determination received from the PCRF_A 60. For example, in a case that the PCRF_A 60 accepts a request of the UE_A 10, the PCRF_A 60 and the UPGW_A130 may assume the third condition as true, and in a case that the PCRF_A 60 rejects a request of the UE_A 10, the PCRF_A 60 and the UPGW_A130 may assume the third condition as false.

In the third condition determination, the UPGW_A130 determines whether the third condition is true or false. In a case that the third condition is true, the UPGW_A130 transmits a session generation response message to the CPF_A 140 (S1506). In addition, the CPF_A 140 receives a session generation response message.

The UPGW_A130 may include one or more of the eleventh identification information to the nineteenth identification information in a session generation response message, may include an IP address in a session generation response message, or may indicate that a request of the UE_A 10 has been allowed, by including these pieces of identification information.

In a case that the third condition is false, the UPGW_A130 transmits a session generation reject message to the CPF_A 140 (S1508). Note that the session generation reject message may be a session generation response message including a Reject cause.

The UPGW_A130 may include one or more of the twenty-first identification information and the twenty-sixth identification information in a session generation reject message, or may indicate that a request of the UE_A 10 has been rejected, by including these pieces of identification information.

Each apparatus completes the procedure of (C) in the present procedure, based on transmission and/or reception of a session generation response message and/or a session generation reject message.

The CPF_A 140 transmits a PDU session establishment accept message to the NR node_A122, based on reception of a session generation response message (S1514). Note that in a case of having received a session generation reject message, the CPF_A 140 may not continue the procedure of (A) in the present procedure, and may start the procedure of (B) in the present procedure. In a case that a PDU session is PDN connection, a PDU session establishment accept message may be a PDN Connectivity Accept message, or may be an Activate default EPSbearer context request message. A PDU session establishment accept message may be a response message to a PDU session establishment request message but not limited to this, and may be a message to accept a request of a PDU session establishment.

The NR node_A122 receives a PDU session establishment accept message, and transmits an RRC message which may be an RRC message such as an RRC Connection Reconfiguration message and an RRC ConnectionSetup message or an RRC Direct Transfer message) and/or a PDU session establishment accept message to the UE_A 10 (S1516). Note that a PDU session establishment accept message may be transmitted and/or received included in an RRC message.

Here, the CPF_A 140 may include at least one or more of the eleventh identification information to the nineteenth identification information in a PDU session establishment accept message, may include an IP address in a PDU session establishment accept message, or may indicate that a request of the UE_A 10 has been accepted, by including these pieces of identification information.

In addition, each apparatus may indicate a connection service which the network allows and/or supports, by transmitting and/or receiving the twelfth identification information and/or the thirteenth identification information. In addition, each apparatus may indicate a mode of service continuation in switching to an EPS service which the network supports and/or allows, by transmitting and/or receiving the fourteenth identification information and/or the fifteenth identification information.

In addition, each apparatus may indicate a type of a DN which the network allows, by transmitting and/or receiving the eleventh identification information and/or sixteenth identification information. In addition, each apparatus may indicate an NSI with which the network allows connection, by transmitting and/or receiving the nineteenth identification information. In addition, each apparatus may indicate the MME_A 40 or the CPF_A 140 with which the network allows connection, by transmitting and/or receiving the seventeenth identification information and/or the eighteenth identification information.

In addition, for example, each apparatus may indicate reasons why a request of the UE_A 10 has been accepted, by transmitting and/or receiving one or more of the eleventh identification information to the nineteenth identification information. In addition, each apparatus may indicate processes which each apparatus is to perform after the present procedure, based on reasons why a request of the UE_A 10 has been accepted, may perform the present procedure again, or may perform the present procedure in another condition. For example, the UE_A 10 may perform connection to the core network_A 90 and/or switch of an EPS service, based on processes which each apparatus is to perform included in reasons why a PDU session establishment procedure has been accepted.

In addition, each apparatus may indicate whether or not a PDU session established can maintain connectivity by the same IP address even at switching a connection destination of a PDU session, by transmitting and/or receiving one or more of the eleventh identification information to the nineteenth identification information.

In a case of having received an RRC message, the UE_A 10 transmits an RRC message (e.g., which may be an RRC message such as an RRC Connection Reconfiguration Complete message, an RRC Connection Setup Complete message, and an RRCDirect Transfer message) to the NR node_A122 (S1518). The NRnode_A122 receives an RRC message, and transmits a bearer configuration message to the CPF_A 140 (S1520). In addition, the CPF_A 140 receives a bearer configuration message.

In a case of having received a PDU session establishment accept message, the UE_A 10 transmits a PDU session establishment complete message to the CPF_A 140 through the NR node_A122 (S1522), (S1524). In addition, the CPF_A 140 receives a PDU session establishment complete message, and performs the second condition determination. Note that in a case that a PDU session is PDN connection, a PDU session establishment complete message may be a PDN Connectivity complete message, or may be an Activate default EPSbearer context accept message. A PDU session establishment complete message may be a response message to a PDU session establishment accept message but not limited to this, and may be a message to indicate that a PDU session establishment procedure completes.

The second condition determination is intended to determine necessity or not of the need that the CPF_A 140 requests a modification of a bearer in the UPGW_A130. In a case that the second condition is true, the CPF_A 140 starts the procedure of (D) in the present procedure. In a case that the second condition determination is false, the CPF_A 140 does not perform the procedure of (D) in the present procedure. As follows, each step of the procedure of (D) in the present procedure will be described. In a case that the second condition is true, the CPF_A 140 transmits a modify bearer request message to the SGW_A35 (S1526), and starts the procedure of (D) in the present procedure. In addition, the SGW_A35 receives a modify bearer request message, and transmits a modify bearer response message to the CPF_A 140 (S1528). In addition, the CPF_A 140 receives a modify bearer response message, and completes the procedure of (D) of the present procedure. In addition, each apparatus completes the procedure of (A) in the present procedure, based on transmission and/or reception of a PDU session establishment complete message in a case that the second condition determination is false, and/or based on completion of the procedure of (D) in the present procedure in a case that the second condition determination is true.

Each step of the procedure of (B) in the present procedure will now be described. The CPF_A 140 initiates the procedure of (B) in the present procedure by a transmission of a PDU session establishment reject message to the UE_A 10 through the NR node_A122 (S1530). In addition, the UE_A 10 recognizes that a request of the UE_A 10 has been rejected by receiving the PDU session establishment reject message. Each apparatus completes the procedure of (B) in the present procedure, based on transmission and/or reception of the PDU session establishment reject message. The PDU session establishment reject message may include an appropriate reject cause. Note that in a case that a PDU session is PDN connection, the PDU session establishment reject message may be a PDN Connectivity reject message. The PDU session establishment reject message may be a response message to a PDU session establishment request message but not limited to this, and may be a message to reject a request of establishment of a PDU session.

The CPF_A 140 may include one or more of the twenty-first identification information to the twenty-sixth identification information in a PDU session establishment reject message, or may indicate that a request of the UE_A 10 has been rejected, by including these pieces of identification information.

In addition, each apparatus may indicate reasons why a PDU session establishment procedure has been rejected, by transmitting and/or receiving the twenty-first identification information, or may indicate processes which each apparatus is to perform after an attach procedure to the core network_B 190.

In addition, each apparatus may indicate that the network does not support and/or allow connection to the core network_A 90 and/or switch of an EPS service, by transmitting and/or receiving the twenty-second identification information and/or the twenty-third identification information. In addition, each apparatus may indicate a mode of service continuation in switching to an EPS service which the network does not support and/or allow, by transmitting and/or receiving the twenty-fourth identification information and/or the twenty-fifth identification information. In addition, each apparatus may indicate an NSI with which the network does not allow connection, by transmitting and/or receiving the twenty-sixth identification information.

Each apparatus completes the present procedure, based on completion of the procedures of (A) or (B) of the present procedure. Note that each apparatus may make transition to a condition where a PDU session has been established, based on completion of the procedure of (A) in the present procedure, may recognize that the present procedure has been rejected, based on completion of the procedure of (B) in the present procedure, or may make transition to a condition where a PDU session is not established.

In addition, each apparatus may perform processes based on identification information transmitted and/or received in the present procedure, based on completion of the present procedure. For example, in a case of having transmitted and/or received one or more of the twenty-first identification information to the twenty-sixth identification information, each apparatus may recognize reasons why a request of the UE_A 10 has been rejected. In addition, each apparatus may perform the present procedure again, based on reasons why a request of the UE_A 10 has been rejected, or may perform the present procedure in another condition. For example, the UE_A 10 may perform connection to the core network_A 90 and/or switch of an EPS service, based on processes which is to be performed by each apparatus and is included in reasons why a PDU session establishment procedure has been accepted.

The previously described first condition determination to the third condition determination may be performed based on identification information, and/or subscriber information, and/or operator policies included in a PDU session establishment request message. Conditions that true or false of the first condition to the third condition is determined may not be limited to the previously described conditions.

For example, the first condition and/or the third condition may be true in a case that the UE_A 10 requests an establishment of a session and the network allows the request. The first condition and/or the third condition may be false in a case that the UE_A 10 requests an establishment of a session and the network does not allow the request. In addition, the first condition and/or the third condition may be false in a case that the network of a connection destination of the UE_A 10 and/or an apparatus in the network does not support an establishment of a session that the UE_A 10 requests.

1.3.3. Example of Attach Procedure to Core Network_B

Figure 16:
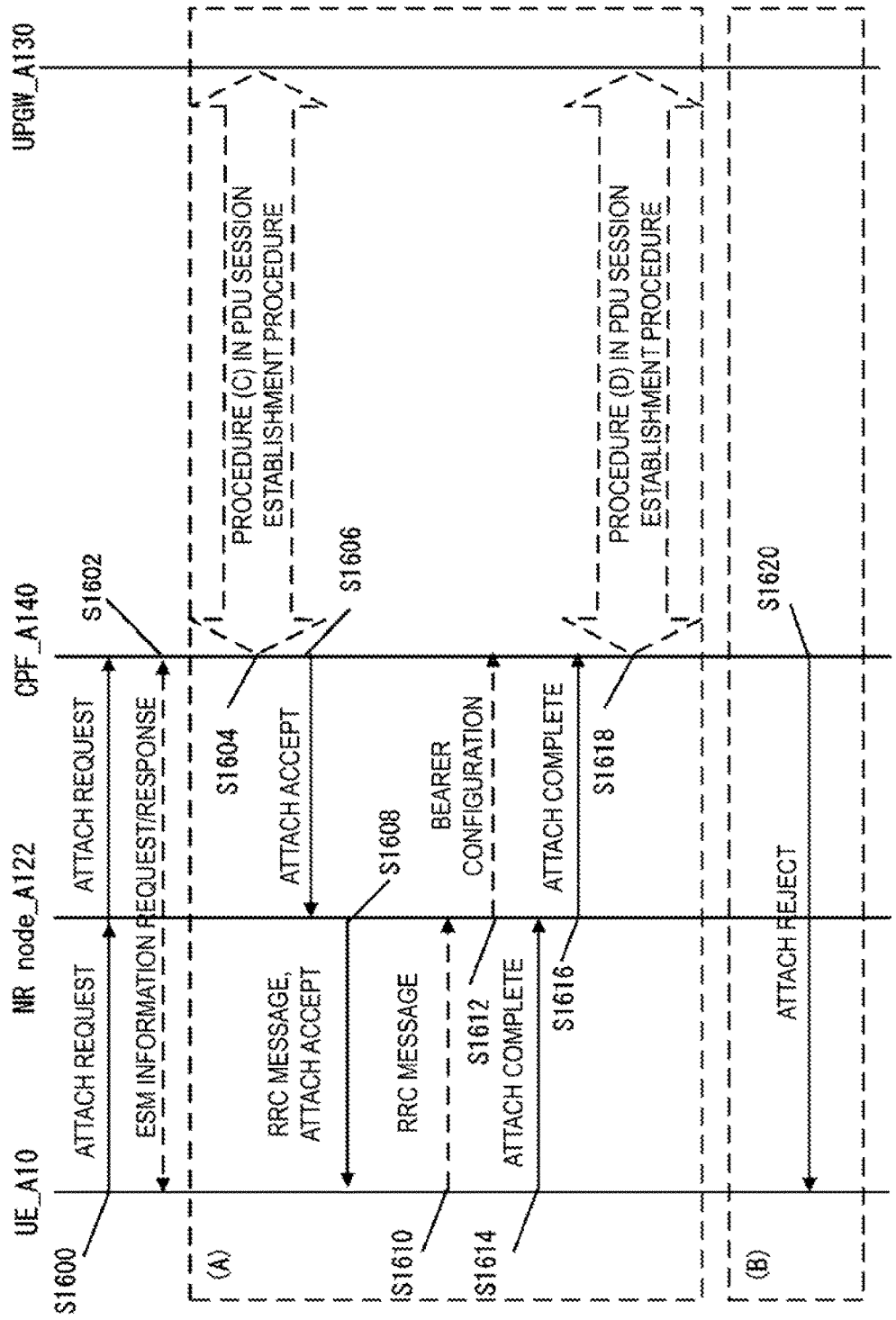
FIG. 16 is a diagram illustrating an attach procedure to the core network_B.

Using FIG. 16, an example of a procedure to perform an attach procedure to the core network_B 190 will be described. As follows, the present procedure refers to an attach procedure to the core network_B 190. The present procedure is a procedure for the UE_A 10 to be registered with the core network_B 190. As follows, each step of the present procedure will be described. First of all, the UE_A 10 transmits an Attach request message to the CPF_A 140 through the NR node_A122 (S1600), and starts an attach procedure to the core network_B 190. The UE_A 10 may transmit including the previously described PDU session establishment request message in an attach request message, or may request performing a PDU session establishment procedure in an attach procedure to the core network_B 190, by including a PDU session establishment request message.

Here, the UE_A 10 may include at least one or more of the first identification information to the ninth identification information in an attach request message, or may indicate a request of the UE_A 10, by including these pieces of identification information.

In addition, each apparatus may indicate a connection service which the UE_A 10 requests and/or supports, by transmitting and/or receiving the second identification information and/or the third identification information. In addition, each apparatus may indicate a mode of service continuation in switching to an EPS service which the UE_A 10 supports and/or requests, by transmitting and/or receiving the fourth identification information and/or the fifth identification information.

In addition, each apparatus may indicate a type of a DN which the UE_A 10 requests, by transmitting and/or receiving the first identification information and/or the sixth identification information. In addition, each apparatus may indicate an NSI with which the UE_A 10 requests connection, by transmitting and/or receiving the ninth identification information. In addition, each apparatus may indicate the MME_A 40 or the CPF_A 140 with which the UE_A 10 requests connection, by including the seventh identification information and/or the eighth identification information.

In addition, each apparatus may indicate whether or not a PDU session with which an establishment is requested can maintain connectivity by the same IP address even at switching a connection destination of a PDU session, by transmitting and/or receiving one or more of the first identification information to the ninth identification information.

Note that the UE_A 10 may transmit including these pieces of identification information in a control message different from an attach request message.

The CPF_A 140 receives an attach request message and/or a control message different from an attach request message, and performs the first condition determination. The CPF_A 140 starts the procedure of (A) in the present procedure in a case that the first condition is true, and starts the procedure of (B) in the present procedure in a case that the first condition is false.

As follows, each step of the procedure of (A) in the present procedure will be described. The CPF_A 140 performs the fourth condition determination, and starts the procedure of (A) in the present procedure. In the fourth condition determination, the CPF_A 140 determines whether the fourth condition is true or false. The CPF_A 140 performs the procedure of (C) in a PDU session establishment procedure initiated by the 111 by starting it in a case that the fourth condition is true, and omits it in a case that the fourth condition is false (S1604). In addition, the CPF_A 140 transmits an Attach accept message to the NR node_A122 based on reception of an attach request message and/or a session generation response message, and/or completion of the procedure of (C) in a PDN connectivity procedure (S1606). Note that in a case of having received a session generation reject message, the CPF_A 140 may not continue the procedure of (A) in the present procedure, and may start the procedure of (B) in the present procedure.

The NR node_A122 receives an attach accept message, and transmits an RRC message (e.g., which may be an RRC message such as an RRC Connection Reconfiguration message, an RRC Connection Setup message, and an RRC Direct Transfer message) and/or an attach accept message to the UE_A 10 (S1608). Note that an attach accept message may be transmitted and/or received included in an RRC message. In addition, in a case that the fourth condition is true, the CPF_A 140 may transmit the previously described PDU session establishment accept message included in an attach accept message, or may indicate that a PDU session establishment procedure has been accepted by including a PDU session establishment accept message.

Here, the CPF_A 140 may include at least one or more of the eleventh identification information to the nineteenth identification information in an attach accept message, may include an IP address in an attach accept message, or may indicate that a request of the UE_A 10 has been accepted, by including these pieces of identification information.

In addition, each apparatus may indicate a connection service which the network allows and/or supports, by transmitting and/or receiving the twelfth identification information and/or the thirteenth identification information. In addition, each apparatus may indicate a mode of service continuation in switching to an EPS service which the network supports and/or allows, by transmitting and/or receiving the fourteenth identification information and/or the fifteenth identification information.

In addition, each apparatus may indicate a type of a DN which the network allows, by transmitting and/or receiving the eleventh identification information and/or sixteenth identification information. In addition, each apparatus may indicate an NSI with which the network allows connection, by transmitting and/or receiving the nineteenth identification information. In addition, each apparatus may indicate the MME_A 40 or the CPF_A 140 with which the network allows connection, by including the seventeenth identification information and/or the eighteenth identification information.

In addition, each apparatus may indicate reasons why a request of the UE_A 10 has been accepted, by transmitting and/or receiving one or more of the eleventh identification information to the nineteenth identification information. In addition, each apparatus may indicate processes which each apparatus is to perform after the present procedure, based on reasons why a request of the UE_A 10 has been accepted, may perform the present procedure again, or may perform the present procedure in another condition. For example, the UE_A 10 may perform connection to the core network_A 90 and/or switch of an EPS service, based on processes which each apparatus is to perform included in reasons why an attach procedure to the core network_B 190 has been accepted.

In addition, each apparatus may indicate whether or not a PDU session established can maintain connectivity by the same IP address even at switching a connection destination of a PDU session, by transmitting and/or receiving one or more of the eleventh identification information to the nineteenth identification information.

Here, the first condition determination may be the same as the first condition determination in a PDU session establishment procedure. The fourth condition determination is intended to determine whether or not the CPF_A 140 performs a PDU session establishment procedure. The fourth condition being true may be in a case of having received a PDU session establishment request message, or may be in a case of performing a PDU session establishment procedure in the present procedure. The fourth condition being false may be in a case of not having received a PDU session establishment request message, may be in a case of not performing a PDU session establishment procedure in the present procedure, or may be in a case of not determining the fourth condition being true.

In a case that the UE_A 10 has received an RRC message from the NR node_A122, the UE_A 10 transmits an RRC connection message (e.g., which may be an RRC message such as an RRC Connection Reconfiguration Complete message, an RRC Connection Setup Complete message, and an RRCDirect Transfer message) to the NR node_A122 (S1610). The NRnode_A122 receives an RRC message, and transmits a bearer configuration message to the CPF_A 140 (S1612). In addition, the CPF_A 140 receives a bearer configuration message.

In a case that the UE_A 10 has received an attach accept message through the NR node_A122 from the CPF_A 140, the UE_A 10 transmits an Attach complete message to the CPF_A 140 through the NR node_A122 (S1614), (S1616). In addition, the CPF_A 140 receives an attach complete message. In addition, in a case that the fourth condition is true, the CPF_A 140 performs the second condition determination. The second condition determination is intended to determine necessity or not of the need that the CPF_A 140 requests a modification of a bearer in the UPGW_A130. In a case that the second condition is true, the CPF_A 140 starts and performs the procedure of (D) in a PDU session establishment procedure (S1618). Each apparatus completes the procedure of (A) in the present procedure, based on transmission and/or reception of an attach complete message and/or completion of the procedure of (D) in a PDU session establishment procedure.

Note that in a case of having received a PDU session establishment accept message, the UE_A 10 may transmit the previously described PDU session establishment complete message included in an attach complete message, or may indicate completing a PDU session establishment procedure, by including a PDU session establishment complete message.

Each step of the procedure of (B) in the present procedure will now be described. The CPF_A 140 transmits an Attach reject message to the UE_A 10 through the NR node_A122, and starts the procedure of (B) in the present procedure (S1620). In addition, the UE_A 10 receives an attach reject message, and recognizes that a request of the UE_A 10 has been rejected. Each apparatus completes the procedure of (B) in the present procedure, based on transmission and/or reception of an attach reject message. Note that in a case that the fourth condition is true, the CPF_A 140 may transmit the previously described PDU session establishment reject message included in an attach reject message, or may indicate that a PDU session establishment procedure has been rejected by including a PDU session establishment reject message. In that case, in addition, the UE_A 10 may receive a PDU session establishment reject message, or may authenticate that a PDU session establishment procedure has been rejected.

The CPF_A 140 may include one or more of the twenty-first identification information and the twenty-sixth identification information in an attach reject message, or may indicate that a request of the UE_A 10 has been rejected, by including these pieces of identification information.

In addition, each apparatus may recognize reasons why an attach procedure to the core network_B 190 has been rejected, by transmitting and/or receiving one or more of the twenty-first identification information to the twenty-sixth identification information, may indicate processes which each apparatus is to perform after an attach procedure to the core network_B 190, may perform the present procedure again, or may perform the present procedure in another condition. For example, the UE_A 10 may perform connection to the core network_A 90 and/or switch of an EPS service, based on processes which each apparatus is to perform included in reasons why an attach procedure to the core network_B 190 has been rejected.

In addition, each apparatus may indicate reasons why a PDN connectivity procedure has been rejected, by transmitting and/or receiving the twenty-first identification information, or may indicate processes which each apparatus is to perform after an attach procedure to the core network 90. In addition, each apparatus may indicate that the network does not support and/or allow connection to the core network_A 90 and/or switch of an EPS service, by transmitting and/or receiving the twenty-second identification information and/or the twenty-third identification information.

In addition, each apparatus may indicate a mode of service continuation in switching to an EPS service which the network does not support and/or allow, by transmitting and/or receiving the twenty-fourth identification information and/or the twenty-fifth identification information. In addition, each apparatus may indicate a DCN with which the network does not allow connection, by transmitting and/or receiving the twenty-sixth identification information.

Each apparatus completes the present procedure, based on completion of the procedures of (A) or (B) of the present procedure. Note that each apparatus may make transition to a condition where the UE_A 10 is connected with the network and/or a registered condition, based on completion of the procedure of (A) in the present procedure, may recognize that the present procedure has been rejected, based on completion of the procedure of (B) in the present procedure, or may make transition to a condition unable to connect with the network. Transition to each condition of each apparatus may be performed based on completion of the present procedure, or may be performed based on an establishment of a PDU session.

In addition, each apparatus may perform processes based on identification information transmitted and/or received in the present procedure, based on completion of the present procedure. For example, in a case of having transmitted and/or received one or more of the twenty-first identification information to the twenty-fifth identification information, each apparatus may recognize reasons why a request of the UE_A 10 has been rejected. In addition, each apparatus may perform the present procedure again, based on reasons why a request of the UE_A 10 has been rejected, or may perform an attach procedure to the core network_B 190 for the core network_A 90 or another cell.

The above-mentioned first condition determination to the fourth condition determination may be performed based on identification information, and/or subscriber information, and/or operator policies included in an attach request message. Conditions by which true or false of the first condition to the fourth condition is determined may not be limited to the above-mentioned conditions.

For example, the first condition determination and/or the third condition determination may be similar to the example of the above-mentioned PDU session establishment procedure.

1.3.4. Brief Description of Tracking Area Update Procedure

A brief description of a Tracking Area Update Procedure will be described. As follows, the present procedure refers to a tracking area update procedure. The present procedure is a procedure to update location registration information of the UE_A 10 in the network (an access network and/or the core network_B 190), and/or periodically notify a condition of the UE_A 10 from the UE_A 10 to the network, and/or update particular parameters related to the UE_A 10 in the network. In a condition being connected to a PDU session, the UE_A 10 can perform the present procedure at any timing. The UE_A 10 can periodically perform the present procedure.

1.3.4.1. Example of Tracking Area Update Procedure

Figure 17:
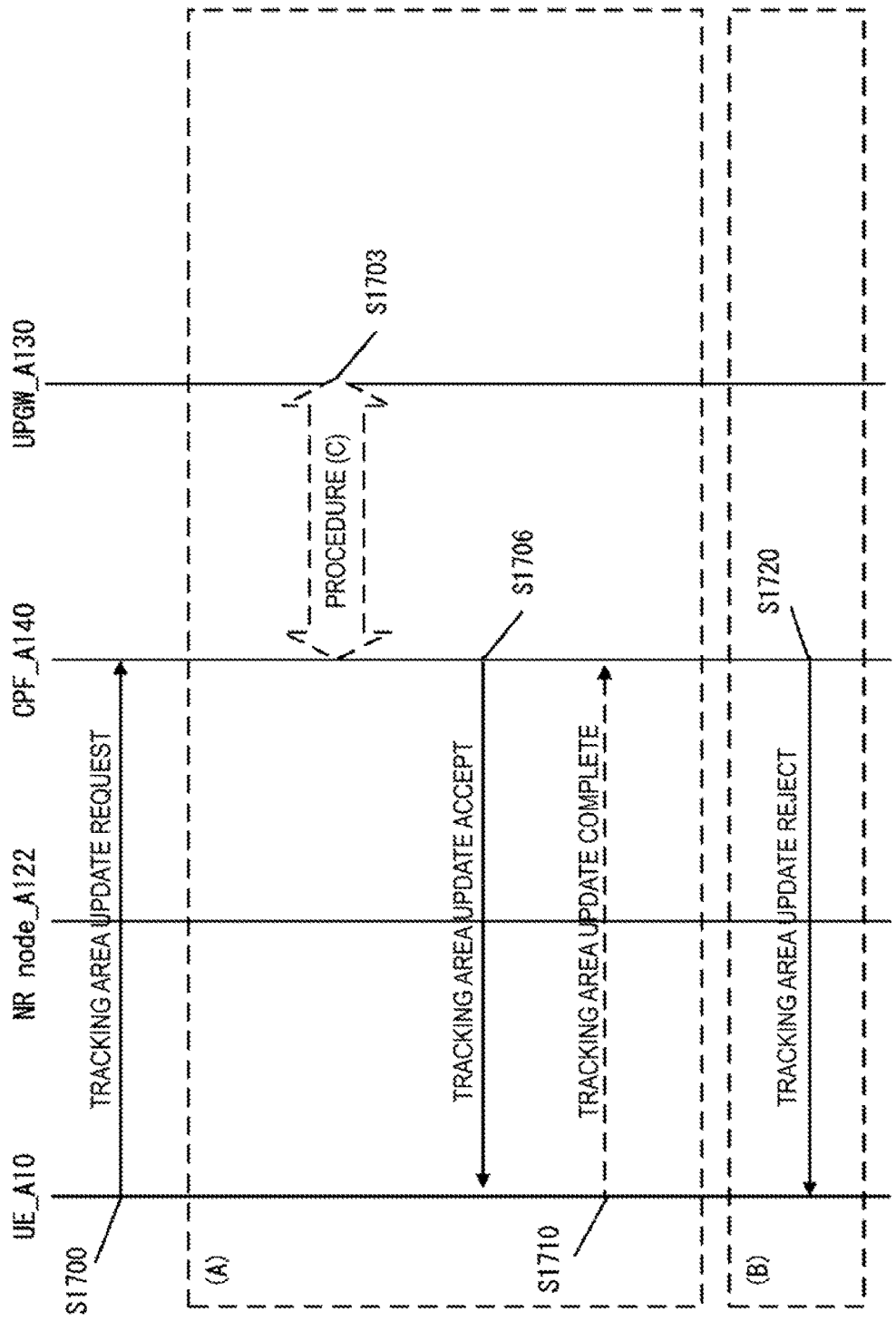
FIG. 17 is a diagram illustrating a tracking area update procedure.

Using FIG. 17, an example of a procedure to perform a tracking area update procedure will be described. As follows, each step of the present procedure will be described. First of all, the UE_A 10 transmits a Tracking Area Updaterequest message to the CPF_A 140 through the NR node_A 122 (S1700), and starts a tracking area update procedure.

Here, the UE_A 10 may include at least one or more of the thirty-first identification information to the thirty-seventh identification information in a tracking area update request message, or may indicate a request of the UE_A 10, by including these pieces of identification information.

In addition, each apparatus may indicate a connection service which the UE_A 10 supports, by transmitting and/or receiving the thirty-second identification information. In addition, each apparatus may indicate a mode of service continuation in switching to an EPS service which the UE_A 10 supports and/or requests, by transmitting and/or receiving the thirty-fifth identification information and/or the thirty-sixth identification information.

In addition, each apparatus may indicate an NSI with which the UE_A 10 requests connection, by transmitting and/or receiving the thirty-seventh identification information. In addition, each apparatus may indicate a target connection service of which the UE_A 10 requests update of registration information, by transmitting and/or receiving the thirty-first identification information. In addition, each apparatus may indicate the MME_A 40 or the CPF_A 140 with which the UE_A 10 requests connection, by including the thirty-third identification information and/or the thirty-fourth identification information.

The CPF_A 140 receives a tracking area update request message, and performs the first condition determination. In the first condition determination, the CPF_A 140 determines whether the first condition is true or false. The CPF_A 140 starts the procedure of (A) in the present procedure in a case that the first condition is true, and starts the procedure of (B) in the present procedure in a case that the first condition is false. Note that steps in a case that the first condition is false will be described later.

As follows, steps in a case that the first condition is true, in other words, each step of the procedure of (A) in the present procedure will be described. The CPF_A 140 performs the fourth condition determination, and starts the procedure of (A) in the present procedure. In the fourth condition determination, the CPF_A 140 determines whether the fourth condition is true or false. The CPF_A 140 starts the procedure of (C) in the present procedure in a case that the fourth condition is true, and omits it in a case that the fourth condition is false (S1703).

Here, the first condition determination may be the same as the first condition determination in an attach procedure to the core network_B 190. The fourth condition determination is intended to determine necessity or not of modify and/or addition and/or delete procedure of a PDU session.

Here, the CPF_A 140 may include at least one or more of the thirty-first identification information to the thirty-seventh identification information in a message in the procedure of (C) in the present procedure, and may convey a request of the UE_A 10 to each apparatus, by including these pieces of identification information.

In addition, the CPF_A 140 performs the third condition determination after completion of the procedure of (C). Here, the third condition determination is intended to determine whether the CPF_A 140 accepts a request of the UE_A 10, and the third condition determination may be determined based on information received from any apparatus in the procedure of (C). In the third condition determination, the CPF_A 140 determines whether the third condition is true or false. The CPF_A 140 transmits a Tracking Area Update accept message to the UE_A 10 through the NR node_A 122 in a case that the third condition is true, the procedure of (C) in the present procedure (S1706), or starts the procedure of (B) in the present procedure in a case that the third condition is false. A tracking area update accept message may include an appropriate accept cause. Note that a tracking area update accept message may be a response message to a tracking area update request message hut not limited to this, and may be a message to accept a request of a tracking area update.

Here, the CPF_A 140 may include at least one or more of the forty-first identification information to the forty-seventh identification information in a tracking area update accept message, or may indicate that a request of the UE_A 10 has been accepted, by including these pieces of identification information.

In addition, each apparatus may indicate whether or not the network supports and/or allows connection to the core network_A 90 and/or switch of an EPS service, by transmitting and/or receiving the forty-third identification information and/or the forty-fourth identification information. In addition, each apparatus may indicate a mode of service continuation in switching to an EPS service which the network supports and/or allows, by transmitting and/or receiving the forty-fifth identification information and/or the forty-sixth identification information.

In addition, each apparatus may indicate an NSI with which the network allows connection, by transmitting and/or receiving the forty-seventh identification information.

In addition, each apparatus may indicate reasons why a request of the UE has been accepted, by transmitting and/or receiving one or more of the forty-first identification information to the forty-seventh identification information. In addition, each apparatus may indicate processes which each apparatus is to perform after the present procedure, based on reasons why a request of the UE_A 10 has been accepted, may perform the present procedure again, or may perform the present procedure in another condition. For example, the UE_A 10 may perform connection to the core network_A 90 and/or switch of an EPS service, based on processes which each apparatus is to perform included in reasons why a tracking area update procedure has been accepted.

In a case of having received a tracking area update accept message, the UE_A 10 transmits a Tracking Area Update complete message to the CPF_A 140 through the NR node_A 122 (S1710). Each apparatus completes the procedure of (A) in the present procedure, based on transmission and/or reception of a tracking area update complete message.

Each step of the procedure of (B) in the present procedure will now be described. The CPF_A 140 transmits a Tracking Area Update reject message to the UE_A 10 through the NR node_A 122. In addition, the UE_A 10 receives a tracking area update reject message, and recognizes that a request of the UE_A 10 has been rejected. Each apparatus completes the procedure of (B) in the present procedure, based on transmission and/or reception of a tracking area update reject message. A tracking area update reject message may include an appropriate reject cause. Note that a tracking area update reject message may be a response message to a tracking area update request message but not limited to this, and may be a message to reject a request of a tracking area update.

Here, the CPF_A 140 may include one or more of the twenty-first identification information to the twenty-sixth identification information in a tracking area update reject message, or may indicate that a request of the UE_A 10 has been rejected, by including these pieces of identification information.

In addition, each apparatus may indicate reasons why a tracking area update procedure has been rejected, by transmitting and/or receiving the twenty-first identification information, or may indicate processes which each apparatus is to perform after a tracking area update procedure.

In addition, each apparatus may indicate that the network does not support and/or allow connection to the core network_A 90 and/or switch of an EPS service, by transmitting and/or receiving the twenty-second identification information and/or the twenty-third identification information. In addition, each apparatus may indicate a mode of service continuation in switching to an EPS service which the network does not support and/or allow, by transmitting and/or receiving the twenty-fourth identification information and/or the twenty-fifth identification information. In addition, each apparatus may indicate a DCN with which the network does not allow connection, by transmitting and/or receiving the twenty-sixth identification information.

Each apparatus completes the present procedure, based on completion of the procedures of (A) or (B) of the present procedure.

In addition, each apparatus may perform processes based on identification information transmitted and/or received in the present procedure, based on completion of the present procedure. For example, in a case of having transmitted and/or received one or more of the twenty-first identification information to the twenty-sixth identification information, each apparatus may indicate reasons why a request of the UE_A 10 has been rejected. In addition, each apparatus may indicate processes which each apparatus is to perform, based on reasons why a request of the UE_A 10 has been rejected, may perform the present procedure again, or may perform the present procedure in another condition. For example, the UE_A 10 may perform connection to the core network_A 90 and/or switch of an EPS service, based on processes which each apparatus is to perform included in reasons why a tracking area update procedure has been rejected.

The previously described first condition determination, and/or the third condition determination, and/or the fourth condition determination may be performed based on identification information, and/or subscriber information, and/or operator policies included in a tracking area update request message. Conditions that true or false of the first condition, and/or the third condition, and/or the fourth condition is determined may not be limited to the previously described conditions.

For example, the first condition, and/or the third condition, and/or the fourth condition may be true in a case that the UE_A 10 requests a tracking area update, and the network allows a request. The first condition, and/or the third condition, and/or the fourth condition may be false in a case that the UE_A 10 does not request a tracking area update, and the network allows a request. In addition, the first condition, and/or the second condition, and/or the third condition may be false in a case that the network of the connection destination of the UE_A 10 and/or an apparatus in the network does not support a tracking area update which the UE_A 10 requests.

1.4. Description of Re-Connectivity Procedure

Next, a re-connectivity procedure according to the present embodiment will be described. Here, a re-connectivity procedure is a procedure from releasing connectivity at one time to establishing connectivity again. In this embodiment, a procedure to switch a PDU session connecting with core the network_B 190 to a PDN connection connecting with the core network_A 90 will be described. The present procedure may be a procedure to make transition from a condition connected to the core network_A 90 to a condition connected with the core network_B 190. Note that, in the present embodiment, two re-connectivity procedures will be described. As follows, the first re-connectivity procedure and the second re-connectivity procedure will be described.

1.4.1. Description of First Re-Connectivity Procedure

Figure 18:
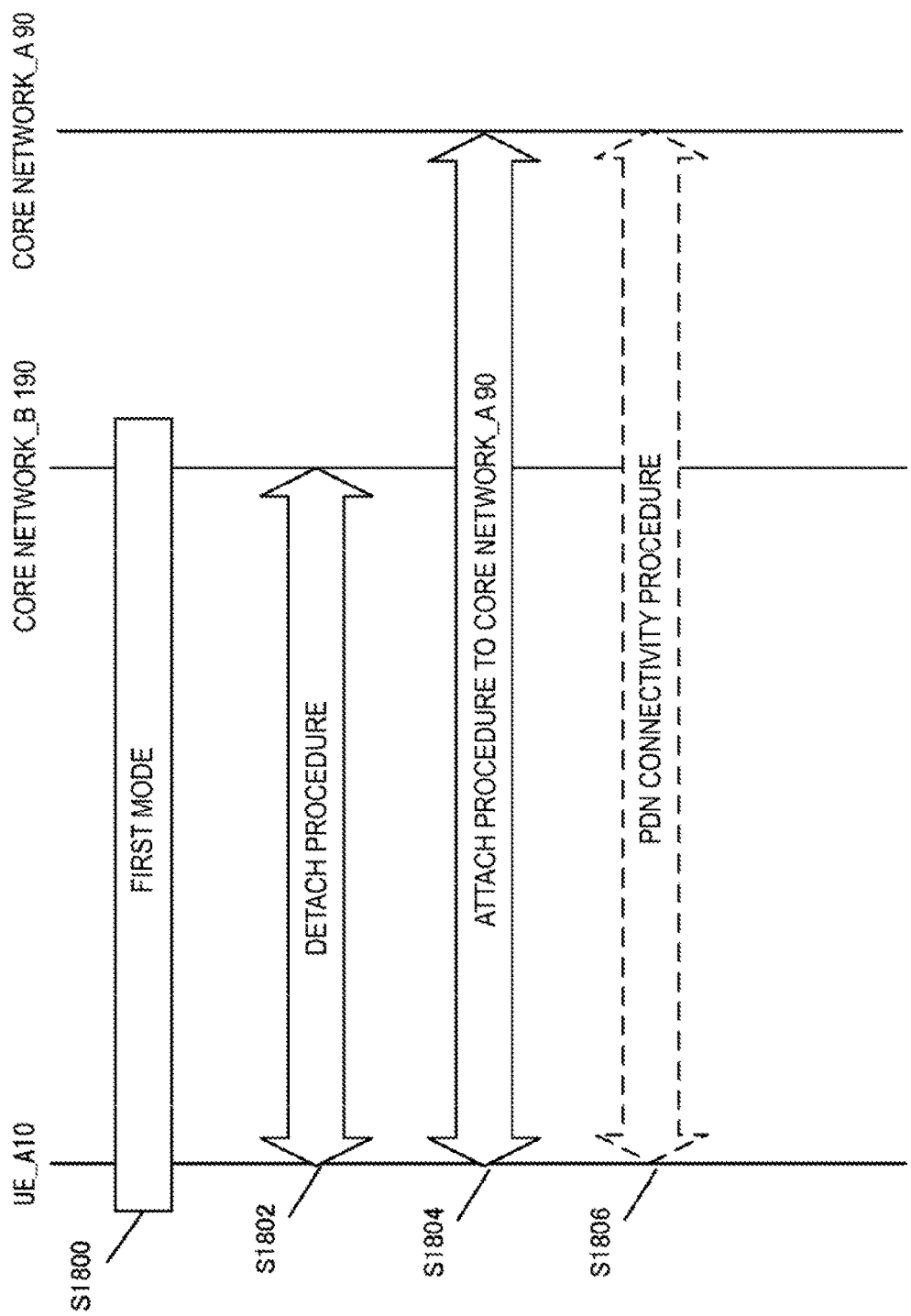
FIG. 18 is a diagram illustrating a first reconnectivity procedure.

The first re-connectivity procedure in the present embodiment will be described using FIG. 18. As follows, the present procedure refers to the first re-connectivity procedure, and each procedure includes a detach procedure, an attach procedure to the core network_A 90, a PDN connectivity procedure. Note that details of each procedure will be described below. First of all, each apparatus performs transition to the first condition connected with the core network_B 190 (S1800).

The present procedure is initiated by the network to transition from a condition where the UE_A 10 is registered to the core network_B 190 to a condition registered to the core network_A 90, and is a procedure to change and/or switch the core network accessed by the UE_A 10 and a connection service used. In addition, by the present procedure, the UE_A 10 may maintain an IP address even in a case of having changed a core network accessed or a connection service used. Note that a procedure to make transition to the first condition may be an initial procedure described in Chapter 1.3.

Then, each apparatus performs a detach procedure (S1802), and transitions to a condition where the UE_A 10 does not connect with the core network_B 190. Then subsequently, each apparatus performs an attach procedure to the core network_A 90 (S1804), and transitions to a condition where the UE_A 10 connects with the core network_A 90. Note that, here, attach to the core network_A 90 is an attach procedure for the core network_A 90. In addition, each apparatus may perform a PDN Connectivity procedure (S1806). Note that, here, attach to the core network_A 90 is an attach procedure for the core network_A 90.

Note that each apparatus may exchange various capability information and/or various request information of each apparatus in a detach procedure, and/or an attach procedure to the core network_A 90, and/or a PDN connectivity procedure. For example, the UE_A 10 may transmit at least one or more of the fifty-first identification information to the fifty-seventh identification information to the core network_B 190 in a detach procedure.

Note that in a case of having performed exchange of various information and/or negotiation of various request in an attach procedure to the core network_A 90, each apparatus may not perform exchange of various information and/or negotiation of various request in a PDN connectivity procedure. On the contrary in a case of not having performed exchange of various information and/or negotiation of various request in an attach procedure to the core network_A 90, each apparatus may perform exchange of various information and/or negotiation of various request in a PDN connectivity procedure. Not only this, even in a case of having performed exchange of various information and/or negotiation of various request in an attach procedure to the core network_A 90, each apparatus may perform exchange of various information and/or negotiation of various request in a PDN connectivity procedure.

For example, in an attach procedure and a PDN connectivity procedure, the UE_A 10 may transmit at least one or more of the sixty-first identification information to the sixty-eighth identification information to the core network_B 190, or the core network_A 90 may receive at least one or more of the sixty-first identification information to the sixty-eighth identification information from UE_A 10, and in addition, may transmit at least one or more of the nineteenth identification information to the twenty-sixth identification information to the UE_A 10.

The UE_A 10 may transmit at least one or more of the sixty-first identification information to the sixty-sixth identification information to the core network_A 90 in an attach procedure, and may not transmit at least one or more of the sixty-first identification information to the sixty-sixth identification information to the core network_A 90 in a PDN connectivity procedure. Similarly, the core network_A 90 may transmit at least one or more identification among at least the nineteenth identification information and the twenty-sixth identification information to the UE_A 10 in an attach procedure, and may not transmit at least one or more identification among at least the nineteenth identification information and the twenty-sixth identification information to the UE_A 10 in a PDN connectivity procedure.

On the contrary, the UE_A 10 may not transmit at least one or more of the sixty-first identification information to the sixty-sixth identification information tote core network_A 90 in an attach procedure, and may transmit at least one or more of the sixty-first identification information to the sixty-sixth identification information to the core network_A 90 in a PDN connectivity procedure. Similarly, the core network_A 90 may not transmit at least the nineteenth identification information and the twenty-sixth identification information in an attach procedure, and may transmit at least the nineteenth identification information and the twenty-sixth identification information in a PDN connectivity procedure.

The UE_A 10 may transmit identification information which has not been transmitted in an attach procedure to the core network_A 90 among the sixty-first identification information to the sixty-sixth identification information to the core network_A 90 in a PDN connectivity procedure. Similarly, the core network_A 90 may transmit identification information which has not been transmitted in an attach procedure to the core network_A 90 among the nineteenth identification information and the twenty-sixth identification information to the UE_A 10 in a PDN connectivity procedure.

By the above-mentioned procedures, each apparatus completes the present procedure. Note that by transmitting and/or receiving each control message described in the present procedure, each apparatus involved in the present procedure may transmit and/or receive one or more identification information included in each control message, and may store each transmitted and/or received identification information as a context. In addition, each apparatus may make transition to an appropriate condition, based on completion of the present procedure.

1.4.1.1. Description of Detach Procedure

Figure 19:
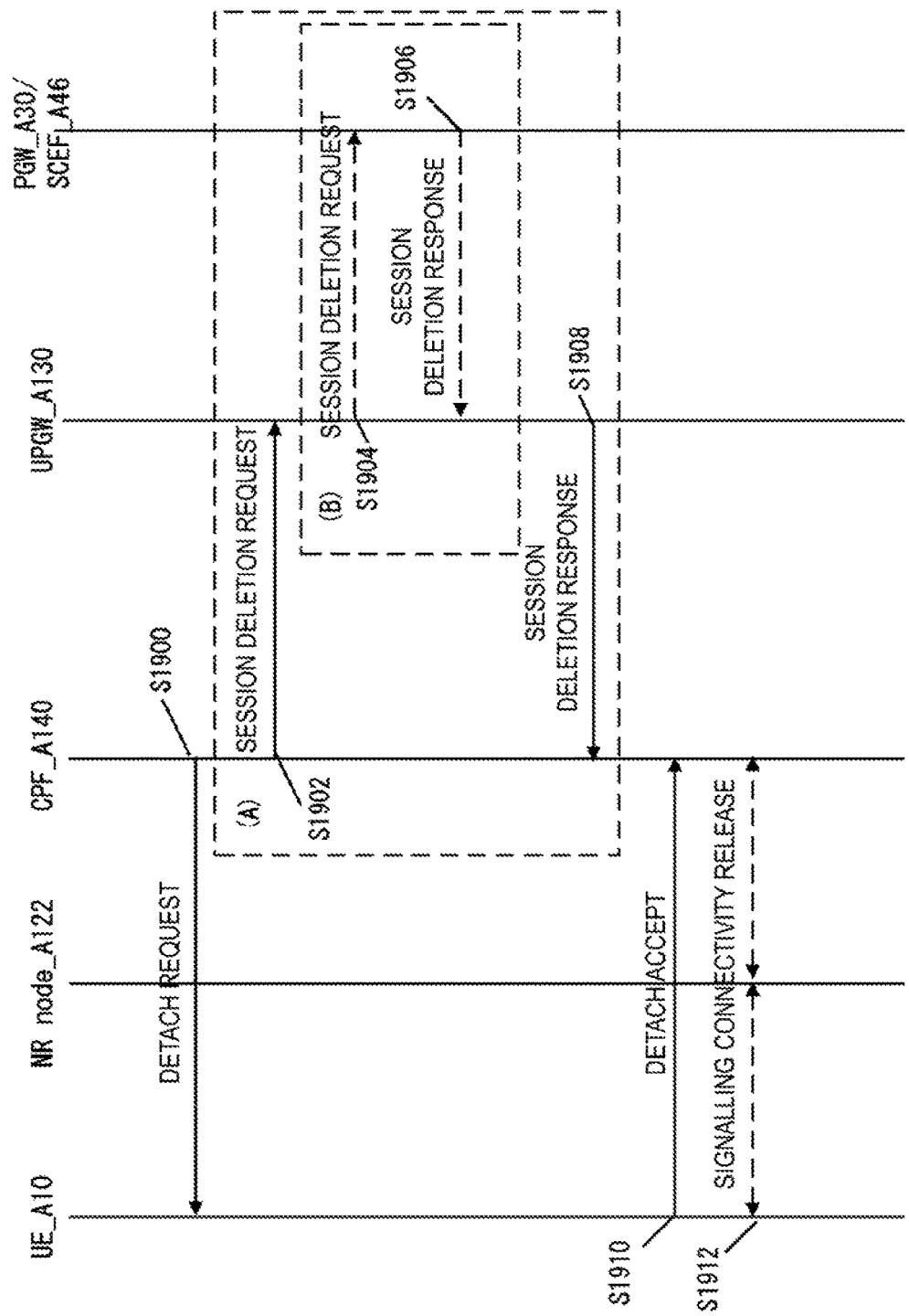
FIG. 19 is a diagram illustrating a detach procedure.

First of all, a detach procedure will be described using FIG. 19. As follows, the present procedure refers to a detach procedure. The present embodiment is a procedure initiated by the core network_B 190 to disconnect connection between the UE_A 10 and the network (an access network, and/or the core network_B 190, and/or the PDN_A 5). In other words, in a case of the first condition where the UE_A 10 is connecting to the core network_B 190, the core network_B 190 can start the present procedure at any timing. In other words, in a condition (EMM-REGISTERD) where the UE_A 10 is registered with the core network_B 190, the core network_B 190 may start the present procedure at any timing. Each apparatus may make transition to a condition (EMM-DEREGISTERD) where the UE_A 10 is not registered with the core network_B 190, based on completion of a detach procedure.

First of all, the CPF_A 140 transmits a Detach Request message to the UE_A 10 through the NR node_A 122 (S1900), and starts a detach procedure. Note that a trigger that the CPF_A 140 starts a detach procedure is, for example, based on determining that an apparatus in the core network_B 190 cannot provide connectivity to the UE_A 10 after from position information of the UE_A 10, and the CPF_A 140 may start a detach procedure. In addition, the CPF_A 140 may start a detach procedure, based on changes of operator policies or changes of subscriber information of the UE_A 10. In addition, the CPF_A 140 may start a detach procedure, based on a request from a higher layer or an application server. Note that a trigger that the CPF_A 140 starts a detach procedure is not limited to these.

Here, the CPF_A 140 may include at least one or more of the fifty-first identification information to the fifty-seventh identification information in a detach request message. By including these pieces of identification information in a detach request message, the CPF_A 140 may indicate a request to the UE_A 10. In other words, by including these pieces of identification information, the CPF_A 140 may indicate requiring properties or contexts indicated by each identification information previously described to the UE_A 10.

Note that the CPF_A 140 may include at least one or more of the fifty-first identification information to the fifty-seventh identification information in a detach request message, based on having transmitted at least one or more of the eleventh identification information to the eighteenth identification information to the UE_A 10, in an attach procedure to the core network_B 190 and/or a PDU session establishment procedure.

And/or, in a case of allowing service continuation to continue communication by an attach procedure to the core network_A 90 with a detach procedure and/or a PDN connectivity procedure with a detach procedure, the CPF_A 140 may include at least one or more of the fifty-first identification information to the fifty-seventh identification information in a detach request message. Here, authorization information of this service continuation may be managed as subscriber information to the UE_A 10. Thus, the CPF_A 140 may include these pieces of identification information, based on such subscriber information of the UE_A 10.

And/or, the CPF_A 140 may include at least one or more of the fifty-first identification information to the fifty-seventh identification information in a detach request message, in a case of performing service continuation to continue communication by an attach procedure to the core network_A 90 with a detach procedure and/or a PDN connectivity procedure with a detach procedure, to part or all of one or more PDU sessions established by initiation of a detach procedure.

And/or, the CPF_A 140 may include the fifty-second identification information in a detach request message, in a case of performing service continuation to continue communication by an attach procedure to the core network_A 90 with a detach procedure and/or a PDN connectivity procedure with a detach procedure, and performing service continuation with IP address preservation, to part or all of one or more PDN connectivity procedures established by initiation of a detach procedure, or otherwise, may determine not to include the fifty-second identification information in a detach request message.

And/or, the CPF_A 140 may include the fifty-third identification information indicating an EPC in a detach request message, in a case of performing service continuation to continue communication by an attach procedure to the core network_A 90 with a detach procedure and/or a PDN connectivity procedure with a detach procedure, and performing service continuation to switch a communication path or communication established for an NGC to a communication path or communication established for an EPC, to part or all of one or more PDN connectivity procedures established by initiation of a detach procedure. Otherwise, the CPF_A 140 may include the fifty-third identification information indicating an NGC in a detach request message, or may determine not to include the fifty-third identification information in a detach request message.

For example, the CPF_A 140 may request whether or not to start an attach procedure to the UE_A 10 again, by transmitting the fifty-first identification information. The UE_A 10 may determine whether or not to start an attach procedure again, based on the fifty-first identification information received.

Note that the CPF_A 140 may notify the UE_A 10 of information to identify an NSI which the UE_A 10 detaches, by transmitting the fifty-fifth identification information. The UE_A 10 may maintain information to identify an NSI which the UE_A 10 detaches, by receiving the fifty-fifth identification information.

Note that the CPF_A 140 may request a re-attaching procedure to a DCN and/or a PDN connectivity procedure indicated by the fifty-sixth identification information, by transmitting the fifty-sixth identification information. The UE_A 10 may determine to perform a re-attaching procedure to a DCN and/or a PDN connectivity procedure indicated by the fifty-sixth identification information, by receiving the fifty-sixth identification information.

Here, a re-attaching procedure may be an attach procedure to the core network_A 90 to start, based on completion of a detach procedure. In addition, to re-attach may indicate performing an attach procedure to the core network_A 90 to start, based on completion of a detach procedure.

In addition, each apparatus may indicate a service which cannot maintain provision and/or an NSI connected with a service which cannot maintain provision, by an attach procedure and/or a PDN connectivity procedure performed again after completion of a detach procedure, by transmitting and/or receiving the fifty-seventh identification information.

Note that the CPF_A 140 may request continuing one or more services by a re-attaching procedure and/or a PDN connectivity procedure, by transmitting the fifty-seventh identification information. The UE_A 10 may determine to continue one or more services indicated by the fifty-seventh identification information by performing a re-attaching procedure and/or a PDN connectivity procedure, by receiving the fifty-seventh identification information.

Here, service identification information and a DCN performing a re-attaching procedure and/or a PDN connectivity procedure may be associated and transmitted and/or received. In addition, in a case that multiple pieces of service information are transmitted, different DCNs may be associated with each service and transmitted and/or received. Note that these one or more DCNs may be the previously described fifty-sixth identification information.

And/or, the CPF_A 140 may notify being unable to continue one or more services by a re-attaching procedure and/or a PDN connectivity procedure, by transmitting the fifty-seventh identification information. The UE_A 10 may determine being unable to continue one or more services by a re-attaching procedure and/or a PDN connectivity procedure, by receiving the fifty-seventh identification information.

In addition, each apparatus may indicate whether or not to use a flag indicating a handover in an attach procedure which is performed again after completion of a detach procedure, by transmitting and/or receiving the fifty-second identification information.

Note that in a case that the fifty-second identification information indicates that transmission and/or reception of information indicating a handover is required, the CPF_A 140 may request the UE_A 10 to transmit a flag indicating a handover, in an attach procedure to the core network_A 90 and/or a PUN connectivity procedure started based on completion of a detach procedure, by transmitting the fifty-second identification information. In addition, the UE_A 10 may determine that the UE_A 10 transmits a flag indicating a handover, in an attach procedure to the core network_A 90 and/or a PDN connectivity procedure started based on completion of a detach procedure, by receiving the fifty-second identification information.

In a case that the fifty-second identification information indicates that transmission and/or reception of information indicating a handover is unnecessary, the CPF_A 140 may notify that transmission of a flag indicating a handover by the UE_A 10 is not necessary, in an attach procedure to the core network_A 90 and/or a PDN connectivity procedure performed based on completion of a detach procedure, by transmitting the fifty-second identification information. In addition, the UE_A 10 may determine that the UE_A 10 does not transmit a flag indicating a handover, in an attach procedure to the core network_A 90 and/or a PDN connectivity procedure started based on completion of a detach procedure, by receiving the fifty-second identification information.

Here, information indicating a handover may be the sixty-first identification information, or may be identification information requiring IP address reservation. Note that IP address reservation may be to establish connectivity by the IP address which is the same as the IP address used before switching, after having performed an attach procedure and/or a PDN connectivity procedure again. In other words, IP address reservation may be that an IP address used after having performed an attach procedure and/or a PDN connectivity procedure again is the same as the IP address used before switching.

In addition, each apparatus may indicate a core network with which the UE_A 10 is to establish connection after completion of a detach procedure, by transmitting and/or receiving the fifty-third identification information. The CPF_A 140 may notify a type of a core network with which the UE_A 10 is to establish connection after completion of a detach procedure, by transmitting the fifty-third identification information. The UE_A 10 may determine a type of a core network with which the UE_A 10 is to establish connection after completion of a detach procedure, by receiving the fifty-third identification information.

In addition, each apparatus may indicate an operation Cause of a detach procedure, by transmitting and/or receiving the fifty-fourth identification information.

The CPF_A 140 may include at least one or more of the fifty-first identification information to the fifty-seventh identification information in a delete session request message. The CPF_A 140 may convey a request to the UE_A 10, by including these pieces of identification information in a delete session request message.

For example, each apparatus may indicate being able to maintain or may request maintaining connectivity by an IP address corresponding to a PDU session at switching the connection destination of a PDU session, by transmitting and/or receiving the fifty-first identification information, and/or the fifty-second identification information, and/or the fifty-fourth identification information.

In other words, each apparatus may indicate being able to establish or may request establishing a PDN connection associated with the IP address same as the PDU session disconnected by a detach procedure after completion of a detach procedure, by transmitting and/or receiving the fifty-first identification information, and/or the fifty-second identification information, and/or the fifty-fourth identification information.

Note that from the fifty-first identification information to the fifty-seventh identification information, two or more pieces of identification information may be combined, and transmitted and/or received as one piece of identification information. In that case, identification information combined may be identification information having meanings of each identification information combined.

Then, the CPF_A 140 transmits a Delete Session Request message to the UPGW_A 130 (S1902), and starts the procedure of (A) in the present procedure. As follows, each step of the procedure of (A) in the present procedure will be described.

Here, each apparatus may include one or more of the fifty-first identification information to the fifty-seventh identification information in a delete session request message.

For example, the CPF_A 140 may include at least one or more of the fifty-first identification information to the fifty-seventh identification information in a delete session request message. The CPF_A 140 may convey a request to the UE_A 10, by including these pieces of identification information in a delete session request message.

The UPGW_A 130 receives a delete session request message. The UPGW_A 130 transmits a session delete response message to the CPF_A 140, based on reception of a delete session request message (S1908). Note that in a case that the UPGW_A 130 is not linked with an external gate way (the PGW_A 30 or the SCEF_A 46) and/or not configured as the same apparatus, the UPGW_A 130 may transmit a delete session request message to an external gate way, based on reception of a delete session request message, and in addition, may receive a delete session response message transmitted by an external gate way. Each apparatus completes the procedure of (A) in the present procedure, based on transmission and/or reception of a delete session response message.

In addition, the UE_A 10 may receive a detach request message, and may transmit a Detach accept message to the CPF_A 140 at any timing (S1914). Note that the UE_A 10 may include identification information such as a detach type to identify a type of detach in a detach accept message, or may indicate having allowed a request by including these pieces of identification information. In addition, the CPF_A 140 receives a detach accept message from the UE_A 10. The CPF_A 140 may perform a delete procedure of signaling connection between the UE_A 10 and the CPF_A 140, based on reception of a detach accept message and/or completion of the procedure of (A) in the present procedure (S1912). Specifically, connectivity between the CPF_A 140 and the NR node_A 122 may be released, by deleting contexts of the UE_A 10 stored by the CPF_A 140. In addition, based on connection between the CPF_A 140 and the NR node_A 122 having been released, the NR node_A 122 may release RRC connection between the UE_A 10 and the NR node_A 122, by releasing radio resources to the UE_A 10.

By completion of the above-mentioned procedure, each apparatus completes a detach procedure, and the UE_A 10 make transition to a condition not registered with the core network_B 190.

Each apparatus may perform the next procedure, based on completion of a detach procedure. Note that the next procedure may be an attach procedure to the core network_A 90 and/or a PDN connectivity procedure.

More particularly, in a case that each apparatus maintains connectivity by the IP address associated with a PDU session disconnected in the present procedure, based on transmission and/or reception of the fifty-first identification information, and/or the fifty-second identification information, and/or the fifty-fourth identification information, each apparatus may perform the next procedure to establish PDN connection associated with the IP address which is the same as a PDU session. In this case, the UE_A 10 may transmit the sixty-first identification information indicating a handover procedure to the core network_A 90 in the next procedure, or may transmit the sixty-second identification information corresponding to the fifty-seventh identification information.

In a case that each apparatus does not maintain connectivity by an IP address associated with a PDU session disconnected in the present procedure, based on transmission and/or reception of the fifty-first identification information, and/or the fifty-second identification information, and/or the fifty-fourth identification information, and establishes PDN connection associated with a new IP address, each apparatus may perform the next procedure. In this case, the UE_A 10 may transmit the sixty-first identification information indicating an initial procedure to the core network_A 90 in the next procedure.

In addition, in a case that each apparatus performs a switch of connection destination from the core network_B 190 to the core network_A 90 using information indicating a handover, based on transmission and/or reception of the fifty-first identification information, and/or the fifty-second identification information, and/or the fifty-third identification information, and/or the fifty-fourth identification information, each apparatus may perform the next procedure. In this case, the UE_A 10 may transmit the sixty-first identification information indicating a handover procedure to the core network_A 90 in the next procedure, or may transmit the sixty-third identification information corresponding to the eleventh identification information and/or the sixteenth identification information. In addition, the UE_A 10 may transmit the sixty-fourth identification information corresponding to the eighteenth identification information and/or the forty-sixth identification information to the core network_A 90 in the next procedure, or may transmit the sixty-fifth identification information corresponding to the seventeenth identification information and/or the forty-fifth identification information.

In addition, based on transmission and/or reception of the fourteenth identification information, and/or the fifteenth identification information, and/or the forty-third identification information, and/or the forty-fourth identification information, in a case that an SSC mode allowed and/or supported by the core network_B 190 is SSC mode 1 or SSC mode 2, each apparatus may perform the next procedure after a detach procedure. In this case, the UE_A 10 may transmit the sixty-first identification information indicating a handover procedure to the core network_A 90 in the next procedure, or may transmit the sixty-third identification information corresponding to the eleventh identification information and/or the sixteenth identification information.

In addition, based on transmission and/or reception of the fourteenth identification information, and/or the fifteenth identification information, and/or the forty-third identification information, and/or the forty-fourth identification information, in a case that an SSC mode allowed and/or supported by the core network_B 190 is SSC mode 3, each apparatus may perform the next procedure after a detach procedure. In this case, the UE_A 10 may transmit the sixty-first identification information indicating an initial procedure to the core network_A 90 in the next procedure, or may transmit the sixty-third identification information different from the eleventh identification information and/or the sixteenth identification information.

In addition, based on the twelfth identification information, and/or the thirteenth identification information, and/or the forty-first identification information, and/or the forty-second identification information, in a case that the fifty-fourth identification information indicating the use of an NGS service having been not allowed is transmitted and/or received in a condition where the use for only an NGS service is allowed and/or supported for the UE_A 10, each apparatus may perform an attach procedure to the core network_A 90 and/or a PDN connectivity procedure.

In addition, based on the twelfth identification information, and/or the thirteenth identification information, and/or the forty-first identification information, and/or the forty-second identification information, in a case that the fifty-fourth identification information indicating the use of an NGS service having been not allowed is transmitted and/or received in a condition where the use of an NGS service and an EPS service is allowed and/or supported for the UE_A 10, each apparatus may perform a PDN connectivity procedure without performing an attach procedure to the core network_A 90.

Note that in a case that each apparatus performs the next procedure after completion of a detach procedure, the UE_A 10 may transmit identification information corresponding to identification information received from the core network_B 190 to the core network_A 90 in the next procedure. For example, the UE_A 10 may transmit the sixty-second identification information corresponding to the fifty-seventh identification information to the core network_A 90 in the next procedure, or may transmit the sixty-third identification information corresponding to the eleventh identification information and/or the sixteenth identification information. In addition, the UE_A 10 may transmit the sixty-fourth identification information corresponding to the eighteenth identification information and/or the forty-sixth identification information to the core network_A 90 in the next procedure, or may transmit the sixty-fifth identification information corresponding to the seventeenth identification information and/or the forty-fifth identification information. In addition, the UE_A 10 may transmit the sixty-eighth identification information corresponding to the fifty-sixth identification information to the core network_A 90 in the next procedure, or may transmit the sixty-ninth identification information corresponding to the fifty-fifth identification information.

1.4.1.2. Brief Description of Attach Procedure to Core Network_A

Next, a brief description of an attach procedure to the core network_A 90 will be described. In this embodiment, an attach procedure to the core network_A 90 is a procedure initiated by the UE_A 10 to connect to a network (an access network, and/or the core network_A 90, and/or the PDN_A 5).

The UE_A 10 may perform the present procedure at any timing such as terminal power activation in a condition not connected to the core network_A 90, or may perform the present procedure, based on having determined to attach to the core network_B 190, based on a detach procedure described in Chapter 1.4.1.1. In other words, the UE_A 10 may start the present procedure at any timing in a condition (EMM-DEREGISTERED) not registered to the core network_A 90. Each apparatus may make transition to a registered condition (EMM-REGISTERED), based on completion of an attach procedure to the core network_A 90.

The UE_A 10 may start the present procedure, based on having received at least one identification information among the fifty-first identification information to the fifty-seventh in a detach procedure. The UE_A 10 may start an attach procedure to the core network_A 90, based on a trigger other than this.

1.4.1.3. Example of PDN Connectivity Procedure

Next, an example of a PDN connectivity procedure will be described. As follows, the present procedure refers to a PDU session establishment procedure. The present procedure is a procedure for each apparatus to establish a PDN connection. Note that each apparatus may perform the present procedure in a condition of having completed an attach procedure to the core network_A 90, or may perform the present procedure in an attach procedure to the core network_A 90. Each apparatus may start the present procedure at any timing after an attach procedure to the core network_A 90. Each apparatus may establish PDN connection, based on completion of a PDN connectivity procedure.

In addition, each apparatus may establish multiple PDN connections by performing the present procedure several times.

Figure 20:
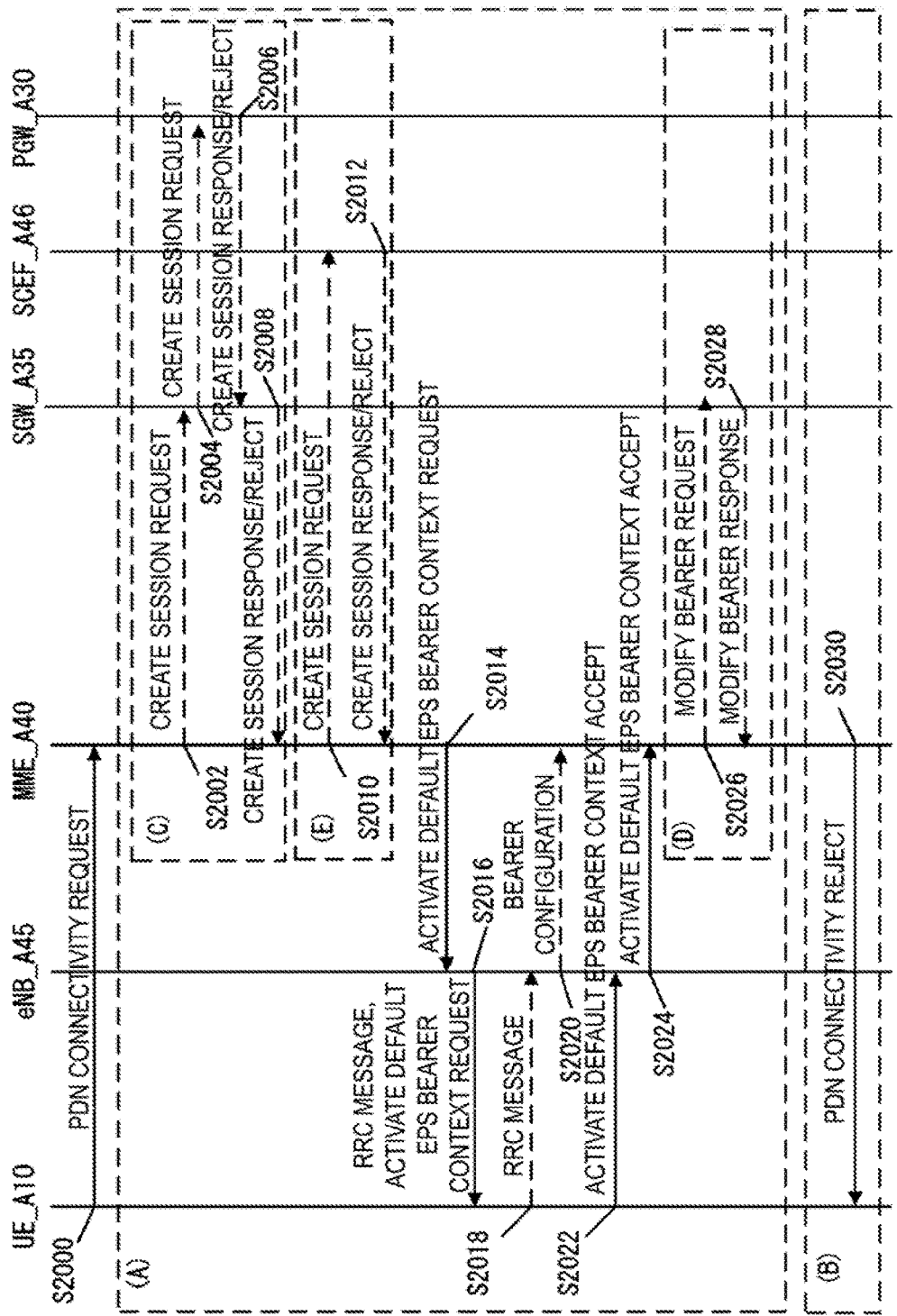
FIG. 20 is a diagram illustrating a PDN connectivity procedure.

Using FIG. 20, an example of a procedure to perform a PDN connectivity procedure will be described. As follows, each step of the present procedure will be described. First of all, the UE_A 10 transmits a PDN Connectivity Request message to MME_A 40 through the eNB_A 45 (S2000), and starts a PDN connectivity procedure.

Here, the UE_A 10 may include at least one or more of the sixty-first identification information to the sixty-sixth identification information in a PDN connectivity request message. The UE_A 10 may indicate that the UE_A 10 requests properties or contents indicated by each previously described identification information, by including these pieces of identification information. In other words, including these pieces of identification information may indicate that the UE_A 10 requests establishment of PDN connection having the properties indicated by each previously described identification information or PDN connection reflecting the contents indicated by each previously described identification information.

Note that the UE_A 10 may include at least one or more of the sixty-first identification information to the sixty-sixth identification information in a PDN connectivity request message, based on having received at least one of the fifty-first identification information to the fifty-seventh identification information, in a detach procedure.

In addition, each apparatus may indicate that this request is a request by a handover from the core network_B 190, by transmitting and/or receiving the sixty-first identification information.

In addition, each apparatus may indicate a session to request a handover, by transmitting and/or receiving the sixty-second identification information.

In addition, each apparatus may indicate an APN which the UE_A 10 requests, by transmitting and/or receiving the sixty-third identification information. Note that the APN may be the same as an APN obtained in a PDU session establishment procedure of the handover source.

In addition, by transmitting and/or receiving the sixty-fourth identification information, each apparatus may indicate identification information of the UE, and may indicate that this request is a re-attaching procedure. Identification information of the UE may be a GUTI or may be an IMSI obtained in a PDU session establishment procedure or in a TAU procedure of the handover source.

In addition, by transmitting and/or receiving the sixty-fifth identification information, each apparatus may indicate a DC of the connection destination which UE_A 10 requests, or may indicate the MME_A 40 included in a DC.

In addition, each apparatus may indicate an NSI connected right before, in transmitting and/or receiving the sixty-sixth identification information.

In addition, by transmitting and/or receiving the sixty-first identification information, each apparatus may request establishment of PDN connection to maintain connectivity by the IP address associated with the PDU session before switching, or may request that the IP address which is the same as the IP address associated with the PDU session before switching is assigned to PDN connection to be established.

Note that a PDU session before switching may be a PDU session established for an NGS service and/or the core network_B 190.

The MME_A 40 receives a PDN connectivity request message, and performs the first condition determination. The first condition determination is intended to determine whether or not the MME_A 40 accepts a request of the UE_A 10. In the first condition determination, the MME_A 40 determines whether the first condition is true or false. The MME_A 40 may start the procedure of (A) in the present procedure in a case that the first condition determination is true, or may start the procedure of (B) in the present procedure in a case that the first condition determination is false.

As follows, steps in a case that the first condition determination is true, in other words, each step of the procedure of (A) in the present procedure will be described. The MME_A 40 performs the procedure of (C) or (E) in the present procedure, and starts the procedure of (A) in the present procedure. The MME_A 40 performs (C) in the present procedure in a case of having selected the PGW_A 30 as an external gate way, or performs (E) in the present procedure in a case of having selected the SCEF_A 46 as a GW of PDN connection. In addition, each step of the procedure of (C) in the present procedure will be described. The MME_A 40 transmits a create session request message to the SGW_A 35, and starts the procedure of (C) in the present procedure (S2002).

Here, the MME_A 40 may include at least one or more of the sixty-first identification information to the sixty-sixth identification information in a create session request message, may include information to indicate whether or not it is an initial request, or may convey a request of the UE_A 10, by including these pieces of identification information.

In addition, the SGW_A 35 receives a create session request message, and transmits a create session request message to the PGW_A 30 (S2004). Here, the SGW_A 35 may include at least one or more of the sixty-first identification information to the sixty-sixth identification information in a create session request message, may include information to indicate whether or not it is an initial request, or may convey a request of the UE_A 10, by including these pieces of identification information.

In addition, the PGW_A 30 receives a create session request message, and performs the second condition determination. Note that the second condition determination is intended to determine whether or not the PGW_A 30 accepts a request of the UE_A 10. The second condition being true may be in a case of accepting a request of the UE_A 10, and may be in a case that a request of the UE_A 10 is allowed. The second condition being false may be in a case of rejecting a request of the UE_A 10, or may be in a case of not determining the second condition being true.

The second condition determination may be performed not by the PGW_A 30 but by another apparatus (e.g., the PCRF_A 60). In that case, the PGW_A 30 performs an IP-CAN session establishment procedure with the PCRF_A 60. More specifically, the PGW_A 30 transmits a request message to the PCRF_A 60 in an IP-CAN session establishment procedure. In addition, the PCRF_A 60 receives a request message in an IP-CAN session establishment procedure, determines the second condition, and transmits a response message in an IP-CAN session establishment procedure to the PGW_A 30. In addition, the PGW_A 30 receives a response message in an IP-CAN session establishment procedure, and recognizes a result of the second condition determination.

Here, the PGW_A 30 may include at least one or more of the sixty-first identification information to the sixty-sixth identification information in a request message in an IP- CAN session establishment procedure, or may convey a request of the UE_A 10, by including these pieces of identification information.

The PCRF_A 60 may include a result of at least the second information determination in a response message in an IP-CAN session establishment procedure, or may notify the PGW_A 30 of a result of the second condition determination, by including these results, or may indicate that a request of the UE_A 10 has been allowed or rejected, by including this information.

Note that in a case that the PCRF_A 60 has performed the second condition determination, the PGW_A 30 may perform the second condition determination, based on a result of the second condition determination received from the PCRF_A 60. For example, in a case that the PCRF_A 60 accepts a request of the UE_A 10, the PCRF_A 60 and the PGW_A 30 may assume the second condition as true, and in a case that the PCRF_A 60 rejects a request of the UE_A 10, the PCRF_A 60 and the PGW_A 30 may assume the second condition as false.

In the second condition determination, the PGW_A 30 determines whether the second condition is true or false. In a case that the second condition is true, the PGW_A 30 transmits a session generation response message to the SGW_A 35 (S2006). In addition, the SGW_A 35 receives a session generation response message.

The PGW_A 30 may include an IP address in a session generation response message, or may indicate that a request of the UE_A 10 has been allowed, by including these pieces of identification information. Note that in a case that the PGW_A 30 receives the sixty-first identification information and/or the sixty-fourth identification information in a create session request, the IP address may be the same as the IP address assigned to the UE_A 10 in the last connection.

In a case that the second condition is false, the PGW_A 30 transmits a session generation reject message to the SGW_A 35 (S2006). Note that a session generation reject message may be a session generation response message including a Reject cause, or may indicate that a request of the UE_A 10 has been rejected, by including a reject cause.

The SGW_A 35 having received a session generation response message or a session generation reject message transmits a session generation response message or a session generation reject message to the MME_A 40 (S2008). In addition, the MME_A 40 receives a session generation response message or a session generation reject message.

The SGW_A 35 may include at least one or more identification information of identification information included in a session generation response message or a session generation reject message received from the PGW_A 30, in a session generation response message, or in a session generation response message or a session generation reject message received.

In other words, the SGW_A 35 may include an IP address in a session generation response message, or may indicate that a request of the UE_A 10 has been allowed, by including these pieces of identification information. A session generation reject message may be a session generation response message including a Reject cause, or may indicate that a request of the UE_A 10 has been rejected, by including a reject cause.

Each apparatus completes the procedure of (C) of the present procedure, based on transmission and/or reception of a session generation response message and/or a session generation reject message.

In addition, each step of the procedure of (E) in the present procedure will be described. The MME_A 40 transmits a create session request message to the SCEF_A 46, and starts the procedure of (E) in the present procedure (S2010).

Here, the SCEF_A 46 may include at least one or more of the sixty-first identification information to the sixty-sixth identification information in a create session request message, may include information to indicate whether or not it is an initial request, or may convey a request of the UE_A 10, by including these pieces of identification information.

In addition, the SCEF_A 46 receives a create session request message, and performs the third condition determination. Note that the third condition determination is intended to determine whether or not the SCEF_A 46 accepts a request of the UE_A 10. The third condition being true may be in a case of accepting a request of the UE_A 10, and may be in a case that a request of the UE_A 10 is allowed. The third condition being false may be in a case of rejecting a request of the UE_A 10, or may be in a case of not determining the third condition being true.

In the third condition determination, the SCEF_A 46 determines whether the third condition is true or false. In a case that the third condition is true, the SCEF_A 46 transmits a session generation response message to the MME_A 40 (S2012). In addition, the MME_A 40 receives a session generation response message.

The SCEF_A 46 may include an IP address in a session generation response message, or may indicate that a request of the UE_A 10 has been allowed, by including these pieces of identification information. Note that in a case that the PGW_A 30 receives the sixty-first identification information and/or the sixty-fourth identification information in a create session request, the IP address may be the same as the IP address assigned to the UE_A 10 in the last connection.

In a case that the third condition is false, the SCEF_A 46 transmits a session generation reject message to the MME_A 40 (S2012). Note that a session generation reject message may be a session generation response message including a Reject cause, or may indicate that a request of the UE_A 10 has been rejected, by including a reject cause. Each apparatus completes the procedure of (E) of the present procedure, based on transmission and/or reception of a session generation response message and/or a session generation reject message.

The MME_A 40 transmits an Activate default EPS bearer context request and/or a PDNConnectivity Accept message to the eNB_A 45, based on completion of the procedure of (C) or (E) in the present procedure, based on reception of a session generation response message (S2014). A message which the MME_A 40 transmits to the eNB_A 45 may be a response message for a PDN connectivity request message but not limited to this, and may be a message to accept a request of establishment of PDN connection.

The eNB_A 45 receives an activate default EPS bearer context request and/or a PDN connectivity accept message, and transmits an RRC message (e.g., which may be an RRC message such as an RRCConnection Reconfiguration message, an RRC Connection Setup message, and an RRC Direct Transfer message), and/or an activate default EPS bearer context request or a PDN connectivity accept message, and/or a PDN connectivity accept, message to the UE_A 10 (S2016). Note that a PDN connectivity accept may be transmitted and/or received included in an RRC message.

Here, the MME_A 40 may include an IP address in a PDN connectivity accept message, or may indicate that a request of the UE_A 10 has been allowed, by including these pieces of identification information.

In a case of having received an RRC message, the UE_A 10 transmits an RRC message (e.g., which may be an RRC message such as an RRC Connection Reconfiguration Complete message, an RRC Connection Setup Complete message, and an RRCDirect Transfer message) to the eNB_A 45 (S2018). The eNB_A 45 receives an RRC message, and transmits a bearer configuration message to the MME_A 40 (S2020). In addition, the MME_A 40 receives a bearer configuration message.

In a case of having received an activate default EPS bearer context request and/or a PDN connectivity accept message, the UE_A 10 transmits PDN Connectivity complete message or an Activate default EPS bearer context accept message to the MME_A 40 through the eNB_A 45 (S2022), (S2024). In addition, the MME_A 40 receives a PDN connectivity complete message and/or an activate default EPS bearer context accept message, and in addition, the MME_A 40 receives a PDN connectivity complete message, and performs the fourth condition determination. Note that a message which the UE_A 10 transmits to the eNB_A 45 and the MME_A 40 may be a response message to a PDN connectivity accept message or an activate default EPS bearer context request but not limited to this, and may be a message indicating that a PDN connectivity procedure has been completed.

The fourth condition determination is intended to determine necessity or not that the MME_A 40 requests a modification of a bearer for the SGW_A 35. In a case that the fourth condition is true, the MME_A 40 starts the procedure of (D) in the present procedure. In a case that the fourth condition determination is false, the MME_A 40 does not perform the procedure of (D) in the present procedure.

As follows, each step of the procedure of (D) in the present procedure will be described. In a case that the fourth condition is true, the MME_A 40 transmits a modify bearer request message to the SGW_A 35 (S2026), and starts the procedure of (D) in the present procedure. In addition, the SGW_A 35 receives a modify bearer request message, and transmits a modify bearer response message to the MME_A 40 (S2028). In addition, the MME_A 40 receives a modify bearer response message, and completes the procedure of (D) of the present procedure. In addition, each apparatus completes the procedure of (A) in the present procedure, based on transmission and/or reception of a PDN connectivity complete message and/or completion of the procedure of (D) of the present procedure.

Each step of the procedure of (B) in the present procedure will now be described. The MME_A 40 transmits a PDN Connectivity reject message to the UE_A 10 through the eNB_A 45 (S2030), and starts the procedure of (B) in the present procedure. In addition, the UE_A 10 receives a PDN connectivity reject message and recognizes that a request of the UE_A 10 has been rejected. Each apparatus completes the procedure of (B) in the present procedure, based on transmission and/or reception of a PDN connectivity reject message. A PDN connectivity reject message may include an appropriate reject cause. Note that a PDN connectivity reject message may be a response message for a PDN connectivity request message but not limited to this, and may be a message to reject a request of establishment of PDN connection.

The MME_A 40 may include one or more of the twenty-first identification information and the twenty-fifth identification information in a PDU session establishment reject message, or may indicate that a request of the UE_A 10 has been rejected, by including these pieces of identification information.

In addition, each apparatus may indicate reasons why a PDN connectivity procedure has been rejected, by transmitting and/or receiving the twenty-first identification information, or may indicate processes which each apparatus is to perform after an attach procedure.

In addition, each apparatus may indicate that the network does not support and/or allow connection to the core network_A 90 and/or switch of an EPS service, by transmitting and/or receiving the twenty-second identification information and/or the twenty-third identification information. In addition, each apparatus may indicate a mode of service continuation in switching to an EPS service which the network does not support and/or allow, by transmitting and/or receiving the twenty-fourth identification information and/or the twenty-fifth identification information.

Each apparatus completes the present procedure, based on completion of the procedures of (A) or (B) of the present procedure. Note that each apparatus may make transition to a condition where a PDU session has been established, based on completion of the procedure of (A) in the present procedure, may recognize that the present procedure has been rejected, based on completion of the procedure of (B) in the present procedure, or may make transition to a condition where a PDU session is not established.

In addition, each apparatus may perform processes based on identification information transmitted and/or received in the present procedure, based on completion of the present procedure. For example, in a case of having transmitted and/or received one or more of the twenty-first identification information to the twenty-fifth identification information, each apparatus may recognize reasons why a request of the UE_A 10 has been rejected. In addition, each apparatus may perform the present procedure again, based on reasons why a request of the UE_A 10 has been rejected, or may perform the present procedure in another condition.

The previously described first condition determination to the fourth condition determination may be performed based on identification information, and/or subscriber information, and/or operator policies included in a PDN connectivity request message. Conditions that true or false of the first condition to the fourth condition is determined may not be limited to the previously described conditions.

For example, the first condition to the third condition may be true in a case that the UE_A 10 requests an establishment of a session and the network allows the request. The first condition to the third condition may be false in a case that the UE_A 10 requests an establishment of a session and the network does not allow the request. In addition, the first condition to the third condition may be false in a case that the network of a connection destination of the UE_A 10 and/or an apparatus in the network does not support an establishment of a session that the UE_A 10 requests.

1.4.1.4. Example of Attach Procedure to Core Network_A

Figure 21:
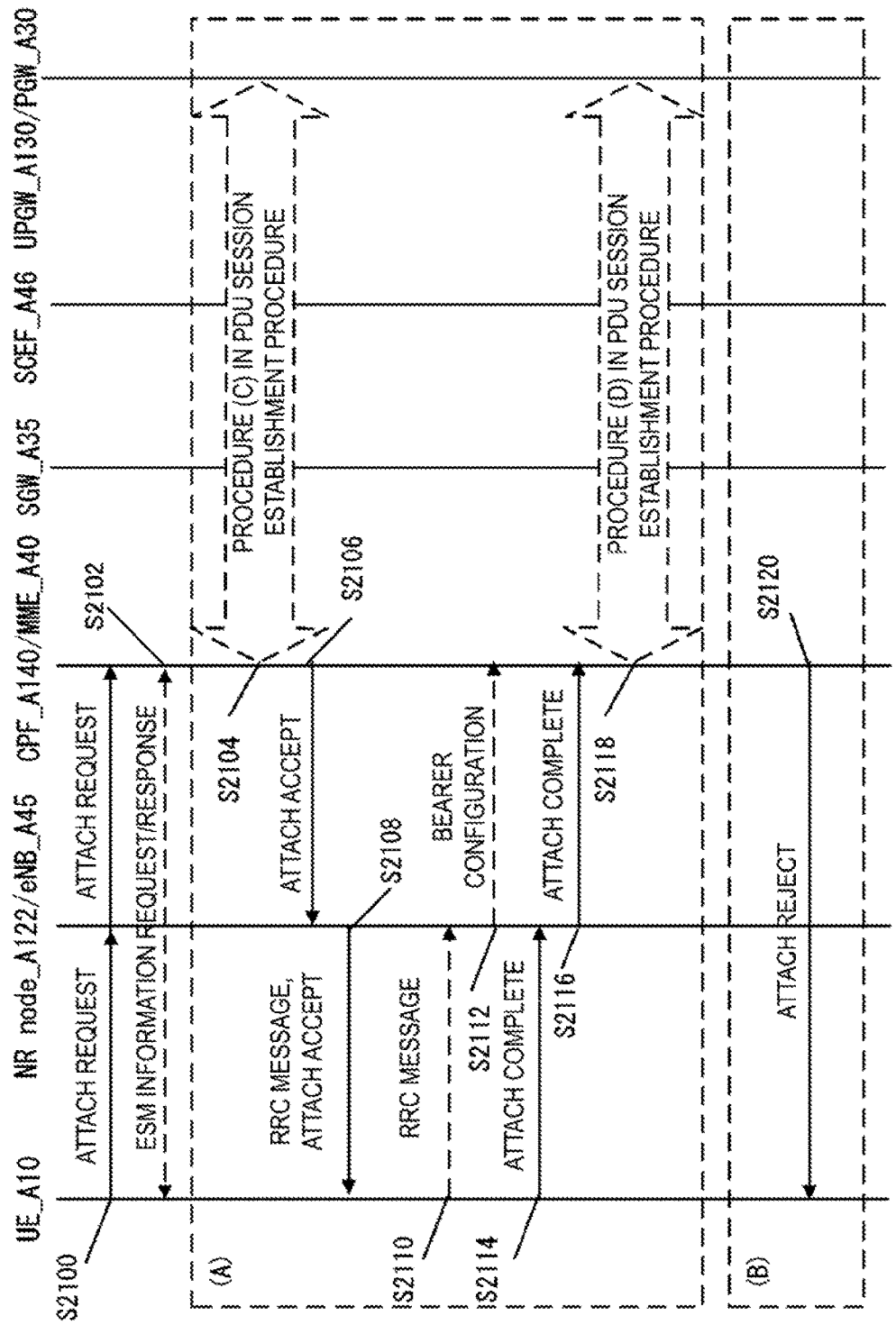
FIG. 21 is a diagram illustrating an attach procedure to a core network_A.

Using FIG. 21, an example of a procedure to perform an attach procedure to the core network_A 90 will be described. As follows, the present procedure refers to an attach procedure to the core network_A 90. The present procedure is a procedure for the UE_A 10 to be registered with the core network_A 90. As follows, each step of the present procedure will be described. First of all, the UE_A 10 transmits an attach request message to the MME_A 40 through the eNB_A 45 (S2100), and starts an attach procedure. The UE_A 10 may transmit including the previously described PDN connectivity request message in an attach request message, or may request performing a PDN connectivity procedure in an attach procedure, by including a PDN connectivity request message.

Here, the UE_A 10 may include at least one or more of the sixty-first identification information to the sixty-sixth identification information in an attach request message. The UE_A 10 may indicate that the UE_A 10 requests properties or contents indicated by each previously described identification information, by including these pieces of identification information. In other words, including these pieces of identification information may indicate that the UE_A 10 requests attach having the properties indicated by each previously described identification information or attach and/or connection reflecting the contents indicated by each previously described identification information. And/or, including these pieces of identification information may indicate that the UE_A 10 requests establishment of PDN connection having the properties indicated by each previously described identification information or PDN connection reflecting the contents indicated by each previously described identification information.

In addition, each apparatus may indicate that this request is a handover from the core network_B 190, by transmitting and/or receiving the sixty-first identification information.

In addition, by transmitting and/or receiving the sixty-fourth identification information, each apparatus may indicate identification information of the UE, and may indicate that this request is a re-attaching procedure.

In addition, by transmitting and/or receiving the sixty-fifth identification information, each apparatus may indicate a DC of the connection destination which the UE_A 10 requests, or may indicate the MME_A 40 included in a DC.

In addition, each apparatus may indicate an NSI connected right before, in transmitting and/or receiving the sixty-sixth identification information.

In addition, by transmitting and/or receiving the sixty-first identification information, each apparatus may request establishment of PDN connection to maintain connectivity by the IP address associated with the PDU session before switching, or may request that the IP address which is the same as the IP address associated with the PDU session before switching is assigned to PDN connection to be established.

Note that the UE_A 10 may transmit including these pieces of identification information in a control message different from an attach request message.

The MME_A 40 receives an attach request message and/or a control message different from an attach request message, and performs the first condition determination. The first condition determination is intended to determine whether or not the MME_A 40 accepts a request of the UE_A 10. The MME_A 40 starts the procedure of (A) in the present procedure in a case that the first condition is true, and starts the procedure of (B) in the present procedure in a case that the first condition is false. Details of the procedure of (B) in the present procedure will be described below.

As follows, each step of the procedure of (A) in the present procedure will be described. The MME_A 40 performs the second condition determination, and starts the procedure of (A) in the present procedure. The second condition determination is intended to determine whether or not the MME_A 40 performs a PDU session establishment procedure. In the XX sixth condition determination, the MME_A 40 determines whether the second condition is true or false. The MME_A 40 starts the procedure of (C) or (E) in a PDN connectivity procedure in a case that the second condition is true, and omits it in a case that the second condition is false (S2104). In addition, the MME_A 40 transmits an Attach accept message to the eNB_A 45, based on reception of an attach request message and/or a session generation response message (S2106). Note that in a case of having received a session generation reject message, the MME_A 40 may not continue the procedure of (A) in the present procedure, and may start the procedure of (B) in the present procedure.

The eNB_A 45 receives an attach accept message, and transmits an RRC message (e.g., which may be an RRC message such as an RRC Connection Reconfiguration message, an RRC Connection Setup message, and an RRC Direct Transfer message) and/or an attach accept message to the UE_A 10 (S2108). Note that an attach accept message may be transmitted and/or received included in an RRC message. In addition, in a case that the second condition is true, the MME_A 40 may transmit including the previously described PDN connectivity accept message in an attach accept message, or may indicate that a PDN connectivity procedure has been accepted by including a PDN connectivity accept message.

Here, the MME_A 40 may include an IP address, or may indicate that a request of the UE_A 10 has been accepted, by including these pieces of identification information.

Here, the second condition determination is intended to determine whether or not the MME_A 40 performs a PDN connectivity procedure. The second condition being true may be in a case of having received a PDN connectivity request message, or may be in a case of performing a PDN connectivity procedure in the present procedure. The second condition being false may be in a case of not having received a PDN connectivity request message, may be in a case of not performing a PDN connectivity procedure in the present procedure, or may be in a case of not determining the second condition being true.

Then, in a case that the UE_A 10 has received an RRC message from the eNB_A 45, the UE_A 10 transmits an RRC connection message (e.g., which may be an RRC message such as an RRC Connection Reconfiguration Complete message, an RRC Connection Setup Complete message, and an RRCDirect Transfer message) to the eNB_A 45 (S2110). The eNB_A 45 receives an RRC message, and transmits a bearer configuration message to the MME_A 40 (S2112). In addition, the MME_A 40 receives a bearer configuration message.

In a case that the UE_A 10 receives an attach accept message through the eNB_A 45 from the MME_A 40, the UE_A 10 transmits an Attach complete message to the MME_A 40 through the eNB_A 45 (S2114), (S2116). In addition, the MME_A 40 receives an attach complete message. In addition, in a case that the second condition is true, the MME_A 40 starts the procedure of (D) in a PDN connectivity procedure (S2118). In a case that the second condition is false, the MME_A 40 does not perform the procedure of (D) in a PDU session establishment procedure. Each apparatus completes the procedure of (A) in the present procedure, based on transmission and/or reception of an attach complete message and/or completion of the procedure of (D) in a PDN connectivity procedure.

Note that in a case of having received a PDN connectivity accept message, the UE_A 10 may transmit including the previously described PDN connectivity complete message in an attach complete message, or may indicate completing a PDN connectivity procedure, by including a PUN connectivity complete message.

Each step of the procedure of (B) in the present procedure will now be described. The MME_A 40 transmits an Attach reject message to the UE_A 10 through the eNB_A 45, and starts the procedure of (B) in the present procedure (S2120). In addition, the UE_A 10 receives an attach reject message, and recognizes that a request of the UE_A 10 has been rejected. Each apparatus completes the procedure of (B) in the present procedure, based on transmission and/or reception of an attach reject message. Note that in a case that the second condition is true, the MME_A 40 may transmit including the previously described PDN connectivity reject message in an attach reject message, or may indicate that a PDN connectivity procedure has been rejected by including a PDN connectivity reject message. In that case, in addition, the UE_A 10 may receive a PDN connectivity reject message, or may authenticate that a PDN connectivity procedure has been rejected.

Each apparatus completes the present procedure, based on completion of the procedures of (A) or (B) of the present procedure. Note that each apparatus may make transition to a condition where the UE_A 10 is connected with the network and/or a condition registered with the core network_A 90, based on completion of the procedure of (A) in the present procedure, may recognize that the present procedure has been rejected, based on completion of the procedure of (B) in the present procedure, or may make transition to a condition unable to connect with the network and/or a condition not registered with the core network_A 90. Transition to each condition of each apparatus may be performed based on completion of the present procedure, or may be performed based on an establishment of PDN connection.

In addition, each apparatus may perform processes based on identification information transmitted and/or received in the present procedure, based on completion of the present procedure. For example, in a case of having transmitted and/or received one or more of the twenty-first identification information to the twenty-fifth identification information, each apparatus may recognize reasons why a request of the UE_A 10 has been rejected. In addition, each apparatus may perform the present procedure again, based on reasons why a request of the UE_A 10 has been rejected, or may perform an attach procedure for the core network_B 190 or another cell.

The above-mentioned second condition determination may be performed based on identification information, and/or subscriber information, and/or operator policies included in an attach request message. Conditions that true or false of the second condition is determined may not be limited to the above-mentioned conditions.

1.4.2. Description of Second Re-Connectivity Procedure

Figure 22:
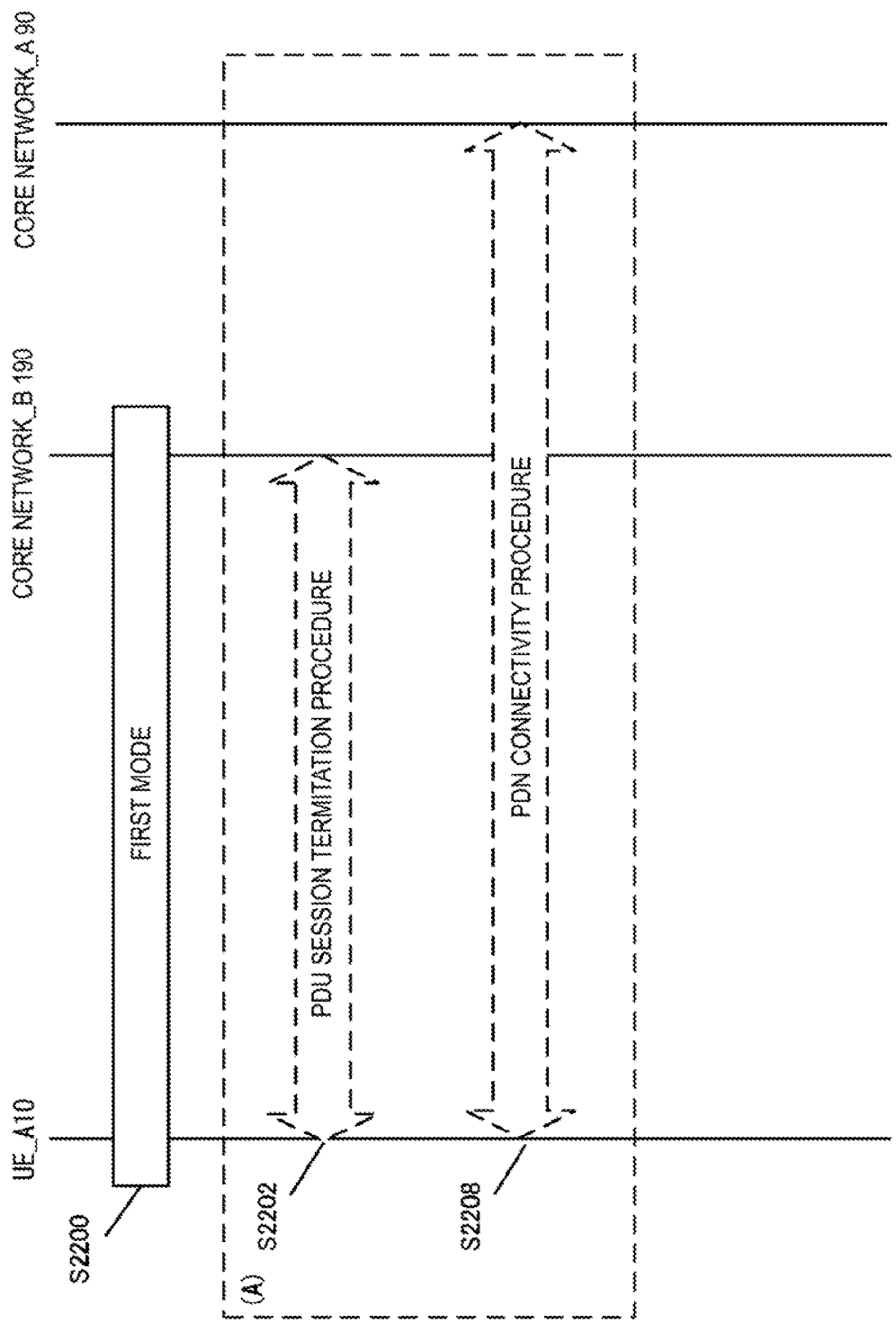
FIG. 22 is a diagram illustrating a second reconnectivity procedure.

Next, the second re-connectivity procedure in the present embodiment will be described using FIG. 22. As follows, the present procedure refers to the second re-connectivity procedure, and each procedure includes a PDU session release procedure, and/or a PDN connectivity procedure. Note that details of each procedure will be described below.

The present procedure is initiated by the network to shift a session which the UE_A 10 establishes for the core network_B 190 to the core network_A 90, and is a procedure to change a core network establishing a session or a connection service used in a session. While the first re-connectivity procedure is a procedure to switch sessions attached all at once, the present procedure provides a method to switch a session at least one by one. Note that a condition attached may be a condition where the UE_A 10 is connected to the network, and a condition not attached may be a condition where the UE_A 10 is not connected to the network.

First of each apparatus performs transition to the first condition connected with the core network_B 190 (S2200). Note that a procedure to make transition to the first condition may be an initial procedure described in Chapter 1.3.

Then, each apparatus performs the procedure of (A) in the present procedure. As follows, each procedure included in the procedure of (A) in the present procedure will be described.

Each apparatus performs a PDU session release procedure (S2202), and starts the procedure of (A) in the present procedure. Each apparatus releases at least one PDU session, by performing a PDU session release procedure. At this time, in a case that a PDU session other than a PDU session released is not established between the UE_A 10 and the core network_B 190, each apparatus may make transition to a condition where the UE_A 10 is not registered with the core network_B 190 explicitly or implicitly. Each apparatus may perform the previously described detach procedure to expressly make transition to a condition where the UE_A 10 is not registered with the core network_B 190.

Then subsequently, each apparatus performs a PDN connectivity procedure. (S2208), at this time, the UE_A 10 may be a condition attached and/or a condition registered to the core network_A 90. Alternatively, in a case that the UE_A 10 is in a condition not attached and/or a condition not registered to the core network_A 90, each apparatus may perform a PDN connectivity procedure after performing an attach procedure to the previously described core network_A 90, and making transition to a registered condition.

Each apparatus completes the procedure of (A) in the present procedure, by performing a PDN connectivity procedure. In addition, each apparatus may perform the procedure of (A) in the present procedure again. In other words, in a case that multiple PDU sessions are established between the UE_A 10 and the core network_B 190 in the first condition in the present procedure, each apparatus may perform the procedure of (A) in the present procedure for each PDU session. Each apparatus may perform the procedure of (A) in the present procedure at least one time or more.

Note that a PDN connectivity procedure in the present procedure may be similar to a PDN connectivity procedure in the first re-connectivity procedure.

Note that the UE_A 10 may maintain continuing PDU sessions for one or more core network_A 90 other than PDU sessions disconnected based on a PDU session release procedure, and may continue communication using these PDU sessions.

1.4.2.1. Description of PDU Session Release Procedure

Figure 23:
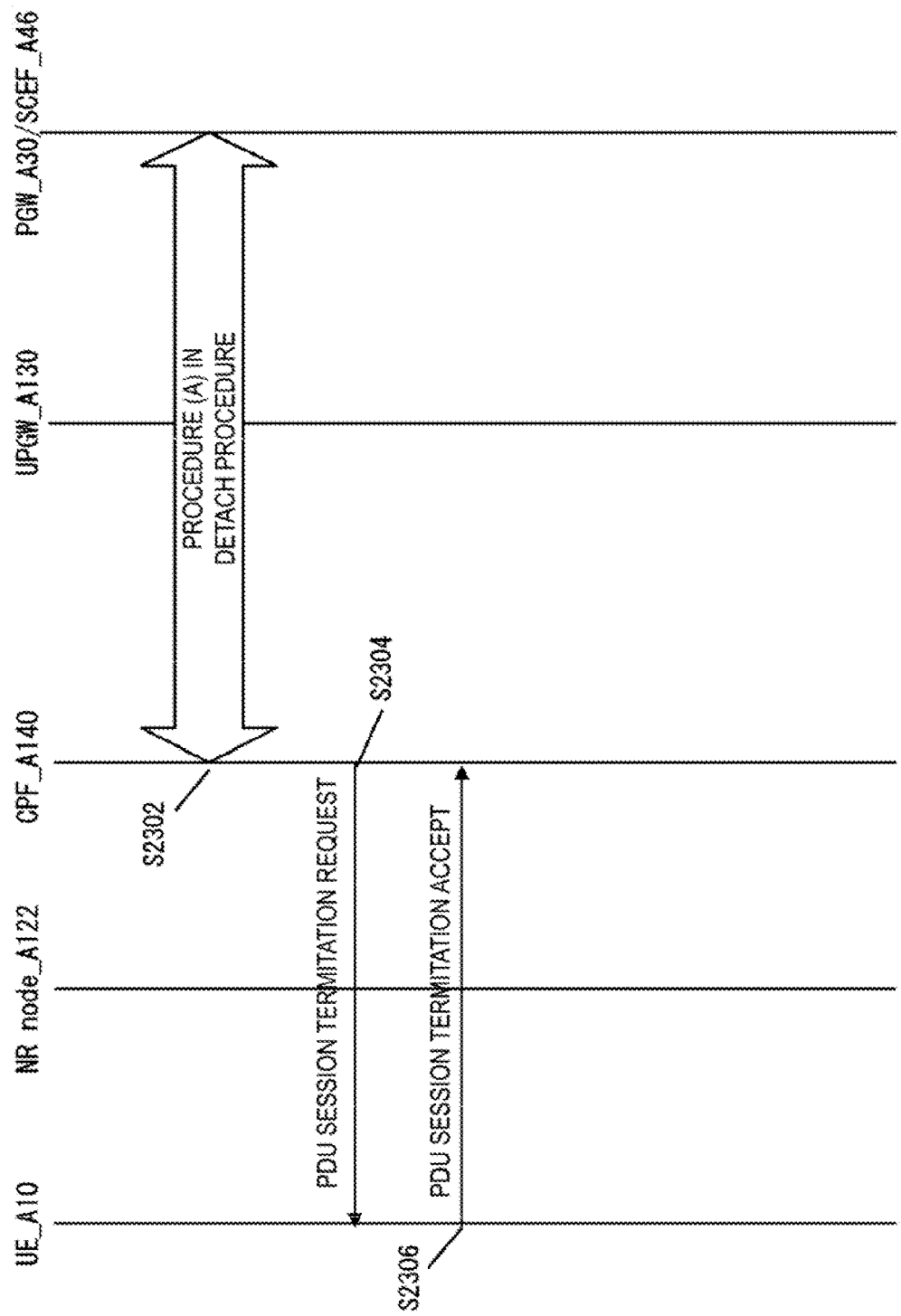
FIG. 23 is a diagram illustrating a PDU session release procedure.

A PDU session release procedure initiated by the network in the present embodiment will be described using FIG. 23. As follows, the present procedure refers to a PDU session release procedure. The present procedure is a procedure initiated by the network to disconnect and/or release a PDU session which the UE_A 10 establishes. Note that each apparatus may release multiple PDU sessions by performing the present procedure several times. First of all, each apparatus performs the procedure of (A) in a detach procedure (S2302).

Then subsequently, the CPF_A 140 transmits a PDU Session Disconnection Request message to the UE_A 10 through the NR node_A 122 (S2304). In addition, the UE_A 10 receives a PDU session disconnection request message.

Here, the CPF_A 140 may include at least the seventy-first identification information to the seventy-sixth in a PDU session disconnection request message. The CPF_A 140 may indicate a request to the UE_A 10, by including these pieces of identification information in a PDU session disconnection request message. In other words, by including these pieces of identification information, the CPF_A 140 may indicate requiring properties or contexts indicated by each identification information previously described to the UE_A 10.

Note that the CPF_A 140 may include at least one or more of the seventy-first identification information to the seventy-sixth identification information in a PDU session disconnection request message, based on having transmitted at least one or more of the eleventh identification information to the eighteenth identification information to the UE_A 10, in an attach procedure to the core network_B 190 and/or a PDU session establishment procedure.

And/or, in a case of allowing service continuation to continue communication by a PDN connectivity procedure with a PDU session release procedure, the CPF_A 140 may include at least one or more of the seventy-first identification information to the seventy-sixth identification information in a PDU session disconnection request message. Here, authorization information for this service continuation may be managed as subscriber information to the UE_A 10. Thus, the CPF_A 140 may include these pieces of identification information, based on such subscriber information of the UE_A 10.

And/or, in a case of performing service continuation to continue communication by a PDN connectivity procedure with a PDU session release procedure for a PDU session to be disconnected, the CPF_A 140 may include at least one or more of the seventy-first identification information to the seventy-sixth identification information in a PDU session disconnection request message.

And/or, the CPF_A 140 may include the seventy-fourth identification information in a PDU session disconnection request message, in a case of performing service continuation to continue communication by a PDN connectivity procedure with a PDU session release procedure, and performing service continuation with IP address reservation, for a PDU session to be disconnected, or otherwise, may determine not to include the seventy-fourth identification information in a PDU session disconnection request message.

And/or, the CPF_A 140 may include the seventy-third identification information indicating an EPC in a PDU session disconnection request message, in a case of performing service continuation to continue communication by a PDN connectivity procedure with a PDU session release procedure, and performing service continuation to switch a communication path or communication established for an NGC to a communication path or communication established for an EPC, for a PDU session to be disconnected. Otherwise, the CPF_A 140 may include the seventy-third identification information indicating an NGC in a PDU session disconnection request message, or may determine not to include the seventy-third identification information in a PDU session disconnection request message.

For example, the CPF_A 140 may request disconnection and/or switch and/or handover to the UE_A 10 for a PDU session and/or a bearer indicated by the seventy-first identification information, by transmitting the seventy-first identification information. The UE_A 10 may determine a PDU session and/or a bearer which performs disconnection and/or switch and/or handover, by receiving the seventy-first identification information.

In addition, each apparatus may indicate causes of this request, by transmitting and/or receiving the seventy-second identification information. For example, the seventy-second identification information may be information indicating a request of a handover.

The CPF_A 140 performs a PDN connectivity procedure for a system indicated by the seventy-third identification information, and may request reactivation of a session, by transmitting the seventy-third identification information. The UE_A 10 determines a PDN connectivity procedure for a system indicated by the seventy-third identification information, and may request reactivation of a session, by receiving the seventy-third identification information. Note that reactivation of a session may be to establish PDN connection, by performing a PDN connectivity procedure.

In addition, each apparatus may be information to indicate whether transmission and/or reception of information indicating a handover in re-establishment of a session is required, by transmitting and/or receiving the seventy-fourth identification information.

Note that in a case that the seventy-fourth identification information indicates that transmission and/or reception of information indicating a handover is required, the CPF_A 140 may request the UE_A 10 to transmit a flag indicating a handover, in a PDN connectivity procedure started based on completion of a PDU session release procedure, by transmitting the seventy-fourth identification information. In addition, the UE_A 10 may determine that the UE_A 10 transmits a flag indicating a handover, in a PDN connectivity procedure started based on completion of a PDU session release procedure, by receiving the seventy-fourth identification information.

In a case that the seventy-fourth identification information indicates that transmission and/or reception of information indicating a handover is unnecessary, the CPF_A 140 may notify that transmission of a flag indicating a handover by the UE_A 10 is not necessary, in a PDN connectivity procedure performed based on completion of a PDU session release procedure, in transmitting the seventy-fourth identification information. In addition, the UE_A 10 may determine that the UE_A 10 does not transmit a flag indicating a handover, in a PDN connectivity procedure to the core network_A 90 started based on completion of a PDU session release procedure, by receiving the seventy-fourth identification information.

Here, information indicating a handover may be the sixty-first identification information, or may be identification information requiring IP address reservation. Note that IP address reservation may be to establish connectivity by the IP address which is the same as the IP address used before switching, after having performed an attach procedure and/or a PDN connectivity procedure again. In other words, IP address reservation may be that an IP address used after having performed an attach procedure and/or a PDN connectivity procedure again is the same as the IP address used before switching.

The CPF_A 140 may notify the UE_A 10 of an NSI with which a PDU session to be disconnected has been established, by transmitting the seventy-fifth identification information. The CPF_A 140 may receive an NSI with which a PDU session to be disconnected has been established, by receiving the seventy-fifth identification information.

The CPF_A 140 may request performing a PDN connectivity procedure for a DCN indicated by the seventy-sixth identification information, by transmitting the seventy-sixth identification information. The UE_A 10 may determine performing a PDN connectivity procedure for a DCN indicated by the seventy-sixth identification information, by receiving the seventy-sixth identification information.

In other words, the CPF_A 140 may request establishing PDN connection for a DCN indicated by the seventy-sixth identification information, by transmitting the seventy-sixth identification information. The UE_A 10 may determine establishing PDN connection for a DCN indicated by the seventy-sixth identification information, by receiving the seventy-sixth identification information.

In addition, each apparatus may indicate an NSI to connect at switch to a DCN and/or NGS connection service to be connected currently, by transmitting and/or receiving the seventy-fifth identification information and/or the seventy-sixth identification information.

In addition, each apparatus may indicate being able to maintain or may request maintaining connectivity by an IP address corresponding to a PDU session at switching the connection destination of a PDU session, by transmitting and/or receiving the seventy-second identification information and/or the seventy-fourth identification information.

In other words, each apparatus may indicate being able to establish or may request establishing a PDN connection associated with the IP address same as the PDU session disconnected by a PDU session release procedure after completion of a PDU session release procedure, by transmitting and/or receiving the seventy-second identification information and/or the seventy-fourth identification information.

Note that from the seventy-first identification information to the seventy-sixth identification information, two or more pieces of identification information may be combined, and transmitted and/or received as one piece of identification information. In that case, identification information combined may be identification information having meanings of each identification information combined.

The UE_A 10 which has received a PDU session disconnection request message may transmit a PDU Session DisconnectionAccept message to the CPF_A 140 through the NR node_A 122 (S2310). In addition, the CPF_A 140 may receive a PDU session disconnection accept message.

Each apparatus may complete the present procedure, based on transmission and/or reception of a PDU session accept message. By completion of the above-mentioned procedure, each apparatus completes a PDU session release procedure, and makes transition to a condition where a PDU session has been disconnected.

Each apparatus may complete the present procedure, based on transmission and/or reception of a PDU session accept message. By completion of the present procedure, each apparatus may make transition to a condition where a PDU session has been disconnected.

In addition, each apparatus may perform the next procedure, based on completion of a PDU session release procedure. Note that the next procedure may be a PDN connectivity procedure. Note that the UE_A 10 may start a PDN connectivity procedure, based on having received at least one of the seventy-first identification information to the seventy-sixth identification information, in a PDU session release procedure.

More particularly, in a case that each apparatus maintains connectivity by the IP address associated with a PDU session disconnected in the present procedure, based on transmission and/or reception of the seventy-second identification information and/or the seventy-fourth identification information, each apparatus may perform the next procedure to establish PDN connection associated with the IP address which is the same as a PDU session. In this case, the UE_A 10 may transmit the sixty-first identification information indicating a handover procedure to the core network_A 90 in the next procedure, or may transmit the sixty-second identification information corresponding to the seventy-first identification information.

In a case that each apparatus does not maintain connectivity by an IP address associated with a PDU session disconnected in the present procedure, based on transmission and/or reception of the seventy-second identification information and/or the seventy-fourth identification information, and establishes PDN connection associated with a new IP address, each apparatus may perform the next procedure. In this case, the UE_A 10 may transmit the sixty-first identification information indicating an initial procedure to the core network_A 90 in the next procedure.

In addition, in a case that each apparatus performs a switch of connection destination from the core network_B 190 to the core network_A 90 using information indicating a handover, based on transmission and/or reception of the seventy-second identification information, and/or the seventy-third identification information, and/or the seventy-fourth identification information, each apparatus may perform the next procedure. In this case, the UE_A 10 may transmit the sixty-first identification information indicating a handover procedure to the core network_A 90 in the next procedure, or may transmit the sixty-third identification information corresponding to the eleventh identification information and/or the sixteenth identification information. In addition, the UE_A 10 may transmit the sixty-fourth identification information corresponding to the eighteenth identification information and/or the forty-sixth identification information to the core network_A 90 in the next procedure, or may transmit the sixty-fifth identification information corresponding to the seventeenth identification information and/or the forty-fifth identification information.

In addition, based on transmission and/or reception of the fourteenth identification information, and/or the fifteenth identification information, and/or the forty-third identification information, and/or the forty-fourth identification information, in a case that an SSC mode allowed and/or supported by the core network_B 190 is SSC mode 1 or SSC mode 2, each apparatus may perform the next procedure after a detach procedure. In this case, the UE_A 10 may transmit the sixty-first identification information indicating a handover procedure to the core network_A 90 in the next procedure, or may transmit the sixty-third identification information corresponding to the eleventh identification information and/or the sixteenth identification information.

In addition, based on transmission and/or reception of the fourteenth identification information, and/or the fifteenth identification information, and/or the forty-third identification information, and/or the forty-fourth identification information, in a case that an SSC mode allowed and/or supported by the core network_B 190 is SSC mode 3, each apparatus may perform the next procedure after a detach procedure. In this case, the UE_A 10 may transmit the sixty-first identification information indicating an initial procedure to the core network_A 90 in the next procedure, or may transmit the sixty-third identification information different from the eleventh identification information and/or the sixteenth identification information.

Note that in a case that each apparatus performs the next procedure after completion of a PDU session release procedure, the UE_A 10 may transmit identification information corresponding to identification information received from the core network_B 190 to the core network_A 90 in the next procedure. For example, the UE_A 10 may transmit the sixty-second identification information corresponding to the seventy-first identification information to the core network_A 90 in the next procedure, or may transmit the sixty-third identification information corresponding to the eleventh identification information and/or the sixteenth identification information. In addition, the UE_A 10 may transmit the sixty-fourth identification information corresponding to the eighteenth identification information and/or the forty-sixth identification information to the core network_A 90 in the next procedure, or may transmit the sixty-fifth identification information corresponding to the seventeenth identification information and/or the forty-fifth identification information. In addition, the UE_A 10 may transmit the sixty-eighth identification information corresponding to the seventy-sixth identification information to the core network_A 90 in the next procedure, or may transmit the sixty-ninth identification information corresponding to the seventy-fifth identification information.

1.4.2.2. Description of PDN Connectivity Procedure

A PDN connectivity procedure in the second re-connectivity procedure may be similar to an example of a PDN connectivity procedure described in Chapter 1.4.1.3. Therefore, detailed description of the procedure will be omitted.

Note that the UE_A 10 may determine whether or not to include at least one or more of the sixty-first identification information to the sixty-eighth identification information in a PDN connectivity request message, based on having received at least one of the seventy-first identification information to the seventy-sixth identification information in a PDU session release procedure. In other words, the UE_A 10 may include at least one or more of the sixty-first identification information to the sixty-eighth identification information in a PDN connectivity request message, based on having received at least one of the seventy-first identification information to the seventy-sixth identification information, in a PDU session release procedure.

2. Modifications

A program running on an apparatus according to the present invention may serve as a program that controls a Central Processing Unit (CPU) and the like to cause a computer to operate in such a manner as to realize the functions of the embodiment according to the present invention. Programs or the information handled by the programs are temporarily stored in a volatile memory, such as a Random Access Memory (RAM), a non-volatile memory, such as a flash memory, a Hard Disk Drive (HDD), or another storage device system.

Note that a program for realizing such functions of the embodiment according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be a semiconductor recording medium, an optical recording medium, a magnetic recording medium, a medium dynamically holding a program for a short time, or another computer-readable recording medium.

Furthermore, each functional block or various characteristics of the apparatuses used in the above-described embodiment may be implemented or performed on an electric circuit, for example an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of known type, a controller, a micro-controller, or a state machine instead. The above-mentioned circuits may be constituted of a digital circuit, or may be constituted of an analog circuit. Furthermore, in a case that with advances in semiconductor technology, a circuit integration technology appears that replaces the present integrated circuits, one or multiple aspects of the present invention are also possible to use a new integrated circuit based on the technology.

Note that the invention of the present patent application is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 PDN_A
10 UE_A
20 UTRAN_A
22 NB_A
24 RNC_A
25 GERAN_A
26 BSS_A
30 PGW_A
35 SGW_A
40 MME_A
42 SGSN_A
45 eNB_A
46_SCEF_A
50 HSS_A
55 AAA_A
60 PCRF_A
65 ePDG_A
70 WLAN ANa
72 WLAN APa
74 TWAG_A
75 WLAN ANb
76 WLAN APb
80 E-UTRAN_A
90 Core network_A
120 NextGen RAN_A 122 NR node_A
125 WLAN ANc
126 WAG_A
130 UPGW_A
140 CPF_A
190 Core network_B

The invention claimed is:

1. A method for a User Equipment (UE), the method comprising:
sending, to a first entity in a core network, a first Protocol Data Unit (PDU) session establishment request message, wherein the first PDU session establishment request message includes a first Session and Service Continuity (SSC) mode;
receiving a PDU session establishment accept message;
receiving a PDU session disconnection request message, wherein the PDU session disconnection request message includes a request for releasing a PDU session established in accordance with the first PDU session establishment request message; and
sending, to a second entity in the core network, a second PDU session establishment request message in response to receiving the PDU session disconnection request message, wherein the second PDU session establishment request message includes a second SSC mode, and the second SSC mode is different from the first SSC mode.

2. The method of claim 1, wherein:
the PDU session established in accordance with the first PDU session establishment request message is a first PDU session; and
the PDU session disconnection request message includes information indicating an instruction to establish a second PDU session.

3. The method of claim 2, wherein the PDU session disconnection request message indicates that the first SSC mode is not usable for the UE based on an operator's policy.

4. The method of claim 1, wherein the second PDU session establishment request message is a packet data network connectivity request message.

5. The method of claim 1, wherein the core network is a fifth-generation core network.

6. A method for an apparatus in a core network, the method comprising:
receiving, from a User Equipment (UE), a first Protocol Data Unit (PDU) session establishment request message, wherein the first PDU session establishment request message includes a first Session and Service Continuity (SSC) mode;
transmitting, to the UE, a PDU session establishment accept message; and
transmitting, to the UE, a PDU session disconnection request message, wherein the PDU session disconnection request message includes a request for releasing a PDU session established in accordance with the first PDU session establishment request message,
wherein the core network receives, from the UE in response to receiving the PDU session disconnection request message, a second PDU session establishment request message, wherein the second PDU session establishment request message includes a second SSC mode, and the second SSC mode is different from the first SSC mode.

7. The method of claim 6, wherein:
the PDU session established in accordance with the first PDU session establishment request message is a first PDU session; and
the PDU session disconnection request message includes information indicating an instruction to establish a second PDU session.

8. The method of claim 7, wherein the PDU session disconnection request message indicates that the first SSC mode is not usable for the UE based on an operator's policy.

9. The method of claim 6, wherein the second PDU session establishment request message is a packet data network connectivity request message.

10. The method of claim 6, wherein the core network is a fifth-generation core network.

11. A User Equipment (UE) comprising:
a memory storing a program; and
a processor configured to execute the program to cause the UE to:
send, to a first entity in a core network, a first Protocol Data Unit (PDU) session establishment request message, wherein the first PDU session establishment request message includes a first Session and Service Continuity (SSC) mode;
receive a PDU session establishment accept message;
receive a PDU session disconnection request message, wherein the PDU session disconnection request message includes a request for releasing a PDU session established in accordance with the first PDU session establishment request message; and
send, to a second entity in the core network, a second PDU session establishment request message in response to receiving the PDU session disconnection request message, wherein the second PDU session establishment request message includes a second SSC mode, and the second SSC mode is different from the first SSC mode.

12. The UE of claim 11, wherein:
the PDU session established in accordance with the first PDU session establishment request message is a first PDU session; and
the PDU session disconnection request message includes information indicating an instruction to establish a second PDU session.

13. The UE of claim 12, wherein the PDU session disconnection request message indicates that the first SSC mode is not usable for the UE based on an operator's policy.

14. The UE of claim 11, wherein the second PDU session establishment request message is a packet data network connectivity request message.

15. The UE of claim 11, wherein the core network is a fifth-generation core network.

16. An apparatus in a core network, the apparatus comprising:
a memory storing a program; and
a processor configured to execute the program to cause the apparatus to:
receive, from a User Equipment (UE), a first Protocol Data Unit (PDU) session establishment request message, wherein the first PDU session establishment request message includes a first Session and Service Continuity (SSC) mode;
transmit, to the UE, a PDU session establishment accept message; and
transmit, to the UE, a PDU session disconnection request message, wherein the PDU session disconnection request message includes a request for releasing a PDU session established in accordance with the first PDU session establishment request message, wherein the core network receives, from the UE in response to receiving the PDU session disconnection request message, a second PDU session establishment request message, wherein the second PDU session establishment request message includes a second SSC mode, and the second SSC mode is different from the first SSC mode.

17. The apparatus of claim 16, wherein:

the PDU session established in accordance with the first PDU session establishment request message is a first PDU session; and the PDU session disconnection request message includes information indicating an instruction to establish a second PDU session.

18. The apparatus of claim 17, wherein the PDU session disconnection request message indicates that the first SSC mode is not usable for the UE based on an operator's policy.

19. The apparatus of claim 16, wherein the second PDU session establishment request message is a packet data network connectivity request message.

20. The apparatus of claim 16, wherein the core network is a fifth-generation core network.

* * * * *